US012561144B1

(12) United States Patent
Liu et al.

(10) Patent No.: US 12,561,144 B1
(45) Date of Patent: Feb. 24, 2026

(54) CIRCUITRY AND METHODS FOR A CONDITIONAL FENCE INSTRUCTION

(71) Applicant: Intel Corporation, Santa Clara, CA (US)

(72) Inventors: Fangfei Liu, Hillsboro, OR (US); Scott Constable, Portland, OR (US); Thomas Unterluggauer, Villach (AT); Joseph Nuzman, Haifa (IL); Carlos Rozas, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/900,528

(22) Filed: Sep. 27, 2024

(51) Int. Cl.
*G06F 9/30* (2018.01)
*G06F 9/38* (2018.01)

(52) U.S. Cl.
CPC ........ *G06F 9/3842* (2013.01); *G06F 9/30058* (2013.01); *G06F 9/30072* (2013.01); *G06F 9/3806* (2013.01); *G06F 2212/1052* (2013.01)

(58) Field of Classification Search
CPC .............. G06F 9/3842; G06F 9/30058; G06F 9/30072; G06F 9/3806; G06F 2212/1052
See application file for complete search history.

(56) References Cited

U.S. PATENT DOCUMENTS 9,274,795 B2    3/2016   Henry et al.
10,394,716 B1 *   8/2019   Piry ................... G06F 12/0871

| 11,580,036 | B1 * | 2/2023 | Pardo ................... G06F 9/30087 |
| 12,008,370 | B2 * | 6/2024 | Thottethodi .......... G06F 9/3842 |
| 2013/0067202 | A1 * | 3/2013 | Henry ................. G06F 9/30174 |
| | | | 712/E9.016 |
| 2019/0205140 | A1 * | 7/2019 | Grisenthwaite ......... G06F 21/71 |
| 2019/0272239 | A1 * | 9/2019 | Hagersten ........... G06F 12/1475 |
| 2019/0324756 | A1 * | 10/2019 | Chappell .............. G06F 9/3854 |
| 2019/0347102 | A1 | 11/2019 | Okazaki |
| 2020/0065112 | A1 * | 2/2020 | Gotze .................. G06F 9/3842 |
| 2020/0133679 | A1 * | 4/2020 | Brandt .................. G06F 9/3844 |
| 2023/0350687 | A1 | 11/2023 | Chappell et al. |

OTHER PUBLICATIONS

Taram et al. Context-Sensitive Fencing: Securing Speculative Execution via Microcode Customization; 2019; ACM (Year: 2019).*

(Continued)

*Primary Examiner* — Corey S Faherty
(74) *Attorney, Agent, or Firm* — NICHOLSON DE VOS WEBSTER & ELLIOTT LLP

(57) ABSTRACT

Circuitry and methods for implementing conditional fence instructions are described. In certain examples, a hardware processor (e.g., core) includes a branch predictor to predict one of a taken path and a not taken path for a conditional branch instruction; decoder circuitry to decode an instruction into a decoded instruction, the instruction comprising a field that indicates a condition to be set by execution of another instruction, and an opcode that indicates execution circuitry is to, in response to the condition being satisfied, implement an execution fence to delay execution of the instruction until prior instructions in program order execute and delay execution of instructions after the instruction in program order until the instruction executes; and the execution circuitry to execute the decoded instruction according to the opcode.

20 Claims, 38 Drawing Sheets

FETCH AN INSTANCE OF A SINGLE INSTRUCTION HAVING A FIELD THAT INDICATES A CONDITION TO BE SET BY EXECUTION OF ANOTHER INSTRUCTION, AND AN OPCODE THAT INDICATES EXECUTION CIRCUITRY IS TO: (I) IN RESPONSE TO THE CONDITION NOT BEING CURRENTLY RESOLVED, STALL INSTRUCTIONS AFTER THE INSTRUCTION IN PROGRAM ORDER FROM EXECUTION UNTIL THE CONDITION IS RESOLVED; (II) IN RESPONSE TO THE CONDITION BEING SATISFIED, IMPLEMENT AN EXECUTION FENCE TO CAUSE THIS INSTRUCTION TO NOT COMPLETE EXECUTION UNTIL ALL PRIOR INSTRUCTION IN PROGRAM ORDER ARE EXECUTED (E.G., LOCALLY), AND INSTRUCTIONS AFTER THIS INSTRUCTION IN PROGRAM ORDER TO NOT EXECUTE UNTIL THIS INSTRUCTION COMPLETES (E.G., EXECUTES) (E.G., LOCALLY) AND (III) IN RESPONSE TO THE CONDITION NOT BEING SATISFIED, ALLOW ONE OR MORE INSTRUCTIONS AFTER THE INSTRUCTION IN PROGRAM ORDER TO EXECUTE AFTER THE CONDITION IS RESOLVED
701

↓

DECODE THE INSTRUCTION
703

↓

RETRIEVE DATA ASSOCIATED WITH THE SOURCE OPERAND (CONDITON CODE) AND SCHEDULE
705

↓

EXECUTE THE DECODED INSTRUCTION ACCORDING TO THE OPCODE
707

↓

COMMIT A RESULT OF THE EXECUTED INSTRUCTION
709

(56) References Cited

OTHER PUBLICATIONS

Carruth, Chandler, "Speculative Load Hardening: A Spectre Variant #1 Mitigation Technique", LLVM Project, Sep. 2018, 17 pages.

Corbet, Jonathan, "Meltdown/Spectre Mitigation for 4.15 and Beyond", LWN.net, Jan. 15, 2018, 15 pages.

Gaidis, Alexander J. et al., "FineIBT: Fine-grain Control-flow Enforcement with Indirect Branch Tracking", Proceedings of the 26th International Symposium on Research in Attacks, Intrusions and Defenses (RAID), Oct. 16, 2023, pp. 527-546.

Intel Corporation, "Speculative Execution Side Channel Mitigations", Revision 3.0, May 2018, 23 pages.

Microsoft Corporation, "Qspectre", Nov. 3, 2021, 5 pages [retrieved online from learn.microsoft. com/en-us/cpp/build/reference/qspectre? view=msvc-170].

Extended European Search Report, EP App. No. 25188990.3, Dec. 19, 2025, 09 pages.

* cited by examiner

SUMMARY OF EXAMPLE
CONDITION CODES (CCs)
300

| CONDITION CODE (CC) | DESCRIPTION | FLAGS TO SATISFY THE CC |
|---|---|---|
| AE/NB/NC | Above or equal / not below / not carry | CF=0 |
| B/C/NAE | Below/carry/not above or equal | CF=1 |
| NE/NZ | Not equal / not zero | ZF=0 |
| E/Z | Equal / zero | ZF=1 |
| A/NBE | Above / not below or equal | CF = 0 and ZF = 0 |
| BE/NA | Below or equal / not above | CF=1 or ZF=1 |
| GE/NL | Greater or equal | SF=OF |
| L/NGE | Less | SF!=OF |
| G/NLE | Greater | ZF=0 and SF=OF |
| LE/NG | Less or equal | ZF=1 or SF!=OF |
| NO | Not overflow | OF=0 |
| NP/PO | Not parity / parity odd | PF=0 |
| NS | Not sign | SF=0 |
| O | Overflow | OF=1 |
| P/PE | Parity/parity even | PF=1 |
| S | Sign | SF=1 |

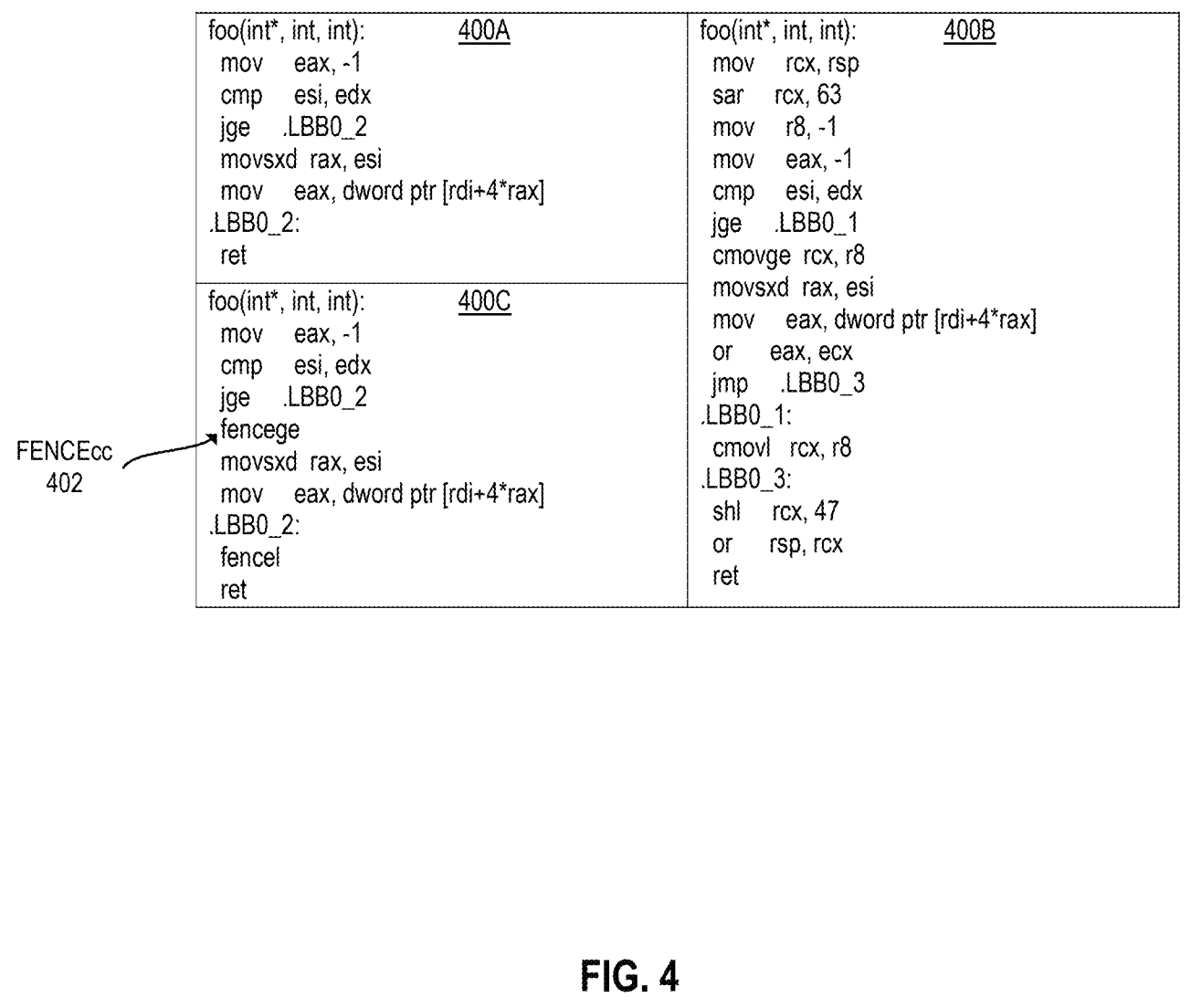

```
foo(int*, int, int):
    mov    eax, -1
    cmp    esi, edx
    jge    .LBB0_2
    movsxd rax, esi
    mov    eax, dword ptr [rdi+4*rax]
.LBB0_2:
    ret
```

400C

```
foo(int*, int, int):
    mov    eax, -1
    cmp    esi, edx
    jge    .LBB0_2
    fencege
    movsxd rax, esi
    mov    eax, dword ptr [rdi+4*rax]
.LBB0_2:
    fencel
    ret
```

400B

```
foo(int*, int, int):
    mov    rcx, rsp
    sar    rcx, 63
    mov    r8, -1
    mov    eax, -1
    cmp    esi, edx
    jge    .LBB0_1
    cmovge rcx, r8
    movsxd rax, esi
    mov    eax, dword ptr [rdi+4*rax]
    or     eax, ecx
    jmp    .LBB0_3
.LBB0_1:
    cmovl  rcx, r8
.LBB0_3:
    shl    rcx, 47
    or     rsp, rcx
    ret
```

FENCEcc
402

FIG. 4

FENCEcc Emulation

500

```
Jcc .Y   # static predict taken
    JMP .X
.Y:
    LFENCE
.X:
```

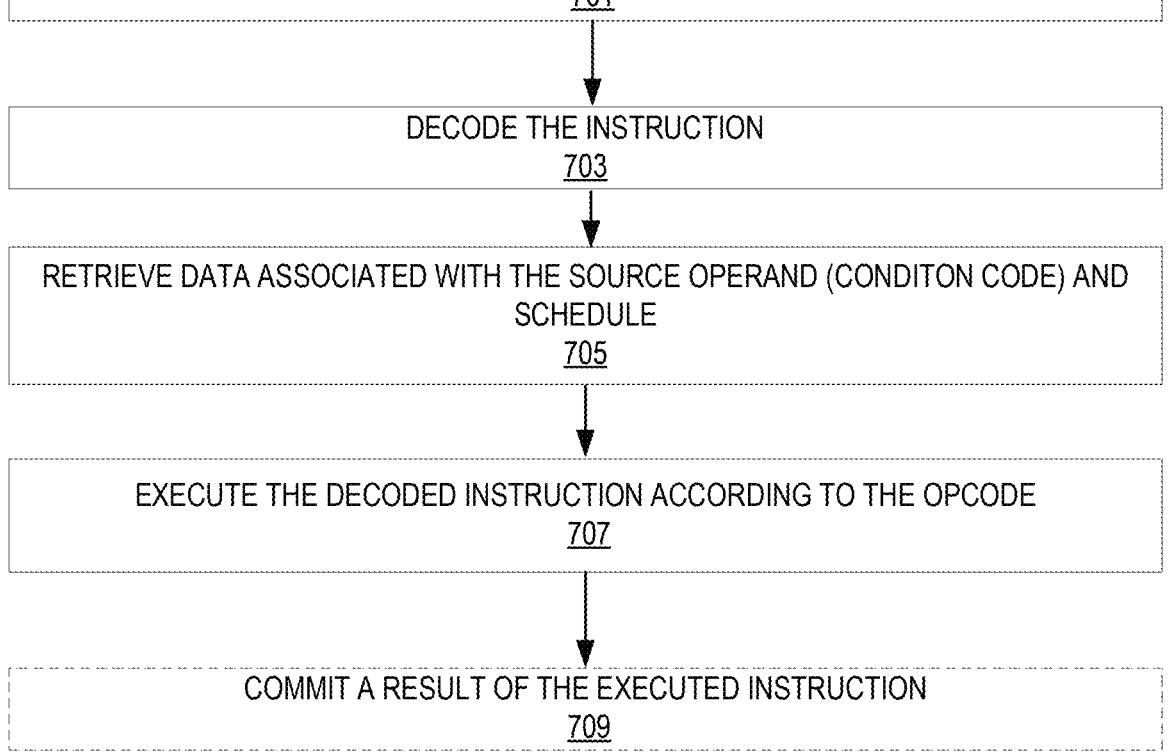

FETCH AN INSTANCE OF A SINGLE INSTRUCTION HAVING A FIELD THAT INDICATES A CONDITION TO BE SET BY EXECUTION OF ANOTHER INSTRUCTION, AND AN OPCODE THAT INDICATES EXECUTION CIRCUITRY IS TO: (I) IN RESPONSE TO THE CONDITION NOT BEING CURRENTLY RESOLVED, STALL INSTRUCTIONS AFTER THE INSTRUCTION IN PROGRAM ORDER FROM EXECUTION UNTIL THE CONDITION IS RESOLVED; (II) IN RESPONSE TO THE CONDITION BEING SATISFIED, IMPLEMENT AN EXECUTION FENCE TO CAUSE THIS INSTRUCTION TO NOT COMPLETE EXECUTION UNTIL ALL PRIOR INSTRUCTION IN PROGRAM ORDER ARE EXECUTED (E.G., LOCALLY), AND INSTRUCTIONS AFTER THIS INSTRUCTION IN PROGRAM ORDER TO NOT EXECUTE UNTIL THIS INSTRUCTION COMPLETES (E.G., EXECUTES) (E.G., LOCALLY) AND (III) IN RESPONSE TO THE CONDITION NOT BEING SATISFIED, ALLOW ONE OR MORE INSTRUCTIONS AFTER THE INSTRUCTION IN PROGRAM ORDER TO EXECUTE AFTER THE CONDITION IS RESOLVED
701

DECODE THE INSTRUCTION
703

RETRIEVE DATA ASSOCIATED WITH THE SOURCE OPERAND (CONDITON CODE) AND SCHEDULE
705

EXECUTE THE DECODED INSTRUCTION ACCORDING TO THE OPCODE
707

COMMIT A RESULT OF THE EXECUTED INSTRUCTION
709

FIG. 7

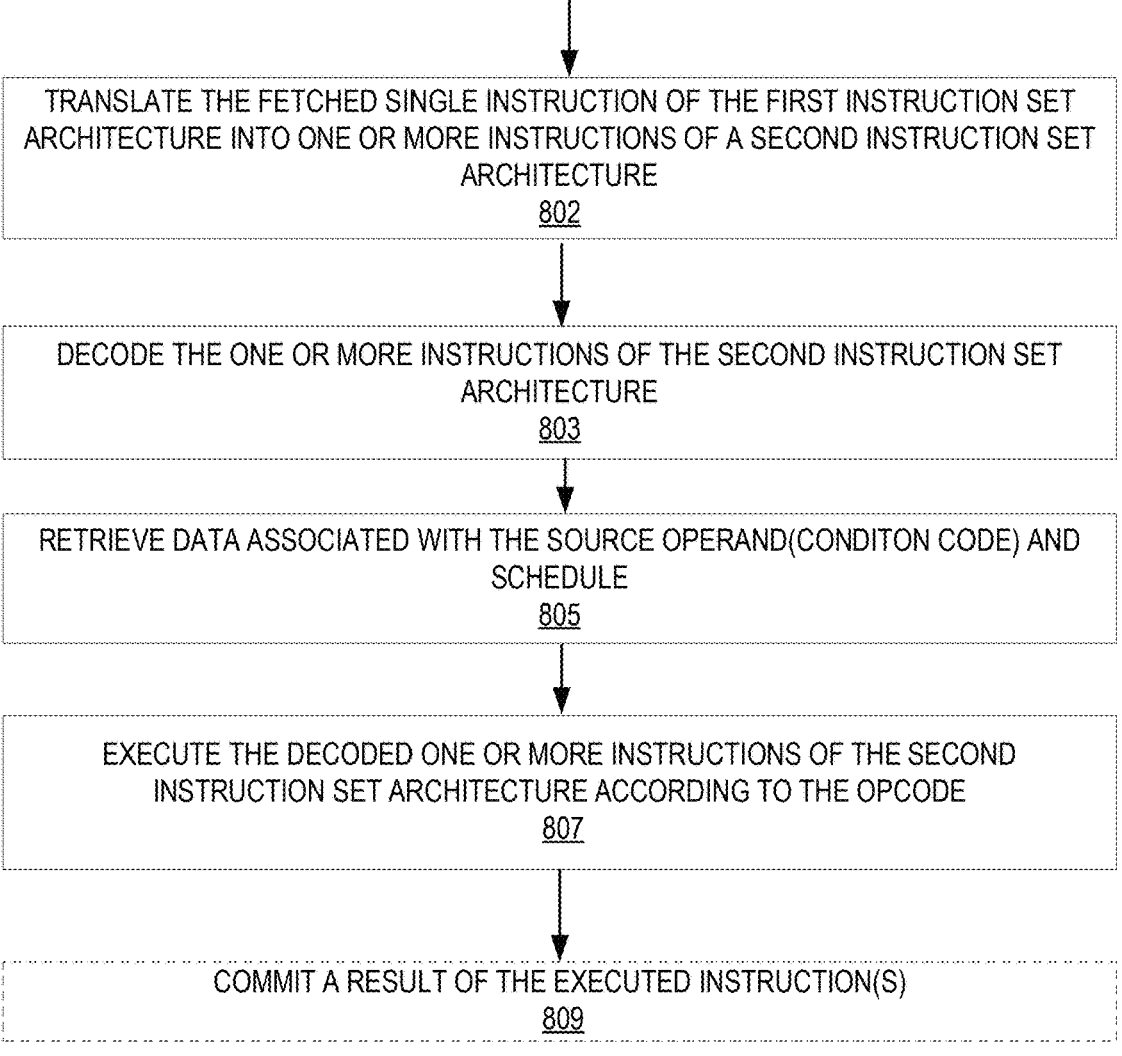

FETCH A SINGLE INSTRUCTION OF A FIRST INSTRUCTION SET ARCHITECTURE HAVING A FIELD THAT INDICATES A CONDITION TO BE SET BY EXECUTION OF ANOTHER INSTRUCTION, AND AN OPCODE THAT INDICATES EXECUTION CIRCUITRY IS TO: (I) IN RESPONSE TO THE CONDITION NOT BEING CURRENTLY RESOLVED, STALL INSTRUCTIONS AFTER THE INSTRUCTION IN PROGRAM ORDER FROM EXECUTION UNTIL THE CONDITION IS RESOLVED; (II) IN RESPONSE TO THE CONDITION BEING SATISFIED, IMPLEMENT AN EXECUTION FENCE TO CAUSE THIS INSTRUCTION TO NOT COMPLETE EXECUTION UNTIL ALL PRIOR INSTRUCTION IN PROGRAM ORDER ARE EXECUTED (E.G., LOCALLY), AND INSTRUCTIONS AFTER THIS INSTRUCTION IN PROGRAM ORDER TO NOT EXECUTE UNTIL THIS INSTRUCTION COMPLETES (E.G., EXECUTES) (E.G., LOCALLY) AND (III) IN RESPONSE TO THE CONDITION NOT BEING SATISFIED, ALLOW ONE OR MORE INSTRUCTIONS AFTER THE INSTRUCTION IN PROGRAM ORDER TO EXECUTE AFTER THE CONDITION IS RESOLVED
801

TRANSLATE THE FETCHED SINGLE INSTRUCTION OF THE FIRST INSTRUCTION SET ARCHITECTURE INTO ONE OR MORE INSTRUCTIONS OF A SECOND INSTRUCTION SET ARCHITECTURE
802

DECODE THE ONE OR MORE INSTRUCTIONS OF THE SECOND INSTRUCTION SET ARCHITECTURE
803

RETRIEVE DATA ASSOCIATED WITH THE SOURCE OPERAND(CONDITON CODE) AND SCHEDULE
805

EXECUTE THE DECODED ONE OR MORE INSTRUCTIONS OF THE SECOND INSTRUCTION SET ARCHITECTURE ACCORDING TO THE OPCODE
807

COMMIT A RESULT OF THE EXECUTED INSTRUCTION(S)
809

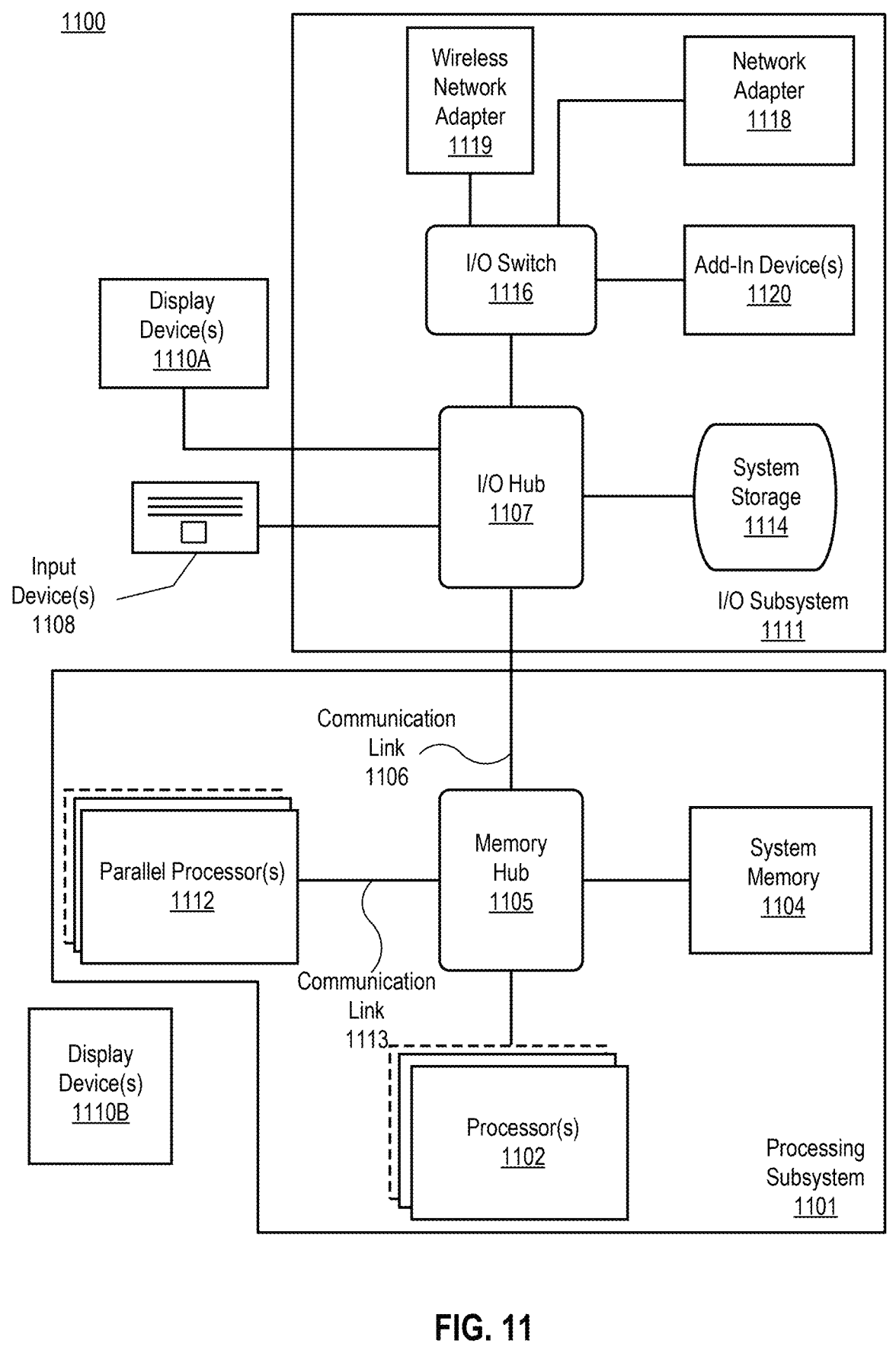

Wireless Network Adapter
1119

Network Adapter
1118

I/O Switch
1116

Add-In Device(s)
1120

Display Device(s)
1110A

I/O Hub
1107

System Storage
1114

Input Device(s)
1108

I/O Subsystem
1111

Communication Link
1106

Parallel Processor(s)
1112

Memory Hub
1105

System Memory
1104

Communication Link
1113

Display Device(s)
1110B

Processor(s)
1102

Processing Subsystem
1101

FIG. 11

Graphics Multiprocessor  1325

Interconnect Fabric  1327

Shared Memory  1346

| Texture Unit(s)  1344A | Texture Unit(s)  1344B |
|---|---|

Cache Memory  1342

| Load/Store Unit 1340A | RT Core 1338A | Tensor Core 1337A | GPGPU Core 1336A | Load/Store Unit 1340B | RT Core 1338B | Tensor Core 1337B | GPGPU Core 1336B |
|---|---|---|---|---|---|---|---|

| Register File  1334A | Register File  1334B |
|---|---|

| Instruction Unit  1332A | Instruction Unit  1332B |
|---|---|

Instruction Cache  1330

FIG. 13A

Graphics Multiprocessor  1350

Interconnect Fabric 1352

Shared Memory  1353

| Texture Unit(s)  1360A | Texture Unit(s)  1360B |
|---|---|

Cache Memory  1358A

| Execution Resources  1356A | Execution Resources  1356B |
|---|---|

| Texture Unit(s)  1360C | Texture Unit(s)  1360D |
|---|---|

Cache Memory  1358B

| Execution Resources  1356C | Execution Resources  1356D |
|---|---|

Instruction Cache  1354

FIG. 13B

REGISTER ARCHITECTURE 1800

Segment Registers 1820

Model Specific Registers 1835

Control Register(s) 1855

Instruction Pointer Register(s) 1830

Debug Registers 1850

Mem. Management Registers 1865

Machine Check Registers 1860

Writemask/predicate Registers 1815

SCALAR FP REGISTER FILE 1845

Vector/SIMD Registers 1810

General Purpose Registers 1825

Flag Register(s) 1840

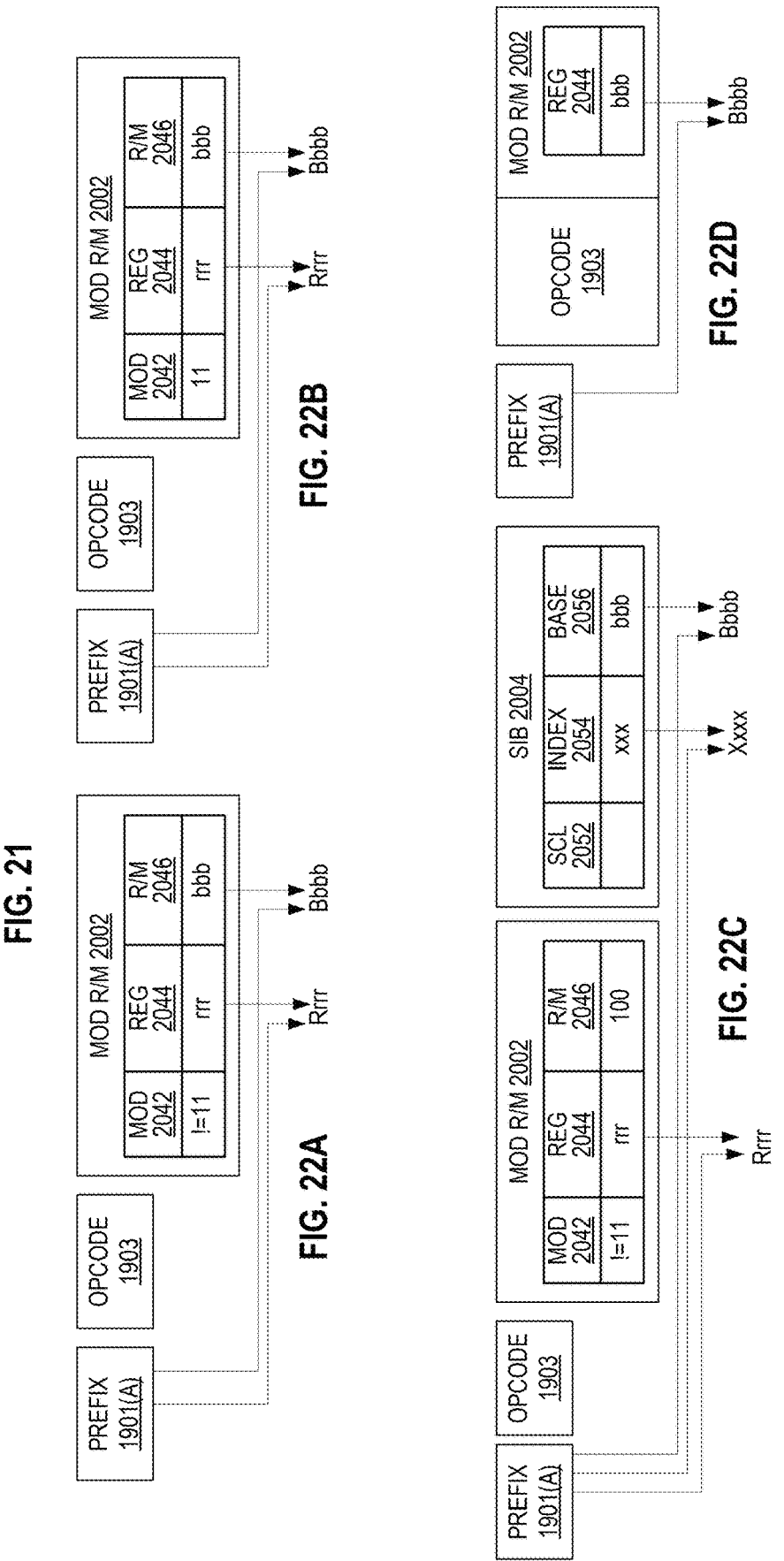

EXECUTION UNIT
2600

FIG. 29A GRAPHICS PROCESSOR COMMAND FORMAT
2900

| CLIENT 2902 | OPCODE 2904 | SUB-OPCODE 2905 | DATA 2906 | COMMAND SIZE 2908 |
|---|---|---|---|---|

FIG. 29B GRAPHICS PROCESSOR COMMAND SEQUENCE
2910

CIRCUITRY AND METHODS FOR A CONDITIONAL FENCE INSTRUCTION

BACKGROUND

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF DRAWINGS

Various examples in accordance with the present disclosure will be described with reference to the drawings, in which:

FIG. 3 is a summary of example condition codes according to examples of the disclosure.

FIG. 4 illustrates (400A) insecure code without hardening, (400B) code hardened with speculative load hardening, and (400C) code hardened with a conditional fence instruction according to examples of the disclosure.

FIG. 7 illustrates an example method performed by a processor to process a FENCEcc instruction according to examples of the disclosure.

FIG. 8 illustrates an example method to process a FENCEcc instruction using emulation or binary translation according to examples of the disclosure.

FIG. 11 is a block diagram illustrating a computing system 1100 configured to implement one or more aspects of the examples described herein.

FIGS. 13A-13C illustrate additional graphics multiprocessors, according to examples.

FIG. 21 illustrates examples of a first prefix.

FIGS. 22A-22D illustrate examples of how the R, X, and B fields of the first prefix are used.

DETAILED DESCRIPTION

Figure 1:
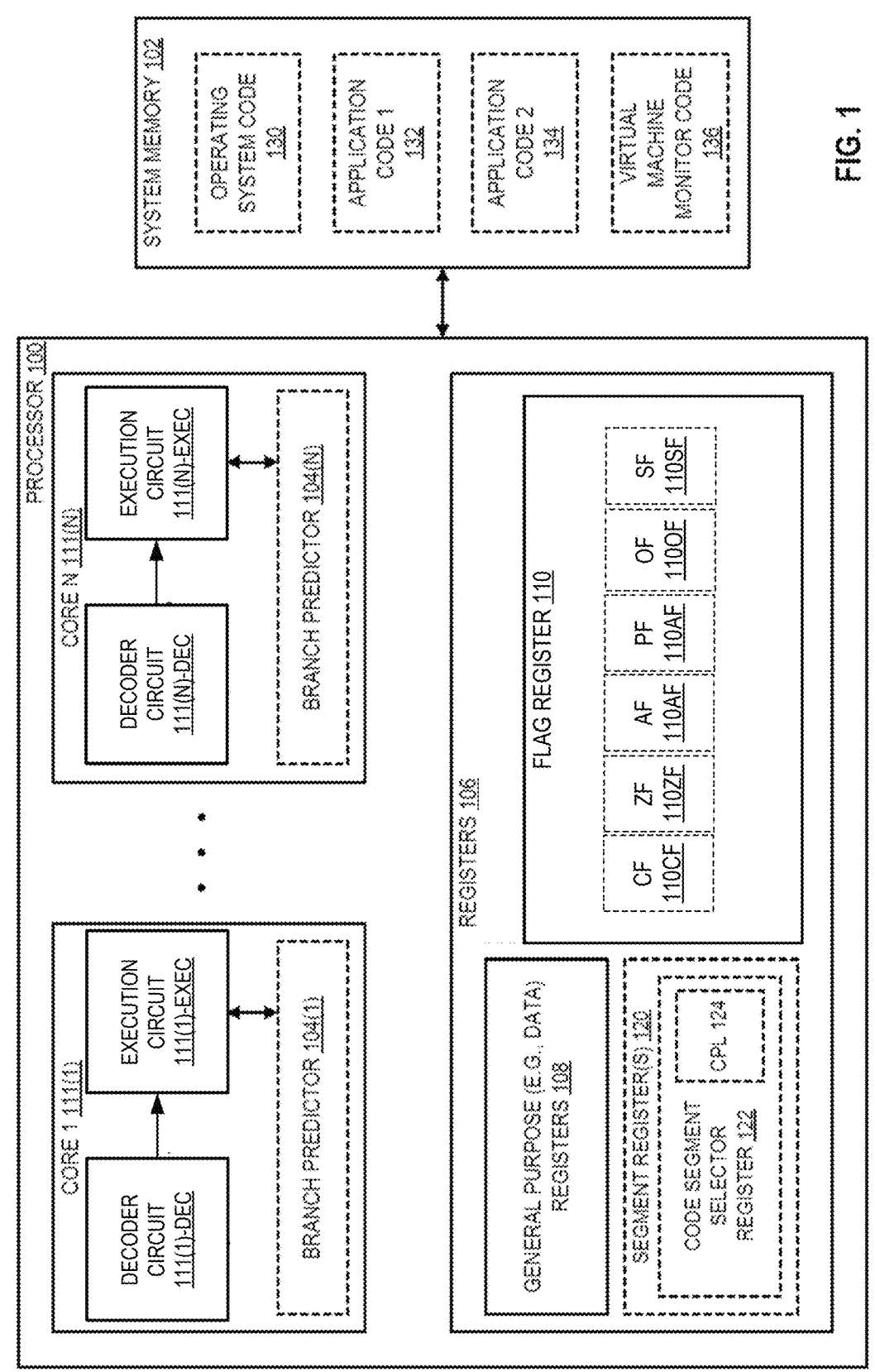
FIG. 1 illustrates a block diagram of a computer system including a hardware processor having a plurality of cores that each include a branch predictor according to examples of the disclosure.

The present disclosure relates to methods, apparatus, systems, and non-transitory computer-readable storage media for performing a conditional fence (FENCEcc) by a hardware processor, e.g., one or more FENCEcc (e.g., macro) instructions (e.g., primitives).

Side channel methods are techniques that may allow an attacker to gain information through observing a processor (e.g., of a computing system), such as measuring micro-architectural properties about the processor. Certain side channel methods perform transient execution attacks. On certain processors, the speculative execution resulting from a branch misprediction may leave observable side effects that reveal private data to attackers. For example, if the pattern of memory accesses performed by such speculative execution depends on private data, the resulting state of the data cache constitutes a side channel through which an attacker may be able to extract information about the private data using an attack, e.g., a timing attack.

In certain examples, the side channel method is a bounds check bypass (e.g., referred to as Spectre v1), e.g., that takes advantage of the speculative execution that may occur following a conditional branch instruction. Specifically, in certain examples, this side channel method is used in situations in which the processor is checking whether an input is in bounds (e.g., while checking whether the index of an array element being read is within acceptable values). The processor may issue operations (e.g., fetch, decode, and/or execute operations) speculatively before the bounds check resolves. If an attacker contrives for these operations to access out-of-bound memory, information may be leaked to the attacker in certain circumstances. However, there is no hardware mitigation for these side channel (e.g., Spectre v1) methods. In certain examples, these side channel (e.g., Spectre v1) methods, exploit training the conditional branch predictor so that its misprediction results in executing unintended code (e.g., "gadgets") that may speculatively read arbitrary memory locations, e.g., due to bypassing a conditional branch that does a bounds check. Besides pure software-based approaches that are specific to particular code patterns (e.g., masking array indices), certain software generally uses two primitives for mitigation of these side channel (e.g., Spectre v1) methods: (1) a load fence (LFENCE) and (2) conditional move based on a condition code (CMOVcc). In certain examples, an LFENCE instruction (e.g., primitive) is inserted into potentially vulnerable code patterns to restrict speculation as a mitigation to of these side channel (e.g., Spectre v1) methods and a CMOVcc instruction is used by software to convert a control dependency to a data dependency in a comprehensive mitigation technique (e.g., software load hardening).

In certain examples, the mitigation of these side channel (e.g., Spectre v1) methods is done by software, for example, to harden code against a bounds check bypass.

In certain examples, a general software mitigation for side channel (e.g., Spectre v1) methods is a (e.g., Linux) kernel implementing a technique to mask array indices so that array indices that are outside the array boundary are zeroed out. However, bounds check bypass is only one variant of these side channel (e.g., Spectre v1) methods. There are also other types of side channel (e.g., Spectre v1) methods, such as speculative type confusion, speculative race condition, etc.

In certain examples, a mitigation technique used to avoid certain side channel exploits (e.g., Spectre v1) involves inserting an LFENCE instruction at the taken and fall-through target of a branch. However, certain examples of LFENCE are a computationally and time intensive as a Spectre v1 mitigation because they prevent all instructions in program order after the LFENCE from executing until all the instructions in program order prior to the LFENCE complete execution and retire, e.g., whereas it is safe to execute instructions once the conditional branch is resolved/executed. Thus, LFENCE may incur a significant performance overhead, e.g., and thus be used for point mitigation instead of a comprehensive mitigation (e.g., where LFENCE may still incur significant performance overhead).

In certain other examples, a mitigation technique used to avoid certain side channel exploits (e.g., Spectre v1) is called speculative load hardening (SLH). In certain examples, an ISA primitive that SLH leverages is called CMOVcc. In certain examples, SLH tracks a predicate state along every path of conditional branch, uses the CMOVcc ISA primitive to determine whether a given code path is mis-predicted, and poisons the predicate state if so. In certain examples, SLH then uses the predicate state to harden either load value or load address so that the load value (or load address) is poisoned if executed under the shadow of mis-predicted branch. In certain examples, CMOVcc thus provides a way to create a data dependency between loads to be hardened and the branch condition of conditional branches, so that loads cannot be executed (or their value cannot be consumed) until the branch condition is resolved. Since the CMOVcc ISA primitive can only create a dependency between two single instructions in certain examples (e.g., functioning as a fence that only fences against one single instruction and only influences one single instruction), SLH uses a complicated way to accumulate predicate state (especially across function calls).

In certain examples, a mitigation for side channel (e.g., Spectre v1) methods is using a branch FENCE instruction (BFENCE) to instruct the processor (e.g., central processing unit (CPU)) to resolve all prior branches before executing subsequent instructions.

In certain examples, a mitigation for side channel (e.g., Spectre v1) methods is using a register FENCE instruction (RFENCE) to instruct the processor (e.g., CPU) to resolve all control and data speculation (essentially meaning all prior instructions) prior to speculative execution of the next instruction after the RFENCE that uses the RFENCE's register operands, etc. However, none of these FENCE instructions specifically target Spectre v1 or the conditional branch predictor and all of those FENCE instructions are a computationally and time intensive (e.g., Spectre v1) mitigation that incur a significant performance overhead.

In certain examples, an LFENCE instruction fences against all prior instructions and influences all the instructions after the FENCE. In certain examples, an RFENCE instruction fences against all prior instructions, while only influencing one single instruction.

To overcome these issues, examples herein are directed to a conditional FENCE instruction (FENCEcc) that increase the expressiveness of an (e.g., x86) instruction set architecture (ISA) for the purpose of Spectre v1 mitigation and thus provides a new light-weight fence primitive specifically targeting the conditional branch predictor. In certain examples, the FENCEcc instruction behaves like an LFENCE when the condition is satisfied, otherwise it behaves like a no-operation (NOP). In certain examples, the FENCEcc instruction is more performant than an LFENCE instruction, replaces LFENCE for the purpose of Spectre v1 mitigation, and can potentially serve other use cases, e.g., a comprehensive software mitigation simpler than CMOVcc-based mitigations. In certain examples, the FENCEcc instruction only fences against a single conditional branch, but impacts all the instructions following the FENCE in program order, e.g., and thus increases the expressiveness of speculation barriers, especially for Spectre v1 mitigations. In certain examples, the FENCEcc instruction is backwards compatible with LFENCE on other hardware. In certain examples, the FENCEcc instruction (e.g., primitive) offers software more control over conditional control flow speculation.

The FENCEcc instructions disclosed herein are improvements to the functioning of a processor (e.g., of a computer) itself because they implement the above functionality by electrically changing a general-purpose computer (e.g., the decoder circuitry and/or the execution circuitry thereof) by creating electrical paths within the computer (e.g., within the decoder circuitry and/or the execution circuitry thereof). These electrical paths create a special purpose machine for carrying out the particular FENCEcc functionality.

The instructions disclosed herein are improvements to the functioning of a processor (e.g., of a computer) itself. An instruction decoder circuit not having such an instruction as a part of its instruction set would not decode as discussed herein. An execution circuit not having such an instruction as a part of its instruction set would not execute as discussed herein. For example, the FENCEcc instructions according to this disclosure are improvements to the functioning of a processor (e.g., of a computer) itself as they provide a conditional execution fence for side channel (e.g., Spectre v1) mitigation.

Turning now to the figures, FIG. 1 illustrates a block diagram of a computer system 101 including a hardware processor 100 having a plurality of cores 111(1) to 111(N) that each include a branch predictor 104(1)-104(N), respectively, according to examples of the disclosure. In one example, N is any integer 1 or greater. In certain examples, a processor core includes a decoder circuit to decode an instruction and execution circuit to execute the decoded instruction, for example, decoder circuit 111(1)-DEC and execution circuit 111(1)-EXEC in core 111(1) to decoder circuit 111(N)-DEC and execution circuit 111(N)-EXEC in core 111(N).

Hardware processor 100 is depicted as coupled to a system memory 102, e.g., forming a computing system 101. In the depicted example, a core of (e.g., each core of) hardware processor 100 includes a plurality of logical cores (e.g., logical processing elements or logical processors). In certain examples, each of physical core 111(1) to physical core 111(N) supports multithreading (e.g., executing two or more parallel sets of operations or threads on a first and second logical core), and may do so in a variety of ways including time sliced multithreading, simultaneous multithreading (e.g., where a single physical core provides a respective logical core for each of the threads (e.g., hardware threads) that physical core is simultaneously multithreading), or a combination thereof (e.g., time sliced fetching and decoding and simultaneous multithreading thereafter). In certain examples, each logical core appears to software (e.g., the operating system (OS)) as a distinct processing unit, for example, so that the software (e.g., OS) can schedule two processes (e.g., two threads) for concurrent execution.

Depicted hardware processor 100 includes registers 106. Registers 106 may include one or more general purpose (e.g., data) registers 108 to perform (e.g., logic or arithmetic) operations in, for example, additionally or alternatively to access (e.g., load or store) data in memory 102. Registers 106 may include one or more model specific registers, e.g., configuration and/or control registers. In certain examples, each physical core has its own respective set of registers 106. In certain examples, each logical core (e.g., of multiple logical cores of a single physical core) has its own respective set of registers 106. In certain examples, each logical core has its own respective configuration and/or control registers. In one example, one or more (e.g., model specific) registers are (e.g., only) written to at the request of the OS running on the processor, e.g., where the OS operates in privilege (e.g., system) mode but does not operate in non-privilege (e.g., user) mode. In one example, a model specific register can only be written to by software running in supervisor mode, and not by software running in user mode.

Registers 106 (e.g., model specific registers 110) may include a flag register 110. In one example, the flag register 110 includes a field (e.g., a single bit wide) for each flag therein. Flags may include one, all, or any combination of a carry flag (CF) 110CF, a zero flag (ZF) 110ZF, an adjust flag (AF) 110AF, a parity flag (PF) 110PF, an overflow flag (OF) 110OF, or a sign flag (SF) 110SF. In one example, flag register 110 (e.g., only) includes six flags (e.g., CF, ZF, AF, PF, OF, and SF). In one example, each flag is a single bit, e.g., with certain bits of the register not utilized. In one example, CF is in bit index zero of flag register 110, ZF is in bit index six of flag register 110, AF is in bit index four of flag register 110, PF is in bit index two of flag register 110, OF is in bit index eleven of flag register 110, and/or SF is in bit index seven of flag register 110.

In certain examples, flag register 110 is a single logical register, e.g., referenced as EFLAGS (e.g., 32 bits wide) or RFLAGS (e.g., 64 bits wide). In certain examples, carry flag (CF) (e.g., bit) is set (e.g., to binary one) (e.g., by flag logic in an execution circuit that updates the flag register) if the result of an (e.g., arithmetic) operation (e.g., a micro-operation) has an arithmetic carry and cleared (e.g., to binary zero) if there is no arithmetic carry. In certain examples, a zero flag (ZF) is set (e.g., to binary one) (e.g., by flag logic in an execution circuit that updates the flag register) if the result of an (e.g., arithmetic) operation (e.g., a micro-operation) is a zero and cleared (e.g., to binary zero) if not a zero. In certain examples, an adjust flag (AF) (or auxiliary flag or auxiliary carry flag) is set (e.g., to binary one) (e.g., by flag logic in an execution circuit that updates the flag register) if the (e.g., arithmetic) operation (e.g., a micro-operation) has caused an arithmetic carry or borrow (e.g., out of the four least significant bits) and cleared (e.g., to binary zero) otherwise. In certain examples, a parity flag (PG) is set (e.g., to binary one) (e.g., by flag logic in an execution circuit that updates the flag register) if the result of an (e.g., arithmetic) operation (e.g., a micro-operation) has an even number and cleared (e.g., to binary zero) if an odd number. In certain examples, an overflow flag (OF) is set (e.g., to binary one) (e.g., by flag logic in an execution circuit that updates the flag register) if the result of an (e.g., arithmetic) operation (e.g., a micro-operation) overflows and cleared (e.g., to binary zero) if there is no overflow, for example, an overflow when the (e.g., signed two's-complement) result of the operation would not fit in the number of bits used for the operation, e.g., is wider than the execution circuit (e.g., arithmetic logic unit (ALU) thereof) width. In certain examples, a sign flag (SF) is set (e.g., to binary one) (e.g., by flag logic in an execution circuit that updates the flag register) if the result of an (e.g., arithmetic) operation (e.g., a micro-operation) has a negative number and cleared (e.g., to binary zero) if a positive number, e.g., for a signed (+ or −) value resultant.

In one example, registers 106 store data indicating a current privilege level of software operating on a logical core, e.g., separately for each logical core. In one example, current privilege level is stored in a current privilege level (CPL) field 124 of a code segment selector register 122 of a segment register(s) 120. In certain examples, processor 100 requires a certain level of privilege to perform certain actions, for example, actions requested by a particular logical core (e.g., actions requested by software running on that particular logical core).

System memory 102 may include (e.g., store) one or more of (e.g., any combination of) the following software: operating system (OS) code 130, first application code 132, second (or more) application code 134, virtual machine monitor code 136, or any combination thereof. First application code 132 or second application code 134 may be a respective user program.

Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain examples herein.

In one example, processor 100 has a single core. In certain examples, computing system 101 and/or processor 100 includes one or more of the features and/or components discussed below, e.g., in reference to any figure herein.

In certain examples, each physical core includes a respective branch predictor (e.g., branch predictor circuit), for example, such that each logical core of that single physical core shares the same branch predictor. In another example, each physical core of a plurality of physical cores shares a single branch predictor (e.g., branch predictor circuit). In one example, there are a plurality of logical cores within a single physical core and the plurality of logical cores share some (or all) branch predictor(s) and/or branch prediction(s). In one example, a single physical core only has a single logical core, and that single logical core has a dedicated branch predictor and/or branch predictions to itself. In one example, there are a plurality of logical cores within a single physical core and some (or all) branch predictor(s) (and/or prediction(s)) are per logical core instead of being shared.

In certain examples, a branch predictor (e.g., circuit) is to predict a next instruction (e.g., predict a pointer to that next instruction) that is to be fetched (e.g., for an out-of-order execution processor) after a branch type of instruction. The predicted next instruction may be referred to as the target instruction, and the prediction process may be referred to as branch target prediction. Certain branch instructions are referred to as indirect branching instructions. In one example, indirect branch instructions have their branch target (e.g., IP) stored in branch predictor storage (e.g., a branch register(s)). In one example, the branch predictor storage (e.g., register(s)) is within a branch predictor (e.g., branch predictor circuit). In one example, the branch predictor register is one of registers 106. Additionally or alternatively, conditional branch prediction may be used to predict whether a conditional instruction (e.g., a conditional jump) will be taken (e.g., where the condition is true) or not taken (e.g., where the condition is false).

In certain examples, branch instructions are referred to as indirect branch instructions when they can address more than two targets (e.g., whatever target is specified in a register or in an indicated memory location). In one example, a branch instruction is a conditional branch instruction when the target could be either the next sequential instruction (e.g., depending on a condition) or a specified target. Certain processors (e.g., architectures) allow for direct conditional and indirect conditional branches. Certain processors (e.g., architectures) only allow for direct conditional branches. In one example, a direct unconditional branch only has a single target (e.g., as part of the code bytes of the instruction). In one example, direct conditional and/or direct unconditional branches (e.g., IPs) are stored in the branch predictor so that the next address is known before the branch address calculator (BAC) stage of a pipeline. In certain examples, indirect branches have target addresses (e.g., IPs) in the branch predictor(s), for example, along with direct branches having target addresses (e.g., IPs) in the branch predictor(s).

As one example, a branch predictor improves the functioning of a pipelined processor. A processor (e.g., microprocessor) may employ the use of pipelining to enhance performance. Within certain examples of a pipelined processor, the functional units (e.g., fetch, decode, execute, retire, etc.) for executing different stages of an instruction operate simultaneously on multiple instructions to achieve a degree of parallelism leading to performance increases over non-pipelined processors. In one example, an instruction fetch unit (e.g., circuit), an instruction decoder (e.g., decode unit or decode circuit), and an instruction execution unit (e.g., execution circuit) operate simultaneously. During one clock cycle, the instruction execution unit executes a first instruction while the instruction decoder decodes a second instruction and the fetch unit fetches a third instruction in certain examples. During a next clock cycle, the execution unit executes the newly decoded instruction while the instruction decoder decodes the newly fetched instruction and the fetch unit fetches yet another instruction in certain examples. In this manner, neither the fetch unit nor the decoder need to wait for the instruction execution unit to execute the last instruction before processing new instructions.

In some instances, instructions are executed in the sequence in which the instructions appear in program order. However, some processors allow for out-of-program-order execution of instructions. For example, a computer program may include a plurality of branch instructions (e.g., CALL, JUMP, or RETURN), which, upon execution, cause (e.g., target) instructions to be executed. More specifically, when a branch instruction is encountered in the program flow, execution continues either with the next sequential instruction or execution jumps to an instruction specified as the branch target (e.g., target instruction). Generally, the branch instruction is said to be "taken" if execution jumps to an instruction other than the next sequential instruction, and "not taken" if execution continues with the next sequential instruction. In one example, instructions may be executed in a (e.g., "out-of-order") sequence other than as set forth in the program order.

In certain examples, branch instructions are either unconditional (e.g., the branch is taken every time the instruction is executed) or conditional (e.g., the branch is dependent upon a condition), for example, where instructions to be executed following a conditional branch are not known with certainty until the condition upon which the branch depends is resolved. Here, rather than wait until the condition is resolved, a processor may perform a branch prediction to predict whether the branch will be taken or not taken, and if taken, predicts the target instruction (e.g., target address) for the branch. In one example, if the branch is predicted to be taken, the processor fetches and speculatively executes the instruction(s) found at the predicted branch target address. The instructions executed following the branch prediction are speculative in certain examples where the processor has not yet determined whether the prediction is correct. In certain examples, a processor resolves branch instructions at the back-end of the pipeline (e.g., in a retirement unit). In one example, if a branch instruction is determined to not be taken by the processor (e.g., back-end), then all instructions (e.g., and their data) presently in the pipeline behind the not taken branch instruction are flushed (e.g., discarded). In one example, a flush is performed if a prediction does not match the determined direction.

FENCEcc Support

In certain examples, the processor 100 (e.g., core 111) supports a conditional FENCE instruction (FENCEcc), for example, with its architecture property is as follows: (i) if condition of FENCEcc is satisfied, FENCEcc does not complete execution (e.g., execution completion is delayed) until all prior instructions have completed locally (e.g., all prior instructions have retired, but the instructions (e.g., store instructions) are not necessarily (e.g., globally) observable in a computing system), and execution of later instructions is delayed such that no later instruction in program order begins execution until FENCEcc completes, and (ii) if the condition of FENCEcc is not satisfied, FENCEcc and younger instructions may be executed before prior instructions in program order have completed locally (e.g., where FENCEcc is executed as a no-operation (NOP)). In both cases, no instructions after FENCEcc in program order can be executed before the condition FENCEcc depends on is resolved in certain examples. In certain examples, the condition (e.g., statically encoded in the instruction) is indicated by one of the condition codes in FIG. 3. In certain examples, the condition (e.g., dynamically determined from one or more flags) depends on the immediately prior (in program order) instruction, e.g., so that the condition is resolved (e.g., before execution of the FENCEcc) once the immediately prior (in program order) instruction is executed (e.g., and retired). In certain examples, FENCEcc conditionally performs a serializing operation on all load-from-memory instructions that were issued prior to the FENCEcc instruction. In certain examples, FENCEcc (e.g., when the condition is satisfied) does not execute until all prior instructions have completed locally, and no later instruction begins execution until FENCEcc completes. In certain examples, an instruction that loads from memory and that precedes a FENCEcc (e.g., when the condition is satisfied) receives data from memory prior to completion of the FENCEcc. In certain examples, a FENCEcc (e.g., when the condition is satisfied) that follows an instruction that stores to memory might complete before the data being stored has become globally visible. In certain examples, instructions following a FENCEcc (e.g., when the condition is satisfied) may be fetched from memory before the FENCEcc, but they will not execute (e.g., even speculatively) until the FENCEcc completes (e.g., is retired).

In certain examples, a FENCEcc can be defined with a flipped polarity, e.g., (i) if the condition of FENCEcc is not satisfied, FENCEcc does not complete execution until all prior instructions have completed locally, and no later instruction begins execution until FENCEcc completes, and (ii) if the condition of FENCEcc is satisfied, FENCEcc and younger instructions may be executed before prior instructions in program order have completed locally (e.g., where FENCEcc is executed as a NOP).

Figure 2:
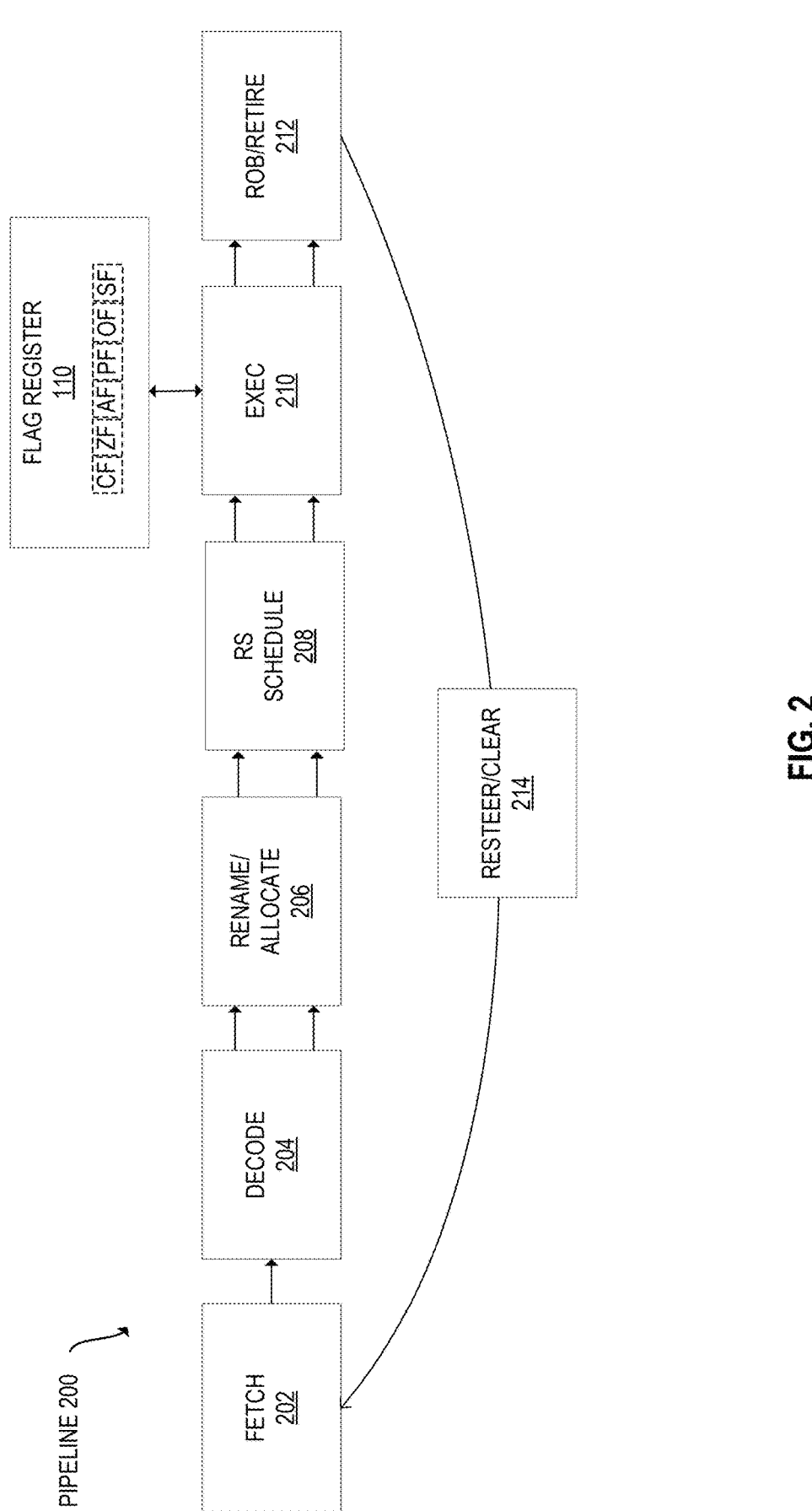
FIG. 2 illustrates a processor core pipeline according to examples of the disclosure.

FIG. 2 illustrates a processor core pipeline 200 according to examples of the disclosure. In certain examples, pipeline 200 includes a fetch 202 stage to fetch an instruction, a decode 204 stage to decode a fetched instruction into as set of one or more micro-operations for execution to perform the requested operation(s) of the instruction, a rename/allocate 206 stage to rename/allocate resources, a reservation station (RS) schedule 208 stage (e.g., to monitor operand(s) and dispatch a corresponding micro-operation for execution when the operands are ready), an execution 210 stage to execute the micro-operation, and a ROB/retire 212 stage for reordering/retirement of the micro-operation. In certain examples, for a speculatively executed instruction based on a prediction (e.g., taken or not taken) from a branch predictor, a flush is performed by resteer/clear 214 if the prediction does not match the determined direction.

In one example, pipeline 200 receives an instruction that is to perform a flag update on a flag register (e.g., flag register 110 in FIG. 1) in addition to updating a data location (e.g., data register 108 and/or a data cache). In certain examples, a FENCEcc instruction depends on flag register 110 in FIG. 1 for the condition, e.g., to control fencing (or not) by execution 210 stage.

Using FENCEcc for Side Channel (e.g., Spectre v1) Mitigation

In certain examples, to guard a conditional branch jump condition code (Jcc) (e.g., that causes a jump to a target when the condition is satisfied (e.g., true) are not jump (e.g., just fall through) when the condition is not satisfied) and prevent the Jcc from being exploited in a Spectre v1 attack, a FENCEcc is inserted at both targets of Jcc with the negated condition as the expected condition to arrive at the particular target of Jcc, e.g., if "CC" is the Jcc's condition code to transfer to the taken path, then negation of CC is the condition code of FENCEcc at the taken target; similarly, the negation of CC is the condition code to transfer to the fall through path of Jcc, thus CC is the condition code of FENCEcc at the fall through path. In certain examples when Jcc is correctly predicted, the condition of FENCEcc will not be satisfied, hence it will allow speculative execution of younger instruction once the condition is resolved (e.g., behave like a NOP). In certain examples, when Jcc is mis-predicted, the condition of FENCEcc will be satisfied, hence the FENCEcc does not complete execution until all prior instructions have completed locally, and no later instruction in program order begin execution until FENCEcc completes (e.g., behaving as an LFENCE) (e.g., stalling the mis-speculated execution until Jcc is executed and re-steers the pipeline). Compared with merely disabling the prediction of Jcc, certain examples of FENCEcc allow Jcc to be predicted, hence instructions at the predicted target of Jcc can still be fetched and decoded, but only stall the execution at the predicted target until the condition is resolved (e.g., for both cases when the condition of FENCEcc is satisfied or not).

A reason the FENCEcc instruction can be used for Spectre v1 mitigation can be made clear with the pseudocode below for a "not zero" (NZ) condition code version of FENCEcc, e.g., FENCEnz.

Pseudocode:

```
ENDBR
SUB R10d, $12345678
JZ L1//equivalent to allow prediction of JZ, but conser-
    vatively stall the execution//of JZ target until JZ is
    resolved
UD2//hash check fails, explicitly raises an exception
    (invalid opcode exception)
L1: FENCEnz//trap speculation if NZ is mis-predicted to
    Z
```

This code snippet is an example of code at the call target of a (e.g., fineIBT) fine-grained control flow integrity (CFI) hardened function. In certain examples, at the call site, the function stores a hash (e.g., compile-time constant) to a dedicated register (e.g., R10) before the indirect call. At the call target, it uses a conditional branch to check whether the hash value in R10 is as expected. If the hash matches, it allows continuing to execute at call target. In certain examples, the conditional branch that does the hash check is vulnerable to a Spectre v1 attack: if the hash does not match, JZ could still be mis-predicted as taken, violating speculative CFI. Certain examples of FENCEcc can be used to harden JZ by placing FENCEnz at the taken target of JZ. In certain examples, no instruction after FENCEnz can be executed until the condition of FENCEnz is resolved. In certain examples when NZ is mis-predicted to be Z (e.g., JZ is mis-predicted to be taken), FENCEnz is satisfied and prevents instructions at the wrong target from being speculatively executed. In certain examples when JZ is correctly predicted to be taken, FENCEnz will not impact performance since the condition can be resolved very quickly.

Note that in the above pseudocode, in certain examples the FENCEcc is only inserted at the taken target in examples when there is no security issue if JZ is mis-predicted from taken to not taken (only performance impact).

Encoding of FENCEcc

In certain examples, an FENCEcc instruction is encoded as an extension to a new or existing instruction set architecture. One example is to encode FENCEcc in a way that it can fall back to LFENCE on a legacy architecture, such as, but not limited to, x86-64. In certain examples, a motivating use case of FENCEcc is to replace LFENCE for Spectre v1 mitigation. Certain examples herein ensure that a software mitigation using FENCEcc is as secure on a legacy machine as on a new machine that supports FENCEcc. To encode FENCEcc in the LFENCE encoding space, certain examples herein find encoding space for the condition code. In certain examples, the condition code is encoded in the opcode byte, e.g., with each condition code using a new opcode.

In certain examples, the encoding of FENCEcc is in the LFENCE encoding space. In certain examples, FENCEcc uses a register-direct addressing mode field (e.g., Mod R/M in the other figures) to encode the condition code. In certain examples, FENCEcc uses the register/memory ("r/m") operand field (e.g., r/m 2046 in FIG. 20) to encode the condition code, e.g., when the field is three bits wide, providing up to eight encodings (e.g., one encoding for supporting an unconditional fence (e.g., LFENCE) and 7 encodings for supporting different FENCEcc condition codes).

FIG. 3 is a summary of example condition codes 300 according to examples of the disclosure. In certain examples, a FENCEcc instruction supports any one or proper subset of condition codes 300. Condition codes 300 includes sixteen condition codes, e.g., where the 10 in bold (e.g., the first 10 entries in the table) are a proper subset of condition codes to be supported in certain examples.

In certain examples, the BE (or NA) and LE (or NG) condition codes are disjunction conditions that can be emulated by composing two FENCEcc, e.g., the FENCEbe can be emulated by stacking FENCEz (zero) and FENCEc (carry). This can further reduce the number of condition codes supported to eight, e.g., and thus fit in a three bit wide encoding (e.g., as discussed above). Certain examples not only use r/m field of ModR/M, but also leverage a prefix byte to increase the encoding space. One extension of the ModR/M byte's r/m field is REX.B, which is enough to support ten condition codes. Alternatively, the segment override prefix can be repurposed to indicate the condition code that is being relied on by the FENCEcc instruction, e.g., where this prefix is ignored for LFENCE (but not for FENCEcc).

Certain examples herein encode FENCEcc in the LFENCE encoding space such that it is possible to leverage the ModR/M byte as well as a prefix byte to encode the condition code. In certain examples, only a subset of (e.g., commonly used) condition codes are encodable by a FENCEcc instruction. Furthermore it is possible to reduce the number of supported condition codes by composing the disjunction conditions using two FENCEcc instructions.

Certain examples herein do not use an encoding of FENCEcc to be in the LFENCE encoding space and/or do not restrict FENCEcc to be backward compatible, for example, and the encoding choices can be an Advanced Performance Extensions (APX) prefix to encode the condition code, e.g., but FENCEcc will be undefined (e.g., #UD) on a legacy machine.

Code Hardened with a FENCEcc Instruction

FENCEcc may also be used to implement comprehensive side channel (e.g., Spectre v1) mitigations by placing a FENCEcc with a negated condition code (e.g., negated from the condition code of the conditional branch) along every target of a conditional branch, e.g., as shown in FIG. 4. In certain examples, FENCEcc stalls the execution of instructions at the predicted target of a conditional branch until the condition is resolved, e.g., which performs better than disabling the prediction of conditional branches in certain examples, because it still allows to speculatively fetch and decode instructions at the predicted target of the conditional branch. In certain examples, FENCEcc enforces a property equivalent to in-order branch execution, e.g., a branch is either executed in-order or can be executed out-of-order only if the branch is correctly predicted. Because of this, in certain examples the FENCEcc does not need complicated predicate accumulation used by SLH, hence code hardened by FENCEcc in these examples will not incur code bloat issue.

FIG. 4 illustrates (400A) insecure code without hardening, (400B) code hardened with speculative load hardening, and (400C) code hardened with a conditional fence instruction 402 according to examples of the disclosure. Code in 400C includes a Jump greater than equal (Jge) instruction, which causes a jump to the target.LBB0_2 when the condition is satisfied (e.g., the GE condition is satisfied (e.g., SF flag value=OF flag value) for the previous compare (CMP) instruction). Thus, if the GE condition is satisfied (and thus there is a Jump to target .LBB0_2), the FENCEge instruction should be jumped over, but if the code 400C falls through even for a GE condition is satisfied (e.g., as caused by speculative execution), the FENCEge is to cause a fence because the GE condition is satisfied, and thus FENCEge 402 does not complete execution until all prior instructions have completed, and no later instruction in program order begins execution until FENCEge 402 completes.

Comparison of LFENCE and FENCEcc

Certain examples of FENCEcc (e.g., unlike certain examples of LFENCE) allow younger instructions to execute as soon as the condition resolves and is not satisfied. In certain examples, the condition will resolve (and thus satisfy the condition that FENCEcc is waiting on) much sooner than the point at which all older instructions reach retirement as with LFENCE. For example, consider once again the (e.g., FineIBT) example shown in the pseudocodes below. Pseudocode (with FENCEnz) shows that code after label L1 can safely execute as soon as the subtract (SUB) instruction updates the flag register (e.g., EFLAGS), while the pseudocode (with LFENCE) is to wait until the jump if zero (JZ) instruction and all older instructions retire.

Pseudocode (with FENCEnz):

```
ENDBR
SUB R10d, $12345678
JZL1
UD2
L1: FENCEnz//trap speculation if NZ is mis-predicted to
    Z
```

Pseudocode (with LFENCE):

```
ENDBR
SUB R10d, $12345678
JZL1
UD2
L1: LFENCE
```

Alternative Example That Uses a Statically Predicted Branch

In certain examples, an (e.g., x86) ISA has two branch hint prefixes (e.g., 0x2E and 0x3E). If a microarchitecture can enforce a conditional branch with branch hint prefix to (e.g., always) statically predict the direction specified in the prefix, a conditional branch with branch hint prefix can be used to emulate FENCEcc. In certain examples, an alternative instruction for FENCEcc functionality is a statically predicted conditional branch. Certain examples emulate FENCEcc using a statically predicted Jcc and a LFENCE as shown in FIG. 5.

Figure 5:
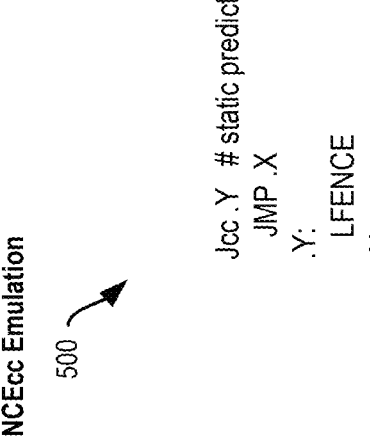
FIG. 5 is an emulation of a conditional fence instruction according to examples of the disclosure.

FIG. 5 is an emulation 500 of a conditional fence instruction according to examples of the disclosure. In certain examples, such the jump if condition code (Jcc) instruction is statically predicted as taken, it (e.g., always) hits LFENCE first, thus: (1) if the condition is satisfied, Jcc is correctly predicted and LFENCE takes effect, and (2) if the condition is not satisfied, Jcc is mis-predicted, and will release LFENCE (e.g., via jump execute clear (jeclear), e.g., that jumps a misprediction to resteer/clear).

In certain examples, using a statically predicted conditional branch to emulate FENCEcc may not be as efficient as a native FENCEcc instruction, e.g., due to code bloat as well as relying on jeclear in the case of correct prediction. However, it may have the advantage of leveraging existing ISA and a statically predicted conditional branch may also have other use cases, e.g., to improve performance in the scenario where software knows the direction of a conditional branch or facilitate software to debug side channel (e.g., Spectre v1) gadgets by forcing a conditional branch to execute a certain path.

In certain examples, branch hint prefixes today are only a hint to the processor, and there is no guarantee a processor will implement this branch hint. In fact, certain microarchitectures may choose to ignore these prefixes. Hence, certain examples herein repurpose these branch hint prefixes to enforce statically predicted branch, but it may fall back to a dynamically predicted branch, e.g., on legacy machine. In certain examples, this is not a desired property if using a statically predicted branch to emulate FENCEcc, e.g., in which case the preferred behavior on legacy machine is to fall back to a NOP for statically predicted branch. In this case, a preferred encoding is not using existing branch hint prefixes, but new conditional branch instructions (e.g., encoding 16 condition codes or a subset of commonly used condition code) in the NOP encoding space.

ISA for a FENCEcc instruction

Figure 6:
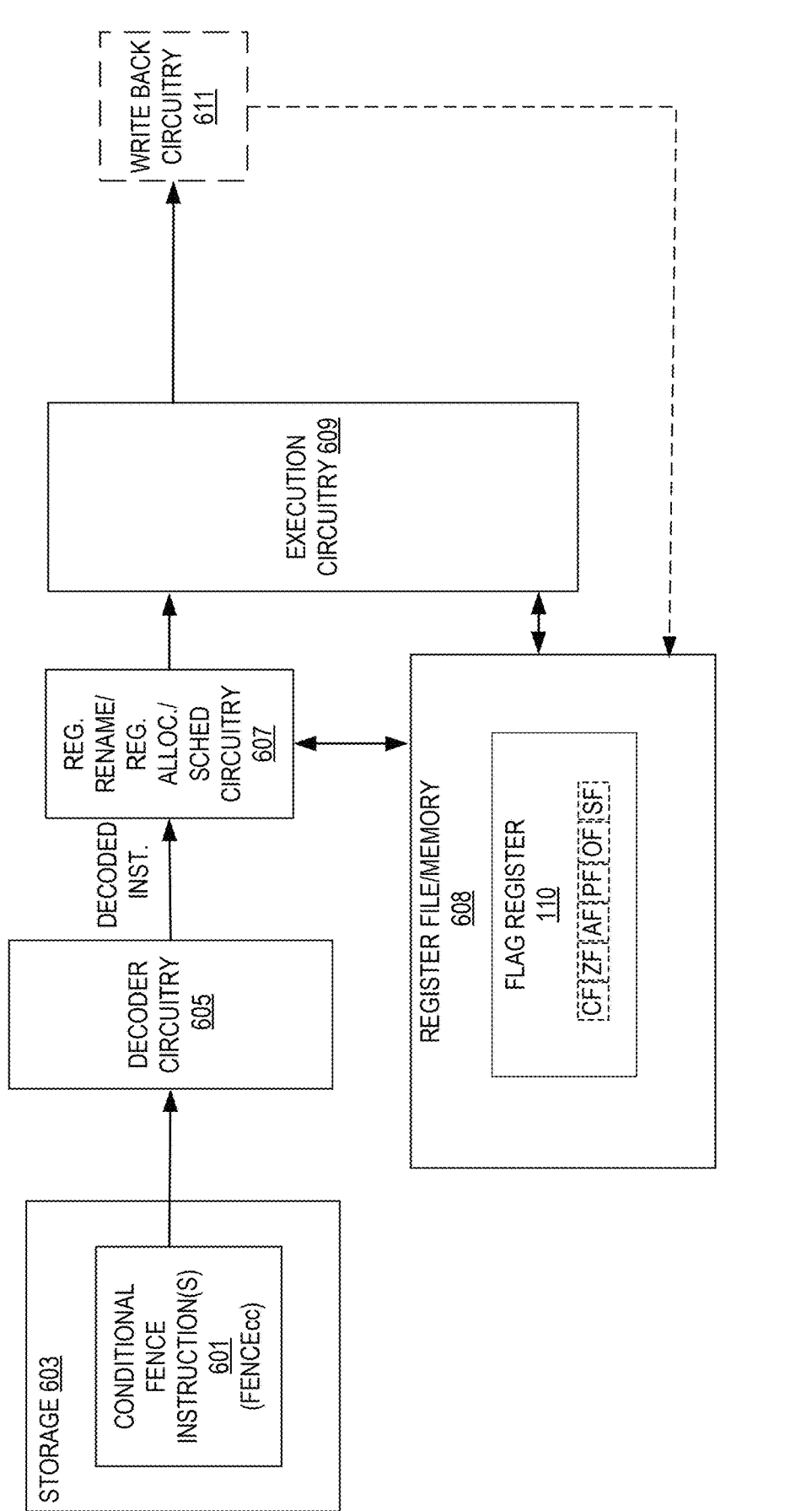
FIG. 6 illustrates examples of computing hardware to process a FENCEcc instruction(s) according to examples of the disclosure.

FIG. 6 illustrates examples of computing hardware to process a FENCEcc instruction(s) according to examples of the disclosure. As illustrated, storage 603 stores a FENCEcc instruction 601 to be executed.

The instruction 601 is received by decoder circuitry 605. For example, the decoder circuitry 605 receives this instruction from fetch circuitry (not shown). The instruction may be in any suitable format, such as that described with reference to FIG. 19 below. In certain examples, the instruction includes a field that indicates a condition (e.g., a condition code to be compared with one or more flags) to be set by execution of another instruction, and an opcode that indicates execution circuitry is to: (i) in response to the condition not being currently resolved, stall instructions after the instruction in program order from execution until the condition is resolved; (ii) in response to the condition being satisfied, implement an execution fence to cause this instruction to not complete execution until all prior instruction in program order are executed (e.g., locally), and (e.g., subsequent/younger) instructions after this instruction in program order to not execute until this instruction completes (e.g., executes) (e.g., locally) and (iii) in response to condition code not being satisfied, allow one or more instructions after the instruction in program order to execute after the condition is resolved (e.g., to execute out of program order).

In certain examples, the source(s) are register(s), and in other examples one or more are memory locations. In certain examples, one or more of the sources may be an immediate operand.

More detailed examples of at least one instruction format for the instruction are detailed below. The decoder circuitry 605 decodes the instruction into one or more operations. In some examples, this decoding includes generating a plurality of micro-operations to be performed by execution circuitry. In certain examples, the decoder circuitry 605 also decodes instruction prefixes.

In some examples, register renaming, register allocation, and/or scheduling circuitry 607 provides functionality for one or more of: 1) renaming logical operand values to physical operand values (e.g., a register alias table in some examples), 2) allocating status bits and flags to the decoded instruction, and 3) scheduling the decoded instruction for execution by execution circuitry out of an instruction pool (e.g., using a reservation station in some examples).

Registers (register file) (e.g., flag register 110) and/or memory 608 store data as operands of the instruction to be operated by execution circuitry 609. Example register types include packed data registers, general purpose registers (GPRs), and floating-point registers.

Execution circuitry 609 executes the decoded instruction. Example detailed execution circuitry includes execution circuitry 111(1)-EXEC or 111(N)-EXEC shown in FIG. 1, and execution cluster(s) 1660 shown in FIG. 16B, etc. In certain examples, the execution of the decoded instruction causes the execution circuitry to perform the conditional fence operation (e.g., step or steps) according to the opcode.

In some examples, retirement/write back circuitry 611 architecturally commits the destination register(s) into the registers or memory 608 and retires the instruction.

An example of a format for a FENCEcc (e.g., FENCEcc mnemonic where cc is the two letter abbreviation for the condition code, see, e.g., FIG. 3) instruction is OPCODE, e.g., where the OPCODE also includes a field that indicates the condition code (cc). In some examples, the opcode is provided by field 1903, 2712, or 2904. In some examples, source and/or destination locations are provided by one or more of bits from a prefix 1901 (e.g., R-bit, VVVV, etc.), addressing information 1905 (e.g., reg 2044, R/M 2046, SIB byte 2004, etc.), 2718, 2720, 2722, 2724, 2726, etc.

FIG. 7 illustrates an example method performed by a processor to process a FENCEcc instruction according to examples of the disclosure. For example, a processor core as shown in FIG. 16B, FIG. 1, FIG. 6, a pipeline as detailed below, etc., performs this method.

At 701, an instance of single instruction is fetched. For example, a switch subprocess (e.g., switch memory tag table) instruction is fetched. In certain examples, the instruction includes a field that indicates a condition (e.g., condition code to be compared with one or more flags) to be set by execution of another instruction, and an opcode that indicates execution circuitry is to: (i) in response to the condition not being currently resolved, stall instructions after the instruction in program order from execution until the condition is resolved; (ii) in response to the condition being satisfied, implement an execution fence to cause this instruction to not complete execution until all prior instruction in program order are executed (e.g., locally), and (e.g., subsequent/younger) instructions after this instruction in program order to not execute until this instruction completes (e.g., executes) (e.g., locally) and (iii) in response to the condition not being satisfied, allow one or more instructions after the instruction in program order to execute after the condition is resolved. In some examples, the instruction further includes a field for a writemask.

In some examples, the instruction is fetched from an instruction cache. The opcode indicates the operations to perform.

The fetched instruction is decoded at 703. For example, the fetched FENCEcc instruction is decoded by decoder circuitry such as decoder circuitry in FIG. 1, decoder circuitry in FIG. 6, or decode circuitry 1640 detailed herein.

Data values associated with the source operands of the decoded instruction are retrieved when the decoded instruction is scheduled at 705. For example, when one or more of the source operands are memory operands, the data from the indicated memory location is retrieved.

At 707, the decoded instruction is executed by execution circuitry (hardware) such as execution circuitry shown in FIG. 1, execution circuitry shown in FIG. 6, or execution cluster(s) 1660 shown in FIG. 16B. In certain examples, for the FENCEcc instruction, the execution will cause execution circuitry to perform the operations described above.

In some examples, the instruction is committed or retired at 709.

FIG. 8 illustrates an example method to process a FENCEcc instruction using emulation or binary translation according to examples of the disclosure.

For example, a processor core as shown in FIG. 16B, FIG. 1, FIG. 6, a pipeline and/or emulation/translation layer perform aspects of this method.

An instance of a single instruction of a first instruction set architecture is fetched at 801. The instance of the single instruction of the first instruction set architecture includes an a field that indicates a condition (e.g., a condition code to be compared with one or more flags) to be set by execution of another instruction, and an opcode that indicates execution circuitry is to: (i) in response to the condition not being currently resolved, stall instructions after the instruction in program order from execution until the condition is resolved; (ii) in response to the condition being satisfied, implement an execution fence to cause this instruction to not complete execution until all prior instruction in program order are executed (e.g., locally), and (e.g., subsequent/younger) instructions after this instruction in program order to not execute until this instruction completes (e.g., executes) (e.g., locally) and (iii) in response to the condition not being satisfied, allow one or more instructions after the instruction in program order to execute after the condition is resolved. In some examples, the instruction further includes a field for a writemask. In some examples, the instruction is fetched from an instruction cache. The opcode indicates the operations to perform.

Figure 30:
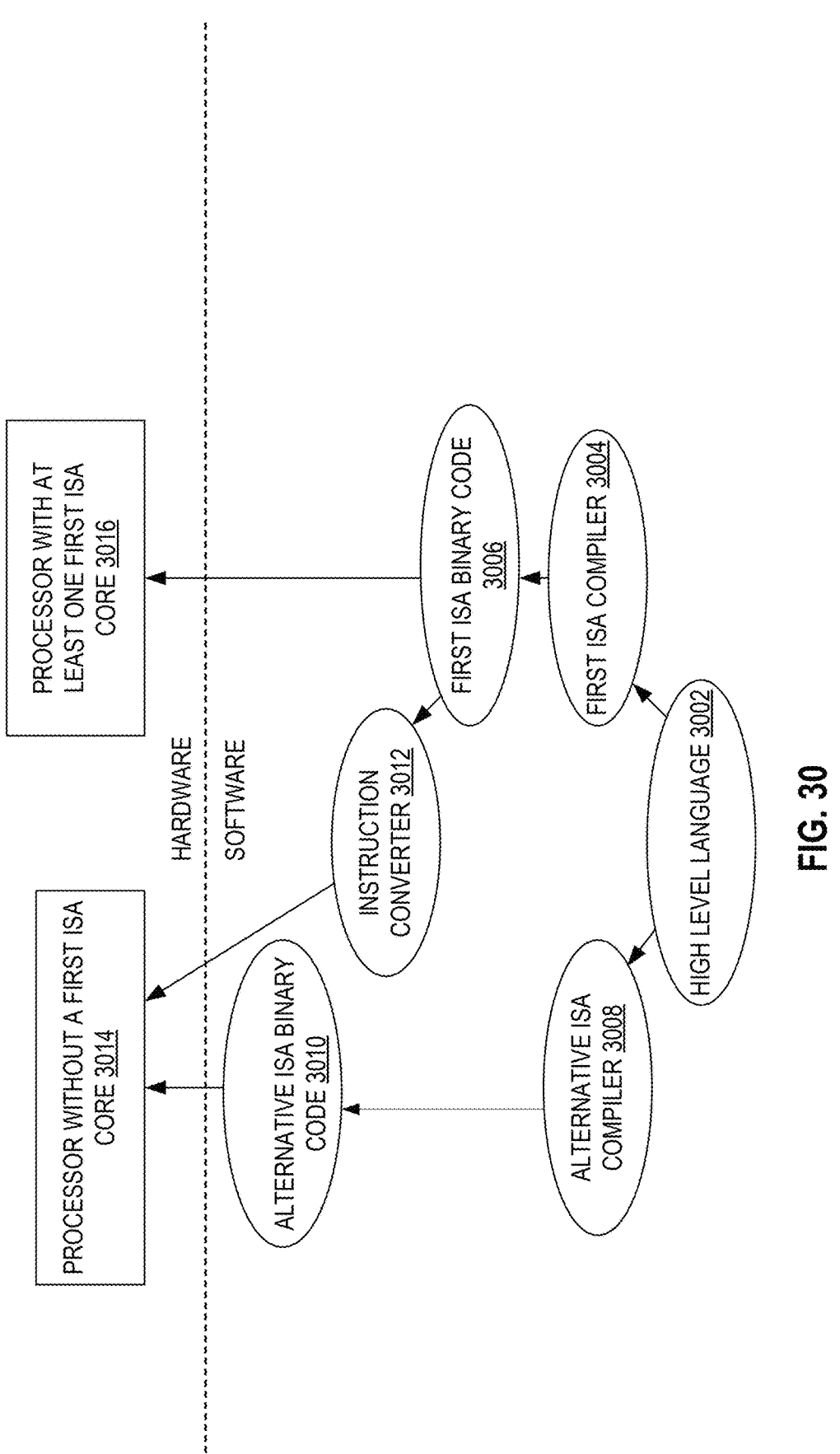
FIG. 30 is a block diagram illustrating the use of a software instruction converter to convert binary instructions in a source ISA to binary instructions in a target ISA according to examples.

The fetched single instruction of the first instruction set architecture is translated into one or more instructions of a second instruction set architecture at 802. This translation is performed by a translation and/or emulation layer of software in some examples. In some examples, this translation is performed by an instruction converter 3012 as shown in FIG. 30. In some examples, the translation is performed by hardware translation circuitry.

The one or more translated instructions of the second instruction set architecture are decoded at 803. For example, the translated instructions are decoded by decoder circuitry such as decoder circuitry in FIG. 1, decoder circuitry in FIG. 6, or decode circuitry 1640 detailed herein. In some examples, the operations of translation and decoding at 802 and 803 are merged.

Data values associated with the source operand(s) of the decoded one or more instructions of the second instruction set architecture are retrieved and the one or more instructions are scheduled at 805. For example, when one or more of the source operands are memory operands, the data from the indicated memory location is retrieved.

At 807, the decoded instruction(s) of the second instruction set architecture is/are executed by execution circuitry (hardware) such as execution circuitry shown in FIG. 1, execution circuitry shown in FIG. 6, or execution cluster(s) 1660 shown in FIG. 16B, to perform the operation(s) indicated by the opcode of the single instruction of the first instruction set architecture. In certain examples, for the FENCEcc instruction, the execution will cause execution circuitry to perform the operations described above.

In some examples, the instruction is committed or retired at 809.

Some examples utilize instruction formats described herein. Some examples are implemented in one or more computer architectures, cores, accelerators, etc. Some examples are generated or are IP cores. Some examples utilize emulation and/or translation.

At least some examples of the disclosed technologies can be described in view of the following sets of examples.

Example 1. An apparatus comprising:

a branch predictor to predict one of a taken path and a not taken path for a conditional branch instruction;

decoder circuitry to decode an instruction into a decoded instruction, the instruction comprising a field that indicates a condition to be set by execution of another instruction, and an opcode that indicates execution circuitry is to, in response to the condition being satisfied, implement an execution fence to delay execution of the instruction until prior instructions in program order execute and delay execution of instructions after the instruction in program order until the instruction executes; and the execution circuitry to execute the decoded instruction according to the opcode.

Example 2. The apparatus of example 1, wherein the opcode further indicates the execution circuitry is to, in response to the condition not being currently resolved, delay execution of the instructions after the instruction in program order until the condition is resolved.

Example 3. The apparatus of any one of examples 1-2, wherein the opcode further indicates the execution circuitry is to, in response to the condition not being satisfied, allow one or more of the instructions after the instruction in program order to execute before execution of one or more of the prior instructions.

Example 4. The apparatus of example 3, wherein the opcode further indicates the execution circuitry is to, in response to the condition not being satisfied, execute the instruction as a no-operation.

Example 5. The apparatus of any one of examples 1-4, further comprising a flag register, wherein the condition refers to a flag of the flag register.

Example 6. The apparatus of any one of examples 1-5, wherein the field that indicates the condition is a register-direct addressing mode field of the instruction.

Example 7. The apparatus of example 6, wherein the field is a register operand field of the register-direct addressing mode field.

Example 8. A method comprising:

predicting, by a branch predictor, one of a taken path and a not taken path for a conditional branch instruction prior to an instruction that immediately follows the conditional branch instruction in program order;

decoding, by decoder circuitry, the instruction into a decoded instruction, the instruction comprising a field that indicates a condition to be set by execution of another instruction, and an opcode that indicates execution circuitry is to, in response to the condition being satisfied, implement an execution fence to delay execution of the instruction until prior instructions in program order execute and delay execution of instructions after the instruction in program order until the instruction executes; and executing, by the execution circuitry, the decoded instruction according to the opcode.

Example 9. The method of example 8, wherein the opcode further indicates the execution circuitry is to, in response to the condition not being currently resolved, delay execution of the instructions after the instruction in program order until the condition is resolved.

Example 10. The method of any one of examples 8-9, wherein the opcode further indicates the execution circuitry is to, in response to the condition not being satisfied, allow one or more of the instructions after the instruction in program order to execute before executing one or more of the prior instructions.

Example 11. The method of example 10, wherein the opcode further indicates the execution circuitry is to, in response to the condition not being satisfied, execute the instruction as a no-operation.

Example 12. The method of any one of examples 8-11, further comprising a flag register, wherein the condition refers to a flag of the flag register.

Example 13. The method of any one of examples 8-12, wherein the field that indicates the condition is a register-direct addressing mode field of the instruction.

Example 14. The method of example 13, wherein the field is a register operand field of the register-direct addressing mode field.

Example 15. A non-transitory machine-readable medium that stores code that when executed by a machine causes the machine to perform a method comprising:

predicting, by a branch predictor, one of a taken path and a not taken path for a conditional branch instruction prior to an instruction that immediately follows the conditional branch instruction in program order;

decoding, by decoder circuitry, the instruction into a decoded instruction, the instruction comprising a field that indicates a condition to be set by execution of another instruction, and an opcode that indicates execution circuitry is to, in response to the condition being satisfied, implement an execution fence to delay execution of the instruction until prior instructions in program order execute and delay execution of instructions after the instruction in program order until the instruction executes; and executing, by the execution circuitry, the decoded instruction according to the opcode.

Example 16. The non-transitory machine-readable medium of example 15, wherein the opcode further indicates the execution circuitry is to, in response to the condition not being currently resolved, delay execution of the instructions after the instruction in program order until the condition is resolved.

Example 17. The non-transitory machine-readable medium of any one of examples 15-16, wherein the opcode further indicates the execution circuitry is to, in response to the condition not being satisfied, allow one or more of the instructions after the instruction in program order to execute before executing one or more of the prior instructions.

Example 18. The non-transitory machine-readable medium of example 17, wherein the opcode further indicates the execution circuitry is to, in response to the condition not being satisfied, execute the instruction as a no-operation.

Example 19. The non-transitory machine-readable medium of any one of examples 15-18, further comprising a flag register, wherein the condition refers to a flag of the flag register.

Example 20. The non-transitory machine-readable medium of any one of examples 15-19, wherein the field that indicates the condition is a register-direct addressing mode field of the instruction.

Example 21. The non-transitory machine-readable medium of example 20, wherein the field is a register operand field of the register-direct addressing mode field.

Exemplary architectures, systems, etc. that the above may be used in are detailed below. Exemplary instruction formats for FENCEcc instructions are detailed below.

Example Architectures

Detailed below are descriptions of example computer architectures. Other system designs and configurations known in the arts for laptop, desktop, and handheld personal computers (PC) s, personal digital assistants, engineering workstations, servers, disaggregated servers, network devices, network hubs, switches, routers, embedded processors, digital signal processors (DSPs), graphics devices, video game devices, set-top boxes, micro controllers, cell phones, portable media players, hand-held devices, and various other electronic devices, are also suitable. In general, a variety of systems or electronic devices capable of incorporating a processor and/or other execution logic as disclosed herein are generally suitable.

Example Systems

Figure 9:
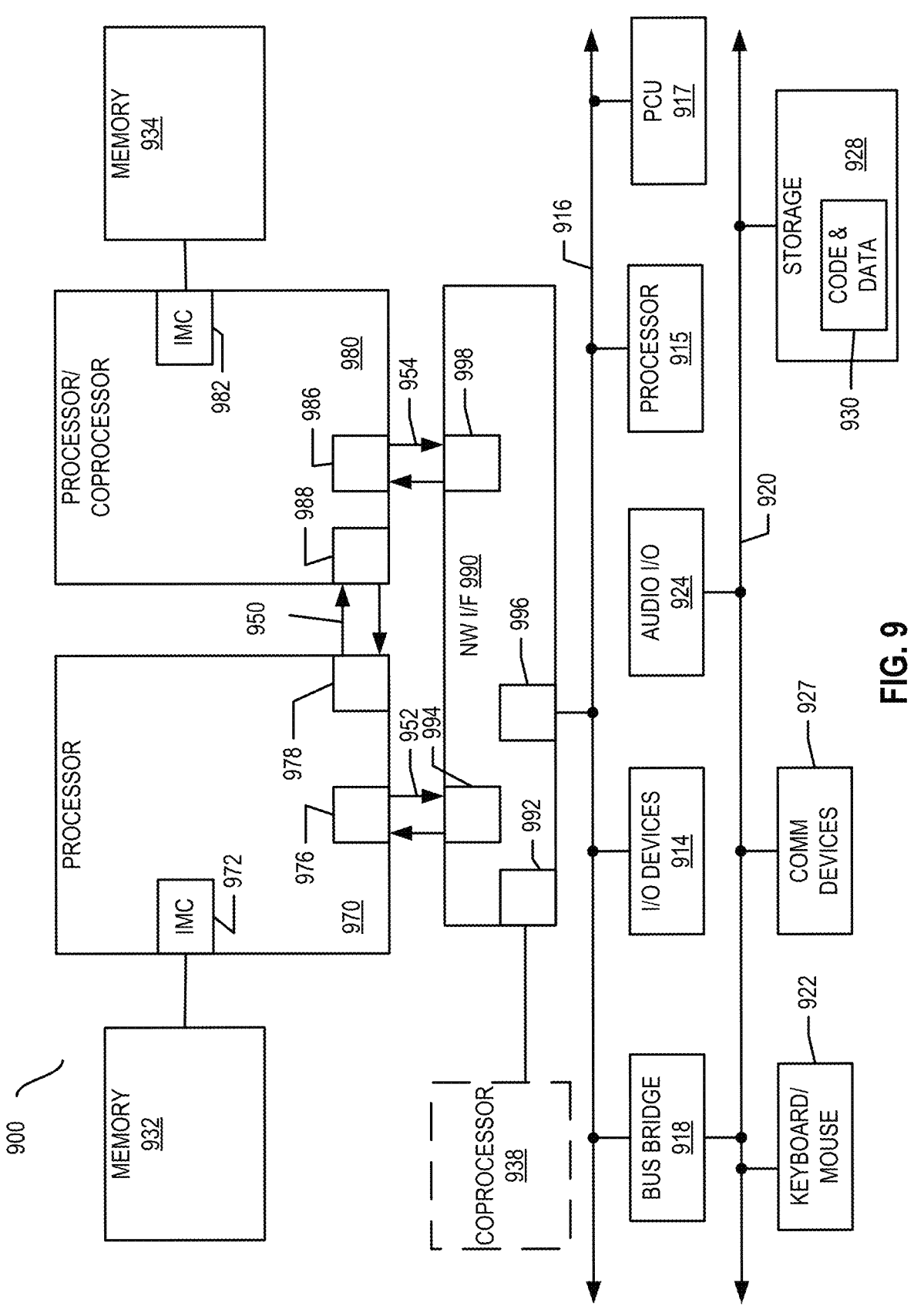
FIG. 9 illustrates an example computing system.

FIG. 9 illustrates an example computing system. Multiprocessor system 900 is an interfaced system and includes a plurality of processors or cores including a first processor 970 and a second processor 980 coupled via an interface 950 such as a point-to-point (P-P) interconnect, a fabric, and/or bus. In some examples, the first processor 970 and the second processor 980 are homogeneous. In some examples, first processor 970 and the second processor 980 are heterogenous. Though the example system 900 is shown to have two processors, the system may have three or more processors, or may be a single processor system. In some examples, the computing system is a system on a chip (SoC).

Processors 970 and 980 are shown including integrated memory controller (IMC) circuitry 972 and 982, respectively. Processor 970 also includes interface circuits 976 and 978; similarly, second processor 980 includes interface circuits 986 and 988. Processors 970, 980 may exchange information via the interface 950 using interface circuits 978, 988. IMCs 972 and 982 couple the processors 970, 980 to respective memories, namely a memory 932 and a memory 934, which may be portions of main memory locally attached to the respective processors.

Processors 970, 980 may each exchange information with a network interface (NW I/F) 990 via individual interfaces 952, 954 using interface circuits 976, 994, 986, 998. The network interface 990 (e.g., one or more of an interconnect, bus, and/or fabric, and in some examples is a chipset) may optionally exchange information with a coprocessor 938 via an interface circuit 992. In some examples, the coprocessor 938 is a special-purpose processor, such as, for example, a high-throughput processor, a network or communication processor, compression engine, graphics processor, general purpose graphics processing unit (GPGPU), neural-network processing unit (NPU), embedded processor, or the like.

A shared cache (not shown) may be included in either processor 970, 980 or outside of both processors, yet connected with the processors via an interface such as P-P interconnect, such that either or both processors' local cache information may be stored in the shared cache if a processor is placed into a low power mode.

Network interface 990 may be coupled to a first interface 916 via interface circuit 996. In some examples, first interface 916 may be an interface such as a Peripheral Component Interconnect (PCI) interconnect, a PCI Express interconnect or another I/O interconnect. In some examples, first interface 916 is coupled to a power control unit (PCU) 917, which may include circuitry, software, and/or firmware to perform power management operations with regard to the processors 970, 980 and/or co-processor 938. PCU 917 provides control information to a voltage regulator (not shown) to cause the voltage regulator to generate the appropriate regulated voltage. PCU 917 also provides control information to control the operating voltage generated. In various examples, PCU 917 may include a variety of power management logic units (circuitry) to perform hardware-based power management. Such power management may be wholly processor controlled (e.g., by various processor hardware, and which may be triggered by workload and/or power, thermal or other processor constraints) and/or the power management may be performed responsive to external sources (such as a platform or power management source or system software).

PCU 917 is illustrated as being present as logic separate from the processor 970 and/or processor 980. In other cases, PCU 917 may execute on a given one or more of cores (not shown) of processor 970 or 980. In some cases, PCU 917 may be implemented as a microcontroller (dedicated or general-purpose) or other control logic configured to execute its own dedicated power management code, sometimes referred to as P-code. In yet other examples, power management operations to be performed by PCU 917 may be implemented externally to a processor, such as by way of a separate power management integrated circuit (PMIC) or another component external to the processor. In yet other examples, power management operations to be performed by PCU 917 may be implemented within BIOS or other system software.

Various I/O devices 914 may be coupled to first interface 916, along with a bus bridge 918 which couples first interface 916 to a second interface 920. In some examples, one or more additional processor(s) 915, such as coprocessors, high throughput many integrated core (MIC) processors, GPGPUs, accelerators (such as graphics accelerators or digital signal processing (DSP) units), field programmable gate arrays (FPGAs), or any other processor, are coupled to first interface 916. In some examples, second interface 920 may be a low pin count (LPC) interface. Various devices may be coupled to second interface 920 including, for example, a keyboard and/or mouse 922, communication devices 927 and storage circuitry 928. Storage circuitry 928 may be one or more non-transitory machine-readable storage media as described below, such as a disk drive or other mass storage device which may include instructions/code and data 930 and may implement the storage 603 in some examples. Further, an audio I/O 924 may be coupled to second interface 920. Note that other architectures than the point-to-point architecture described above are possible. For example, instead of the point-to-point architecture, a system such as multiprocessor system 900 may implement a multidrop interface or other such architecture.

Example Core Architectures, Processors, and Computer Architectures.

Processor cores may be implemented in different ways, for different purposes, and in different processors. For instance, implementations of such cores may include: 1) a general purpose in-order core intended for general-purpose computing; 2) a high-performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput) computing. Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip (SoC) that may be included on the same die as the described CPU (sometimes referred to as the application core(s) or application processor(s)), the above described coprocessor, and additional functionality. Example core architectures are described next, followed by descriptions of example processors and computer architectures.

Figure 10:
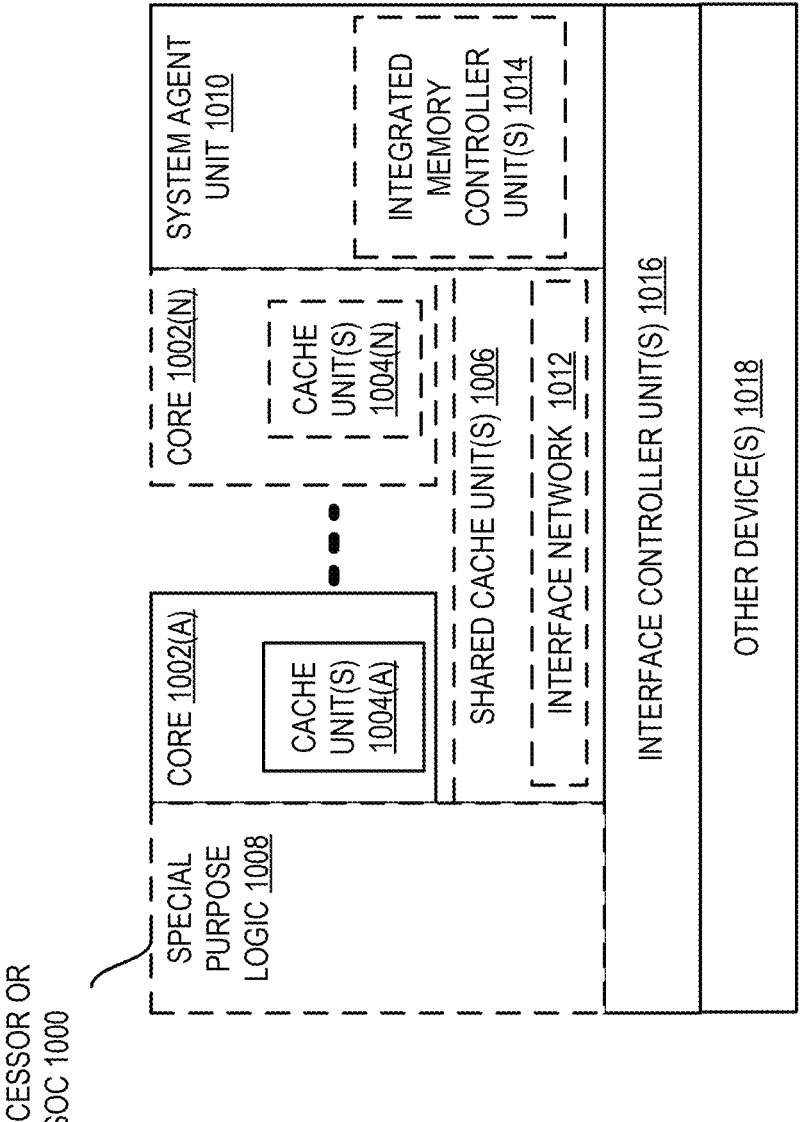
FIG. 10 illustrates a block diagram of an example processor and/or System on a Chip (SoC) that may have one or more cores and an integrated memory controller.

FIG. 10 illustrates a block diagram of an example processor and/or SoC 1000 that may have one or more cores and an integrated memory controller. The solid lined boxes illustrate a processor 1000 with a single core 1002(A), system agent unit circuitry 1010, and a set of one or more interface controller unit(s) circuitry 1016, while the optional addition of the dashed lined boxes illustrates an alternative processor 1000 with multiple cores 1002(A)-(N), a set of one or more integrated memory controller unit(s) circuitry 1014 in the system agent unit circuitry 1010, and special purpose logic 1008, as well as a set of one or more interface controller units circuitry 1016. Note that the processor 1000 may be one of the processors 970 or 980, or co-processor 938 or 915 of FIG. 9.

Thus, different implementations of the processor 1000 may include: 1) a CPU with the special purpose logic 1008 being integrated graphics and/or scientific (throughput) logic (which may include one or more cores, not shown), and the cores 1002(A)-(N) being one or more general purpose cores (e.g., general purpose in-order cores, general purpose out-of-order cores, or a combination of the two); 2) a coprocessor with the cores 1002(A)-(N) being a large number of special purpose cores intended primarily for graphics and/or scientific (throughput); and 3) a coprocessor with the cores 1002(A)-(N) being a large number of general purpose in-order cores. Thus, the processor 1000 may be a general-purpose processor, coprocessor or special-purpose processor, such as, for example, a network or communication processor, compression engine, graphics processor, GPGPU (general purpose graphics processing unit), a high throughput many integrated core (MIC) coprocessor (including 30 or more cores), embedded processor, or the like. The processor may be implemented on one or more chips. The processor 1000 may be a part of and/or may be implemented on one or more substrates using any of a number of process technologies, such as, for example, complementary metal oxide semiconductor (CMOS), bipolar CMOS (BiCMOS), P-type metal oxide semiconductor (PMOS), or N-type metal oxide semiconductor (NMOS).

A memory hierarchy includes one or more levels of cache unit(s) circuitry 1004(A)-(N) within the cores 1002(A)-(N), a set of one or more shared cache unit(s) circuitry 1006, and external memory (not shown) coupled to the set of integrated memory controller unit(s) circuitry 1014. The set of one or more shared cache unit(s) circuitry 1006 may include one or more mid-level caches, such as level 2 (L2), level 3 (L3), level 4 (L4), or other levels of cache, such as a last level cache (LLC), and/or combinations thereof. While in some examples interface network circuitry 1012 (e.g., a ring interconnect) interfaces the special purpose logic 1008 (e.g., integrated graphics logic), the set of shared cache unit(s) circuitry 1006, and the system agent unit circuitry 1010, alternative examples use any number of well-known techniques for interfacing such units. In some examples, coherency is maintained between one or more of the shared cache unit(s) circuitry 1006 and cores 1002(A)-(N). In some examples, interface controller units circuitry 1016 couple the cores 1002 to one or more other devices 1018 such as one or more I/O devices, storage, one or more communication devices (e.g., wireless networking, wired networking, etc.), etc.

In some examples, one or more of the cores 1002(A)-(N) are capable of multi-threading. The system agent unit circuitry 1010 includes those components coordinating and operating cores 1002(A)-(N). The system agent unit circuitry 1010 may include, for example, power control unit (PCU) circuitry and/or display unit circuitry (not shown). The PCU may be or may include logic and components needed for regulating the power state of the cores 1002(A)-(N) and/or the special purpose logic 1008 (e.g., integrated graphics logic). The display unit circuitry is for driving one or more externally connected displays.

The cores 1002(A)-(N) may be homogenous in terms of instruction set architecture (ISA). Alternatively, the cores 1002(A)-(N) may be heterogeneous in terms of ISA; that is, a subset of the cores 1002(A)-(N) may be capable of executing an ISA, while other cores may be capable of executing only a subset of that ISA or another ISA.

FIG. 11 is a block diagram illustrating a computing system 1100 configured to implement one or more aspects of the examples described herein. The computing system 1100 includes a processing subsystem 1101 having one or more processor(s) 1102 and a system memory 1104 communicating via an interconnection path that may include a memory hub 1105. The memory hub 1105 may be a separate component within a chipset component or may be integrated within the one or more processor(s) 1102. The memory hub 1105 couples with an I/O subsystem 1111 via a communication link 1106. The I/O subsystem 1111 includes an I/O hub 1107 that can enable the computing system 1100 to receive input from one or more input device(s) 1108. Additionally, the I/O hub 1107 can enable a display controller, which may be included in the one or more processor(s) 1102, to provide outputs to one or more display device(s) 1110A. In some examples the one or more display device(s) 1110A coupled with the I/O hub 1107 can include a local, internal, or embedded display device.

The processing subsystem 1101, for example, includes one or more parallel processor(s) 1112 coupled to memory hub 1105 via a bus or other communication link 1113. The communication link 1113 may be one of any number of standards-based communication link technologies or protocols, such as, but not limited to PCI Express, or may be a vendor specific communications interface or communications fabric. The one or more parallel processor(s) 1112 may form a computationally focused parallel or vector processing system that can include a large number of processing cores and/or processing clusters, such as a many integrated core (MIC) processor. For example, the one or more parallel processor(s) 1112 form a graphics processing subsystem that can output pixels to one of the one or more display device(s) 1110A coupled via the I/O hub 1107. The one or more parallel processor(s) 1112 can also include a display controller and display interface (not shown) to enable a direct connection to one or more display device(s) 1110B.

Within the I/O subsystem 1111, a system storage unit 1114 can connect to the I/O hub 1107 to provide a storage mechanism for the computing system 1100. An I/O switch 1116 can be used to provide an interface mechanism to enable connections between the I/O hub 1107 and other components, such as a network adapter 1118 and/or wireless network adapter 1119 that may be integrated into the platform, and various other devices that can be added via one or more add-in device(s) 1120. The add-in device(s) 1120 may also include, for example, one or more external graphics processor devices, graphics cards, and/or compute accelerators. The network adapter 1118 can be an Ethernet adapter or another wired network adapter. The wireless network adapter 1119 can include one or more of a Wi-Fi, Bluetooth, near field communication (NFC), or other network device that includes one or more wireless radios.

The computing system 1100 can include other components not explicitly shown, including USB or other port connections, optical storage drives, video capture devices, and the like, which may also be connected to the I/O hub 1107. Communication paths interconnecting the various components in FIG. 11 may be implemented using any suitable protocols, such as PCI (Peripheral Component Interconnect) based protocols (e.g., PCI-Express), or any other bus or point-to-point communication interfaces and/or protocol(s), such as the NVLink high-speed interconnect, Compute Express Link™ (CXL™) (e.g., CXL.mem), Infinity Fabric (IF), Ethernet (IEEE 802.3), remote direct memory access (RDMA), InfiniBand, Internet Wide Area RDMA Protocol (iWARP), Transmission Control Protocol (TCP), User Datagram Protocol (UDP), quick UDP Internet Connections (QUIC), RDMA over Converged Ethernet (ROCE), Intel QuickPath Interconnect (QPI), Intel Ultra Path Interconnect (UPI), Intel On-Chip System Fabric (IOSF), Omnipath, HyperTransport, Advanced Microcontroller Bus Architecture (AMBA) interconnect, OpenCAPI, Gen-Z, Cache Coherent Interconnect for Accelerators (CCIX), 3GPP Long Term Evolution (LTE) (4G), 3GPP 5G, and variations thereof, or wired or wireless interconnect protocols known in the art. In some examples, data can be copied or stored to virtualized storage nodes using a protocol such as non-volatile memory express (NVMe) over Fabrics (NVMe-oF) or NVMe.

The one or more parallel processor(s) 1112 may incorporate circuitry optimized for graphics and video processing, including, for example, video output circuitry, and constitutes a graphics processing unit (GPU). Alternatively or additionally, the one or more parallel processor(s) 1112 can incorporate circuitry optimized for general purpose processing, while preserving the underlying computational architecture, described in greater detail herein. Components of the computing system 1100 may be integrated with one or more other system elements on a single integrated circuit. For example, the one or more parallel processor(s) 1112, memory hub 1105, processor(s) 1102, and I/O hub 1107 can be integrated into a system on chip (SoC) integrated circuit. Alternatively, the components of the computing system 1100 can be integrated into a single package to form a system in package (SIP) configuration. In some examples at least a portion of the components of the computing system 1100 can be integrated into a multi-chip module (MCM), which can be interconnected with other multi-chip modules into a modular computing system.

It will be appreciated that the computing system 1100 shown herein is illustrative and that variations and modifications are possible. The connection topology, including the number and arrangement of bridges, the number of processor(s) 1102, and the number of parallel processor(s) 1112, may be modified as desired. For instance, system memory 1104 can be connected to the processor(s) 1102 directly rather than through a bridge, while other devices communicate with system memory 1104 via the memory hub 1105 and the processor(s) 1102. In other alternative topologies, the parallel processor(s) 1112 are connected to the I/O hub 1107 or directly to one of the one or more processor(s) 1102, rather than to the memory hub 1105. In other examples, the I/O hub 1107 and memory hub 1105 may be integrated into a single chip. It is also possible that two or more sets of processor(s) 1102 are attached via multiple sockets, which can couple with two or more instances of the parallel processor(s) 1112.

Some of the particular components shown herein are optional and may not be included in all implementations of the computing system 1100. For example, any number of add-in cards or peripherals may be supported, or some components may be eliminated. Furthermore, some architectures may use different terminology for components similar to those illustrated in FIG. 11. For example, the memory hub 1105 may be referred to as a Northbridge in some architectures, while the I/O hub 1107 may be referred to as a Southbridge.

Figure 12A:
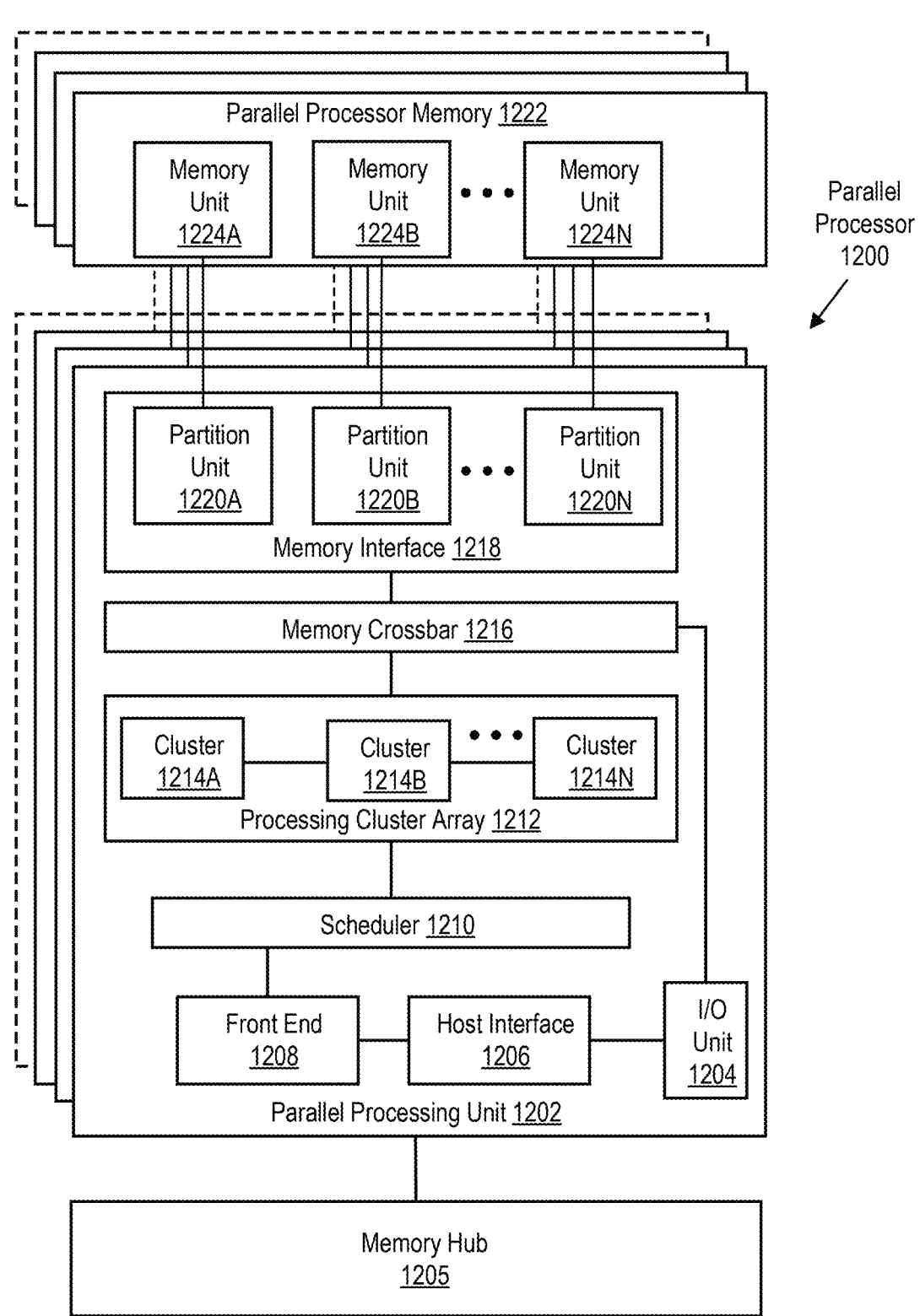
FIG. 12A illustrates examples of a parallel processor.

FIG. 12A illustrates examples of a parallel processor 1200. The parallel processor 1200 may be a GPU, GPGPU or the like as described herein. The various components of the parallel processor 1200 may be implemented using one or more integrated circuit devices, such as programmable processors, application specific integrated circuits (ASICs), or field programmable gate arrays (FPGA). The illustrated parallel processor 1200 may be one or more of the parallel processor(s) 1112 shown in FIG. 11.

The parallel processor 1200 includes a parallel processing unit 1202. The parallel processing unit includes an I/O unit 1204 that enables communication with other devices, including other instances of the parallel processing unit 1202. The I/O unit 1204 may be directly connected to other devices. For instance, the I/O unit 1204 connects with other devices via the use of a hub or switch interface, such as memory hub 1105. The connections between the memory hub 1105 and the I/O unit 1204 form a communication link 1113. Within the parallel processing unit 1202, the I/O unit 1204 connects with a host interface 1206 and a memory crossbar 1216, where the host interface 1206 receives commands directed to performing processing operations and the memory crossbar 1216 receives commands directed to performing memory operations.

When the host interface 1206 receives a command buffer via the I/O unit 1204, the host interface 1206 can direct work operations to perform those commands to a front end 1208. In some examples the front end 1208 couples with a scheduler 1210, which is configured to distribute commands or other work items to a processing cluster array 1212. The scheduler 1210 ensures that the processing cluster array 1212 is properly configured and in a valid state before tasks are distributed to the processing clusters of the processing cluster array 1212. The scheduler 1210 may be implemented via firmware logic executing on a microcontroller. The microcontroller implemented scheduler 1210 is configurable to perform complex scheduling and work distribution operations at coarse and fine granularity, enabling rapid preemption and context switching of threads executing on the processing cluster array 1212. Preferably, the host software can prove workloads for scheduling on the processing cluster array 1212 via one of multiple graphics processing doorbells. In other examples, polling for new workloads or interrupts can be used to identify or indicate availability of work to perform. The workloads can then be automatically distributed across the processing cluster array 1212 by the scheduler 1210 logic within the scheduler microcontroller.

The processing cluster array 1212 can include up to "N" processing clusters (e.g., cluster 1214A, cluster 1214B, through cluster 1214N). Each cluster 1214A-1214N of the processing cluster array 1212 can execute a large number of concurrent threads. The scheduler 1210 can allocate work to the clusters 1214A-1214N of the processing cluster array 1212 using various scheduling and/or work distribution algorithms, which may vary depending on the workload arising for each type of program or computation. The scheduling can be handled dynamically by the scheduler 1210 or can be assisted in part by compiler logic during compilation of program logic configured for execution by the processing cluster array 1212. Optionally, different clusters 1214A-1214N of the processing cluster array 1212 can be allocated for processing different types of programs or for performing different types of computations.

The processing cluster array 1212 can be configured to perform various types of parallel processing operations. For example, the processing cluster array 1212 is configured to perform general-purpose parallel compute operations. For example, the processing cluster array 1212 can include logic to execute processing tasks including filtering of video and/or audio data, performing modeling operations, including physics operations, and performing data transformations.

The processing cluster array 1212 is configured to perform parallel graphics processing operations. In such examples in which the parallel processor 1200 is configured to perform graphics processing operations, the processing cluster array 1212 can include additional logic to support the execution of such graphics processing operations, including, but not limited to texture sampling logic to perform texture operations, as well as tessellation logic and other vertex processing logic. Additionally, the processing cluster array 1212 can be configured to execute graphics processing related shader programs such as, but not limited to vertex shaders, tessellation shaders, geometry shaders, and pixel shaders. The parallel processing unit 1202 can transfer data from system memory via the I/O unit 1204 for processing. The transferred data can be stored to on-chip memory (e.g., parallel processor memory 1222) during processing, then written back to system memory.

In examples in which the parallel processing unit 1202 is used to perform graphics processing, the scheduler 1210 may be configured to divide the processing workload into approximately equal sized tasks, to better enable distribution of the graphics processing operations to multiple clusters 1214A-1214N of the processing cluster array 1212. In some of these examples, portions of the processing cluster array 1212 can be configured to perform different types of processing. For example, a first portion may be configured to perform vertex shading and topology generation, a second portion may be configured to perform tessellation and geometry shading, and a third portion may be configured to perform pixel shading or other screen space operations, to produce a rendered image for display. Intermediate data produced by one or more of the clusters 1214A-1214N may be stored in buffers to allow the intermediate data to be transmitted between clusters 1214A-1214N for further processing.

During operation, the processing cluster array 1212 can receive processing tasks to be executed via the scheduler 1210, which receives commands defining processing tasks from front end 1208. For graphics processing operations, processing tasks can include indices of data to be processed, e.g., surface (patch) data, primitive data, vertex data, and/or pixel data, as well as state parameters and commands defining how the data is to be processed (e.g., what program is to be executed). The scheduler 1210 may be configured to fetch the indices corresponding to the tasks or may receive the indices from the front end 1208. The front end 1208 can be configured to ensure the processing cluster array 1212 is configured to a valid state before the workload specified by incoming command buffers (e.g., batch-buffers, push buffers, etc.) is initiated.

Each of the one or more instances of the parallel processing unit 1202 can couple with parallel processor memory 1222. The parallel processor memory 1222 can be accessed via the memory crossbar 1216, which can receive memory requests from the processing cluster array 1212 as well as the I/O unit 1204. The memory crossbar 1216 can access the parallel processor memory 1222 via a memory interface 1218. The memory interface 1218 can include multiple partition units (e.g., partition unit 1220A, partition unit 1220B, through partition unit 1220N) that can each couple to a portion (e.g., memory unit) of parallel processor memory 1222. The number of partition units 1220A-1220N may be configured to be equal to the number of memory units, such that a first partition unit 1220A has a corresponding first memory unit 1224A, a second partition unit 1220B has a corresponding second memory unit 1224B, and an Nth partition unit 1220N has a corresponding Nth memory unit 1224N. In other examples, the number of partition units 1220A-1220N may not be equal to the number of memory devices.

The memory units 1224A-1224N can include various types of memory devices, including dynamic random-access memory (DRAM) or graphics random access memory, such as synchronous graphics random access memory (SGRAM), including graphics double data rate (GDDR) memory. Optionally, the memory units 1224A-1224N may also include 3D stacked memory, including but not limited to high bandwidth memory (HBM). Persons skilled in the art will appreciate that the specific implementation of the memory units 1224A-1224N can vary and can be selected from one of various conventional designs. Render targets, such as frame buffers or texture maps may be stored across the memory units 1224A-1224N, allowing partition units 1220A-1220N to write portions of each render target in parallel to efficiently use the available bandwidth of parallel processor memory 1222. In some examples, a local instance of the parallel processor memory 1222 may be excluded in favor of a unified memory design that utilizes system memory in conjunction with local cache memory.

Optionally, any one of the clusters 1214A-1214N of the processing cluster array 1212 has the ability to process data that will be written to any of the memory units 1224A-1224N within parallel processor memory 1222. The memory crossbar 1216 can be configured to transfer the output of each cluster 1214A-1214N to any partition unit 1220A-1220N or to another cluster 1214A-1214N, which can perform additional processing operations on the output. Each cluster 1214A-1214N can communicate with the memory interface 1218 through the memory crossbar 1216 to read from or write to various external memory devices. In one of the examples with the memory crossbar 1216 the memory crossbar 1216 has a connection to the memory interface 1218 to communicate with the I/O unit 1204, as well as a connection to a local instance of the parallel processor memory 1222, enabling the processing units within the different processing clusters 1214A-1214N to communicate with system memory or other memory that is not local to the parallel processing unit 1202. Generally, the memory crossbar 1216 may, for example, be able to use virtual channels to separate traffic streams between the clusters 1214A-1214N and the partition units 1220A-1220N.

While a single instance of the parallel processing unit 1202 is illustrated within the parallel processor 1200, any number of instances of the parallel processing unit 1202 can be included. For example, multiple instances of the parallel processing unit 1202 can be provided on a single add-in card, or multiple add-in cards can be interconnected. For example, the parallel processor 1200 can be an add-in device, such as add-in device 1120 of FIG. 11, which may be a graphics card such as a discrete graphics card that includes one or more GPUs, one or more memory devices, and device-to-device or network or fabric interfaces. The different instances of the parallel processing unit 1202 can be configured to inter-operate even if the different instances have different numbers of processing cores, different amounts of local parallel processor memory, and/or other configuration differences. Optionally, some instances of the parallel processing unit 1202 can include higher precision floating point units relative to other instances. Systems incorporating one or more instances of the parallel processing unit 1202 or the parallel processor 1200 can be implemented in a variety of configurations and form factors, including but not limited to desktop, laptop, or handheld personal computers, servers, workstations, game consoles, and/or embedded systems. An orchestrator can form composite nodes for workload performance using one or more of: disaggregated processor resources, cache resources, memory resources, storage resources, and networking resources.

In some examples, the parallel processing unit 1202 can be partitioned into multiple instances. Those multiple instances can be configured to execute workloads associated with different clients in an isolated manner, enabling a pre-determined quality of service to be provided for each client. For example, each cluster 1214A-1214N can be compartmentalized and isolated from other clusters, allowing the processing cluster array 1212 to be divided into multiple compute partitions or instances. In such configuration, workloads that execute on an isolated partition are protected from faults or errors associated with a different workload that executes on a different partition. The partition units 1220A-1220N can be configured to enable a dedicated and/or isolated path to memory for the clusters 1214A-1214N associated with the respective compute partitions. This datapath isolation enables the compute resources within a partition can communicate with one or more assigned memory units 1224A-1224N without being subjected to inference by the activities of other partitions.

Figure 12B:
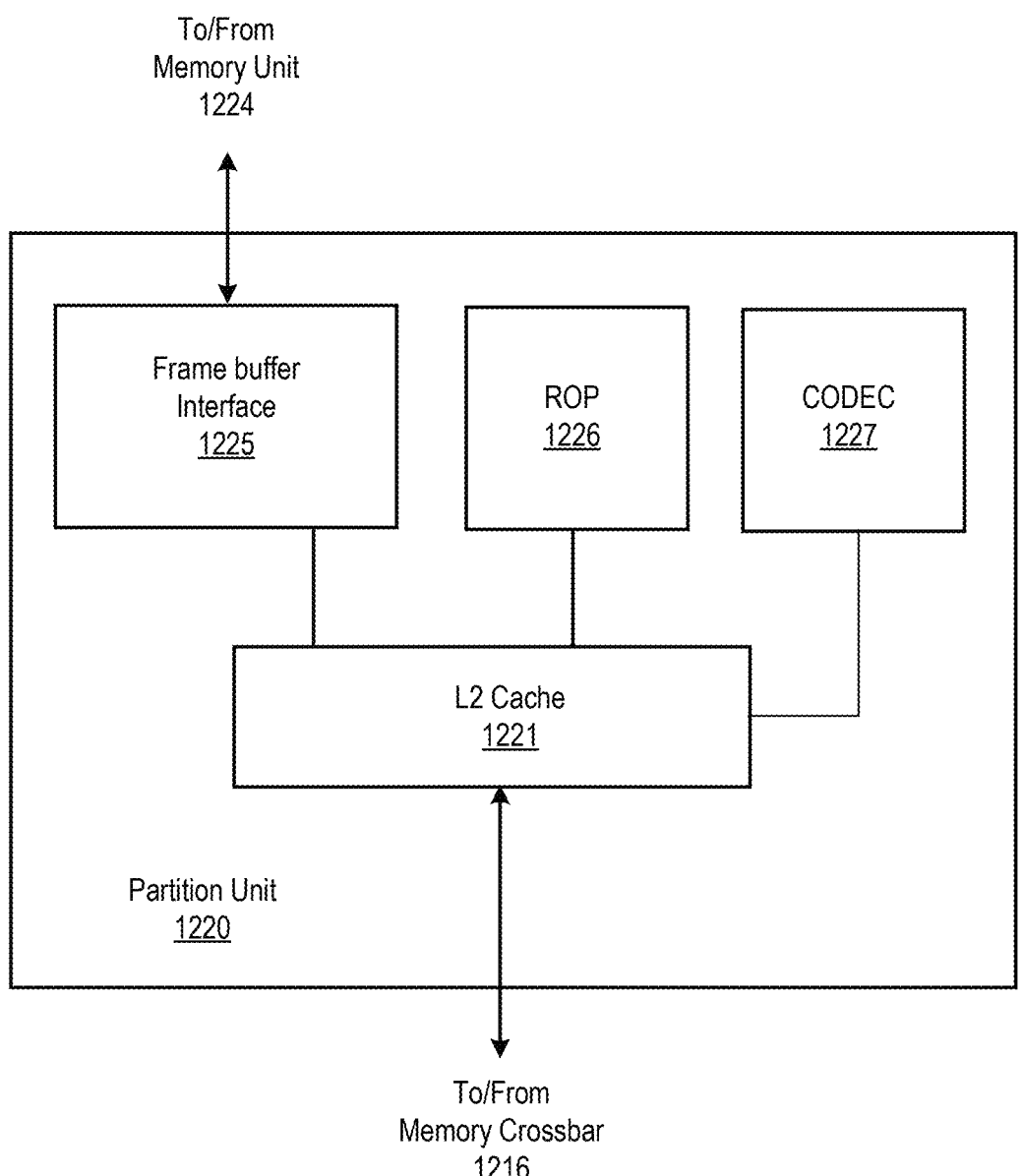
FIG. 12B illustrates examples of a block diagram of a partition unit.

FIG. 12B is a block diagram of a partition unit 1220. The partition unit 1220 may be an instance of one of the partition units 1220A-1220N of FIG. 12A. As illustrated, the partition unit 1220 includes an L2 cache 1221, a frame buffer interface 1225, and a ROP 1226 (raster operations unit). The L2 cache 1221 is a read/write cache that is configured to perform load and store operations received from the memory crossbar 1216 and ROP 1226. Read misses and urgent write-back requests are output by L2 cache 1221 to frame buffer interface 1225 for processing. Updates can also be sent to the frame buffer via the frame buffer interface 1225 for processing. In some examples the frame buffer interface 1225 interfaces with one of the memory units in parallel processor memory, such as the memory units 1224A-1224N of FIG. 12A (e.g., within parallel processor memory 1222). The partition unit 1220 may additionally or alternatively also interface with one of the memory units in parallel processor memory via a memory controller (not shown).

In graphics applications, the ROP 1226 is a processing unit that performs raster operations such as stencil, z test, blending, and the like. The ROP 1226 then outputs processed graphics data that is stored in graphics memory. In some examples the ROP 1226 includes or couples with a CODEC 1227 that includes compression logic to compress depth or color data that is written to memory or the L2 cache 1221 and decompress depth or color data that is read from memory or the L2 cache 1221. The compression logic can be lossless compression logic that makes use of one or more of multiple compression algorithms. The type of compression that is performed by the CODEC 1227 can vary based on the statistical characteristics of the data to be compressed. For example, in some examples, delta color compression is performed on depth and color data on a per-tile basis. In some examples the CODEC 1227 includes compression and decompression logic that can compress and decompress compute data associated with machine learning operations. The CODEC 1227 can, for example, compress sparse matrix data for sparse machine learning operations. The CODEC 1227 can also compress sparse matrix data that is encoded in a sparse matrix format (e.g., coordinate list encoding (COO), compressed sparse row (CSR), compress sparse column (CSC), etc.) to generate compressed and encoded sparse matrix data. The compressed and encoded sparse matrix data can be decompressed and/or decoded before being processed by processing elements or the processing elements can be configured to consume compressed, encoded, or compressed and encoded data for processing.

The ROP 1226 may be included within each processing cluster (e.g., cluster 1214A-1214N of FIG. 12A) instead of within the partition unit 1220. In such examples, read and write requests for pixel data are transmitted over the memory crossbar 1216 instead of pixel fragment data. The processed graphics data may be displayed on a display device, such as one of the one or more display device(s) 1110A-1110B of FIG. 11, routed for further processing by the processor(s) 1102, or routed for further processing by one of the processing entities within the parallel processor 1200 of FIG. 12A.

Figure 12C:
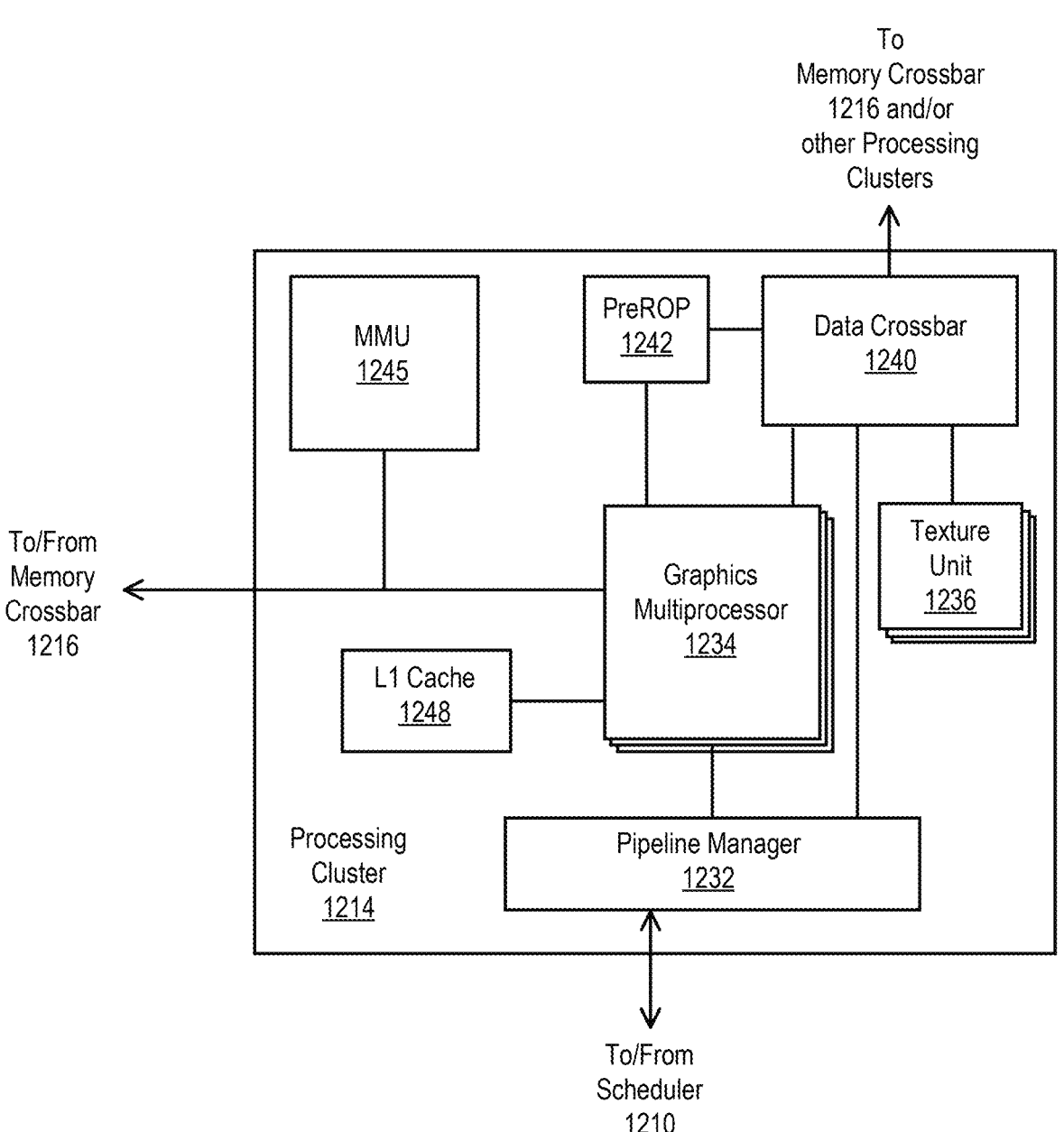
FIG. 12C illustrates examples of a block diagram of a processing cluster within a parallel processing unit.

FIG. 12C is a block diagram of a processing cluster 1214 within a parallel processing unit. For example, the processing cluster is an instance of one of the processing clusters

1214A-1214N of FIG. 12A. The processing cluster 1214 can be configured to execute many threads in parallel, where the term "thread" refers to an instance of a particular program executing on a particular set of input data. Optionally, single-instruction, multiple-data (SIMD) instruction issue techniques may be used to support parallel execution of a large number of threads without providing multiple independent instruction units. Alternatively, single-instruction, multiple-thread (SIMT) techniques may be used to support parallel execution of a large number of generally synchronized threads, using a common instruction unit configured to issue instructions to a set of processing engines within each one of the processing clusters. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

Operation of the processing cluster 1214 can be controlled via a pipeline manager 1232 that distributes processing tasks to SIMT parallel processors. The pipeline manager 1232 receives instructions from the scheduler 1210 of FIG. 12A and manages execution of those instructions via a graphics multiprocessor 1234 and/or a texture unit 1236. The illustrated graphics multiprocessor 1234 is an exemplary instance of a SIMT parallel processor. However, various types of SIMT parallel processors of differing architectures may be included within the processing cluster 1214. One or more instances of the graphics multiprocessor 1234 can be included within a processing cluster 1214. The graphics multiprocessor 1234 can process data and a data crossbar 1240 can be used to distribute the processed data to one of multiple possible destinations, including other shader units. The pipeline manager 1232 can facilitate the distribution of processed data by specifying destinations for processed data to be distributed via the data crossbar 1240.

Each graphics multiprocessor 1234 within the processing cluster 1214 can include an identical set of functional execution logic (e.g., arithmetic logic units, load-store units, etc.). The functional execution logic can be configured in a pipelined manner in which new instructions can be issued before previous instructions are complete. The functional execution logic supports a variety of operations including integer and floating-point arithmetic, comparison operations, Boolean operations, bit-shifting, and computation of various algebraic functions. The same functional-unit hardware could be leveraged to perform different operations and any combination of functional units may be present.

The instructions transmitted to the processing cluster 1214 constitute a thread. A set of threads executing across the set of parallel processing engines is a thread group. A thread group executes the same program on different input data. Each thread within a thread group can be assigned to a different processing engine within a graphics multiprocessor 1234. A thread group may include fewer threads than the number of processing engines within the graphics multiprocessor 1234. When a thread group includes fewer threads than the number of processing engines, one or more of the processing engines may be idle during cycles in which that thread group is being processed. A thread group may also include more threads than the number of processing engines within the graphics multiprocessor 1234. When the thread group includes more threads than the number of processing engines within the graphics multiprocessor 1234, processing can be performed over consecutive clock cycles. Optionally, multiple thread groups can be executed concurrently on the graphics multiprocessor 1234.

The graphics multiprocessor 1234 may include an internal cache memory to perform load and store operations. Optionally, the graphics multiprocessor 1234 can forego an internal cache and use a cache memory (e.g., level 1 (L1) cache 1248) within the processing cluster 1214. Each graphics multiprocessor 1234 also has access to level 2 (L2) caches within the partition units (e.g., partition units 1220A-1220N of FIG. 12A) that are shared among all processing clusters 1214 and may be used to transfer data between threads. The graphics multiprocessor 1234 may also access off-chip global memory, which can include one or more of local parallel processor memory and/or system memory. Any memory external to the parallel processing unit 1202 may be used as global memory. Examples in which the processing cluster 1214 includes multiple instances of the graphics multiprocessor 1234 can share common instructions and data, which may be stored in the L1 cache 1248.

Each processing cluster 1214 may include an MMU 1245 (memory management unit) that is configured to map virtual addresses into physical addresses. In other examples, one or more instances of the MMU 1245 may reside within the memory interface 1218 of FIG. 12A. The MMU 1245 includes a set of page table entries (PTEs) used to map a virtual address to a physical address of a tile and optionally a cache line index. The MMU 1245 may include address translation lookaside buffers (TLB) or caches that may reside within the graphics multiprocessor 1234 or the L1 cache 1248 of processing cluster 1214. The physical address is processed to distribute surface data access locality to allow efficient request interleaving among partition units. The cache line index may be used to determine whether a request for a cache line is a hit or miss.

In graphics and computing applications, a processing cluster 1214 may be configured such that each graphics multiprocessor 1234 is coupled to a texture unit 1236 for performing texture mapping operations, e.g., determining texture sample positions, reading texture data, and filtering the texture data. Texture data is read from an internal texture L1 cache (not shown) or in some examples from the L1 cache within graphics multiprocessor 1234 and is fetched from an L2 cache, local parallel processor memory, or system memory, as needed. Each graphics multiprocessor 1234 outputs processed tasks to the data crossbar 1240 to provide the processed task to another processing cluster 1214 for further processing or to store the processed task in an L2 cache, local parallel processor memory, or system memory via the memory crossbar 1216. A preROP 1242 (pre-raster operations unit) is configured to receive data from graphics multiprocessor 1234, direct data to ROP units, which may be located with partition units as described herein (e.g., partition units 1220A-1220N of FIG. 12A). The preROP 1242 unit can perform optimizations for color blending, organize pixel color data, and perform address translations.

It will be appreciated that the core architecture described herein is illustrative and that variations and modifications are possible. Any number of processing units, e.g., graphics multiprocessor 1234, texture units 1236, preROPs 1242, etc., may be included within a processing cluster 1214. Further, while only one processing cluster 1214 is shown, a parallel processing unit as described herein may include any number of instances of the processing cluster 1214. Optionally, each processing cluster 1214 can be configured to operate independently of other processing clusters 1214 using separate and distinct processing units, L1 caches, L2 caches, etc.

Figure 12D:
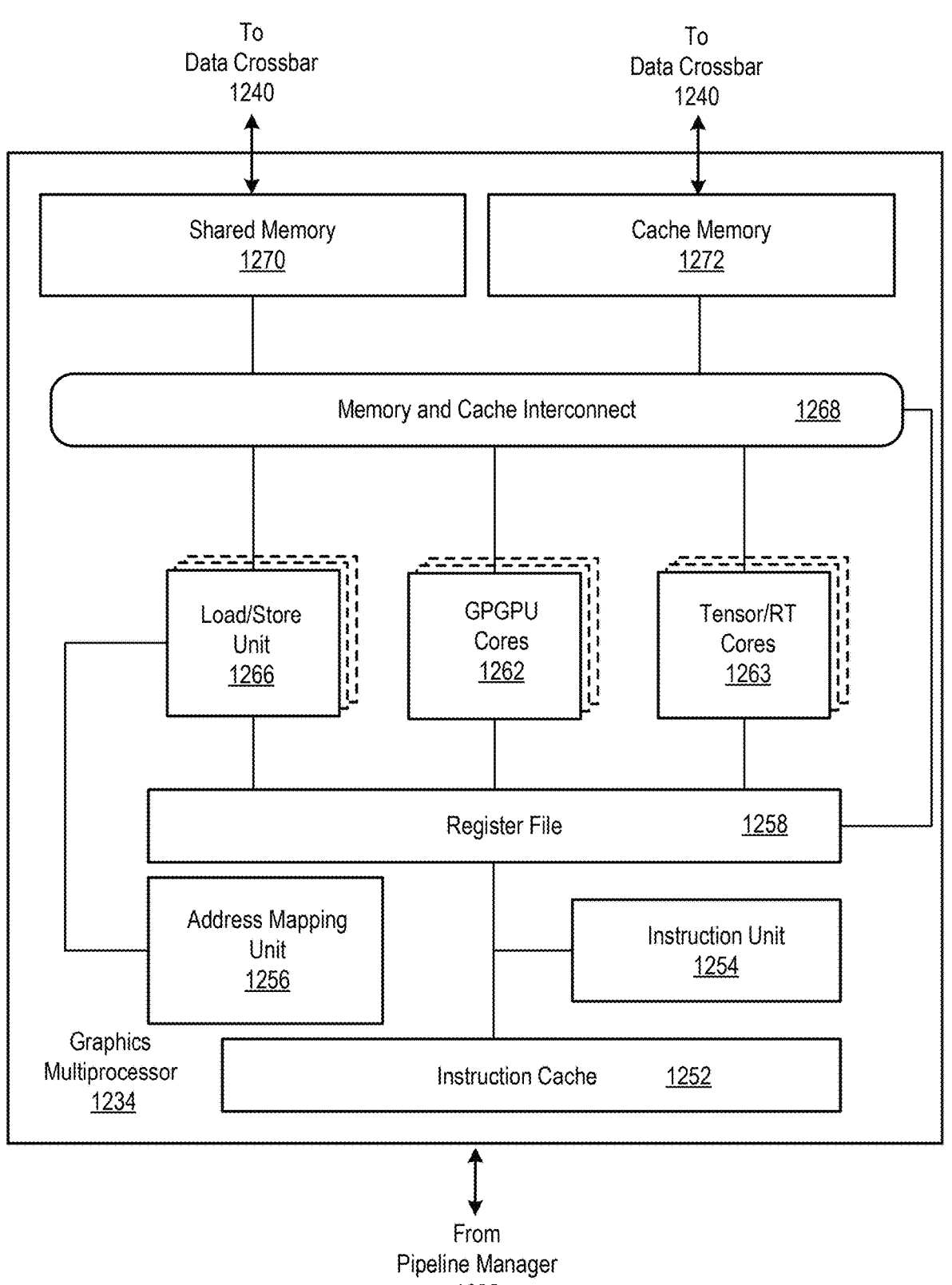
FIG. 12D illustrates examples of a graphics multiprocessor in which the graphics multiprocessor couples with the pipeline manager of the processing cluster.

FIG. 12D shows an example of the graphics multiprocessor 1234 in which the graphics multiprocessor 1234 couples with the pipeline manager 1232 of the processing cluster 1214. The graphics multiprocessor 1234 has an execution pipeline including but not limited to an instruction cache 1252, an instruction unit 1254, an address mapping unit 1256, a register file 1258, one or more general purpose graphics processing unit (GPGPU) cores 1262, and one or more load/store units 1266. The GPGPU cores 1262 and load/store units 1266 are coupled with cache memory 1272 and shared memory 1270 via a memory and cache interconnect 1268. The graphics multiprocessor 1234 may additionally include tensor and/or ray-tracing cores 1263 that include hardware logic to accelerate matrix and/or ray-tracing operations.

The instruction cache 1252 may receive a stream of instructions to execute from the pipeline manager 1232. The instructions are cached in the instruction cache 1252 and dispatched for execution by the instruction unit 1254. The instruction unit 1254 can dispatch instructions as thread groups (e.g., warps), with each thread of the thread group assigned to a different execution unit within GPGPU core 1262. An instruction can access any of a local, shared, or global address space by specifying an address within a unified address space. The address mapping unit 1256 can be used to translate addresses in the unified address space into a distinct memory address that can be accessed by the load/store units 1266.

The register file 1258 provides a set of registers for the functional units of the graphics multiprocessor 1234. The register file 1258 provides temporary storage for operands connected to the data paths of the functional units (e.g., GPGPU cores 1262, load/store units 1266) of the graphics multiprocessor 1234. The register file 1258 may be divided between each of the functional units such that each functional unit is allocated a dedicated portion of the register file 1258. For example, the register file 1258 may be divided between the different warps being executed by the graphics multiprocessor 1234.

The GPGPU cores 1262 can each include floating point units (FPUs) and/or integer arithmetic logic units (ALUs) that are used to execute instructions of the graphics multiprocessor 1234. In some implementations, the GPGPU cores 1262 can include hardware logic that may otherwise reside within the tensor and/or ray-tracing cores 1263. The GPGPU cores 1262 can be similar in architecture or can differ in architecture. For example and in some examples, a first portion of the GPGPU cores 1262 include a single precision FPU and an integer ALU while a second portion of the GPGPU cores include a double precision FPU. Optionally, the FPUs can implement the IEEE 754-2008 standard for floating point arithmetic or enable variable precision floating point arithmetic. The graphics multiprocessor 1234 can additionally include one or more fixed function or special function units to perform specific functions such as copy rectangle or pixel blending operations. One or more of the GPGPU cores can also include fixed or special function logic.

The GPGPU cores 1262 may include SIMD logic capable of performing a single instruction on multiple sets of data. Optionally, GPGPU cores 1262 can physically execute SIMD4, SIMD8, and SIMD16 instructions and logically execute SIMD1, SIMD2, and SIMD32 instructions. The SIMD instructions for the GPGPU cores can be generated at compile time by a shader compiler or automatically generated when executing programs written and compiled for single program multiple data (SPMD) or SIMT architectures. Multiple threads of a program configured for the SIMT execution model can be executed via a single SIMD instruction. For example and in some examples, eight SIMT threads that perform the same or similar operations can be executed in parallel via a single SIMD8 logic unit.

The memory and cache interconnect 1268 is an interconnect network that connects each of the functional units of the graphics multiprocessor 1234 to the register file 1258 and to the shared memory 1270. For example, the memory and cache interconnect 1268 is a crossbar interconnect that allows the load/store unit 1266 to implement load and store operations between the shared memory 1270 and the register file 1258. The register file 1258 can operate at the same frequency as the GPGPU cores 1262, thus data transfer between the GPGPU cores 1262 and the register file 1258 is very low latency. The shared memory 1270 can be used to enable communication between threads that execute on the functional units within the graphics multiprocessor 1234. The cache memory 1272 can be used as a data cache for example, to cache texture data communicated between the functional units and the texture unit 1236. The shared memory 1270 can also be used as a program managed cached. The shared memory 1270 and the cache memory 1272 can couple with the data crossbar 1240 to enable communication with other components of the processing cluster. Threads executing on the GPGPU cores 1262 can programmatically store data within the shared memory in addition to the automatically cached data that is stored within the cache memory 1272.

Figure 13C:
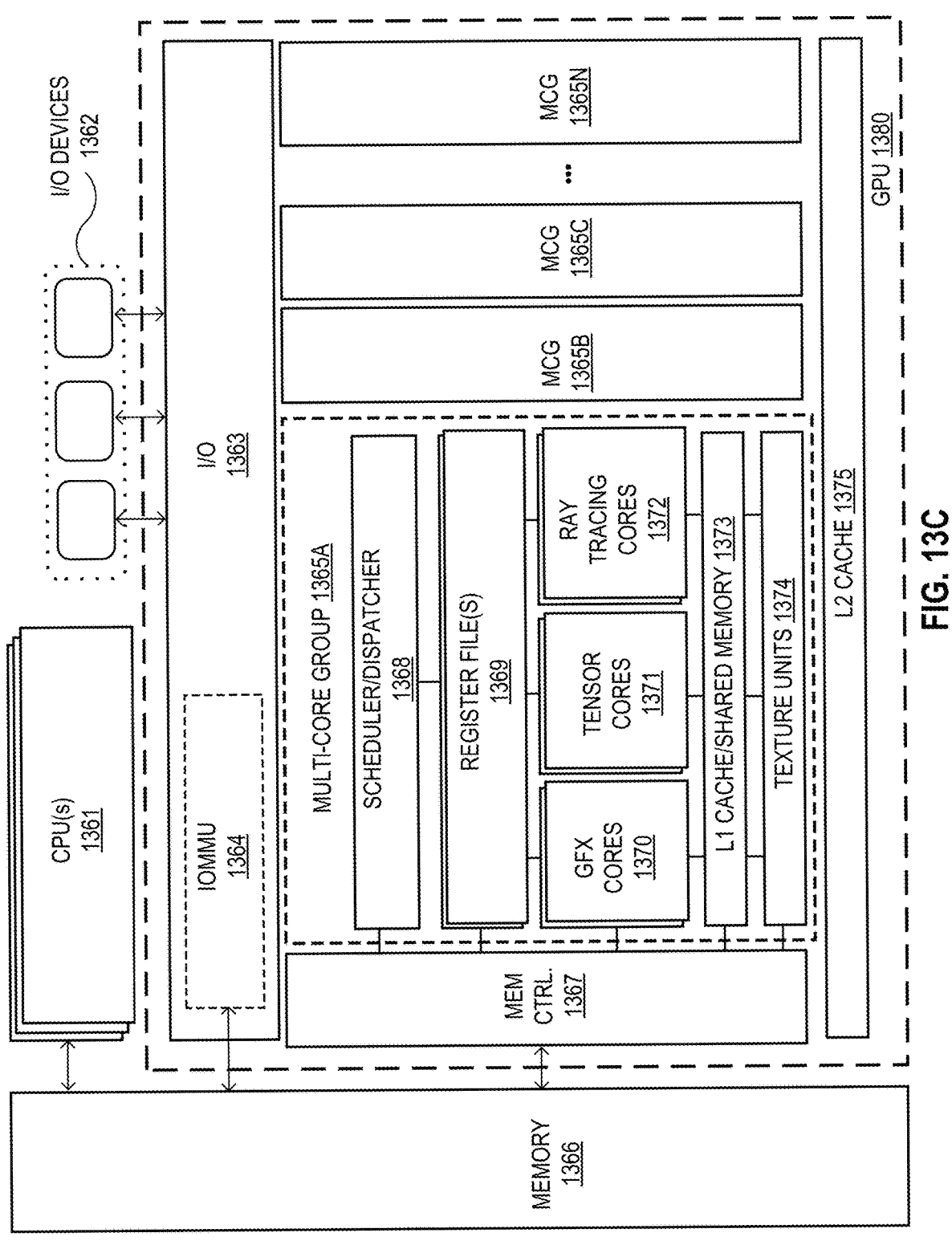

FIGS. 13A-13C illustrate additional graphics multiprocessors, according to examples. FIG. 13A-13B illustrate graphics multiprocessors 1325, 1350, which are related to the graphics multiprocessor 1234 of FIG. 12C and may be used in place of one of those. Therefore, the disclosure of any features in combination with the graphics multiprocessor 1234 herein also discloses a corresponding combination with the graphics multiprocessor(s) 1325, 1350, but is not limited to such. FIG. 13C illustrates a graphics processing unit (GPU) 1380 which includes dedicated sets of graphics processing resources arranged into multi-core groups 1365A-1365N, which correspond to the graphics multiprocessors 1325, 1350. The illustrated graphics multiprocessors 1325, 1350 and the multi-core groups 1365A-1365N can be streaming multiprocessors (SM) capable of simultaneous execution of a large number of execution threads.

The graphics multiprocessor 1325 of FIG. 13A includes multiple additional instances of execution resource units relative to the graphics multiprocessor 1234 of FIG. 12D. For example, the graphics multiprocessor 1325 can include multiple instances of the instruction unit 1332A-1332B, register file 1334A-1334B, and texture unit(s) 1344A-1344B. The graphics multiprocessor 1325 also includes multiple sets of graphics or compute execution units (e.g., GPGPU core 1336A-1336B, tensor core 1337A-1337B, ray-tracing core 1338A-1338B) and multiple sets of load/store units 1340A-1340B. The execution resource units have a common instruction cache 1330, texture and/or data cache memory 1342, and shared memory 1346.

The various components can communicate via an interconnect fabric 1327. The interconnect fabric 1327 may include one or more crossbar switches to enable communication between the various components of the graphics multiprocessor 1325. The interconnect fabric 1327 may be a separate, high-speed network fabric layer upon which each component of the graphics multiprocessor 1325 is stacked. The components of the graphics multiprocessor 1325 communicate with remote components via the interconnect fabric 1327. For example, the cores 1336A-1336B, 1337A-1337B, and 1338A-1338B can each communicate with shared memory 1346 via the interconnect fabric 1327. The interconnect fabric 1327 can arbitrate communication within the graphics multiprocessor 1325 to ensure a fair bandwidth allocation between components.

The graphics multiprocessor 1350 of FIG. 13B includes multiple sets of execution resources 1356A-1356D, where each set of execution resource includes multiple instruction units, register files, GPGPU cores, and load store units, as illustrated in FIG. 12D and FIG. 13A. The execution resources 1356A-1356D can work in concert with texture unit(s) 1360A-1360D for texture operations, while sharing an instruction cache 1354, and shared memory 1353. For example, the execution resources 1356A-1356D can share an instruction cache 1354 and shared memory 1353, as well as multiple instances of a texture and/or data cache memory 1358A-1358B. The various components can communicate via an interconnect fabric 1352 similar to the interconnect fabric 1327 of FIG. 13A.

Persons skilled in the art will understand that the architecture described in FIG. 1, 12A-12D, and 13A-13B are descriptive and not limiting as to the scope of the present examples. Thus, the techniques described herein may be implemented on any properly configured processing unit, including, without limitation, one or more mobile application processors, one or more desktop or server central processing units (CPUs) including multi-core CPUs, one or more parallel processing units, such as the parallel processing unit 1202 of FIG. 12A, as well as one or more graphics processors or special purpose processing units, without departure from the scope of the examples described herein.

The parallel processor or GPGPU as described herein may be communicatively coupled to host/processor cores to accelerate graphics operations, machine-learning operations, pattern analysis operations, and various general-purpose GPU (GPGPU) functions. The GPU may be communicatively coupled to the host processor/cores over a bus or other interconnect (e.g., a high-speed interconnect such as PCIe, NVLink, or other known protocols, standardized protocols, or proprietary protocols). In other examples, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

FIG. 13C illustrates a graphics processing unit (GPU) 1380 which includes dedicated sets of graphics processing resources arranged into multi-core groups 1365A-1365N. While the details of only a single multi-core group 1365A are provided, it will be appreciated that the other multi-core groups 1365B-1365N may be equipped with the same or similar sets of graphics processing resources. Details described with respect to the multi-core groups 1365A-1365N may also apply to any graphics multiprocessor 1234, 1325, 1350 described herein.

As illustrated, a multi-core group 1365A may include a set of graphics cores 1370, a set of tensor cores 1371, and a set of ray tracing cores 1372. A scheduler/dispatcher 1368 schedules and dispatches the graphics threads for execution on the various cores 1370, 1371, 1372. A set of register files 1369 store operand values used by the cores 1370, 1371, 1372 when executing the graphics threads. These may include, for example, integer registers for storing integer values, floating point registers for storing floating point values, vector registers for storing packed data elements (integer and/or floating-point data elements) and tile registers for storing tensor/matrix values. The tile registers may be implemented as combined sets of vector registers.

One or more combined level 1 (L1) caches and shared memory units 1373 store graphics data such as texture data, vertex data, pixel data, ray data, bounding volume data, etc., locally within each multi-core group 1365A. One or more texture units 1374 can also be used to perform texturing operations, such as texture mapping and sampling. A Level 2 (L2) cache 1375 shared by all or a subset of the multi-core groups 1365A-1365N stores graphics data and/or instructions for multiple concurrent graphics threads. As illustrated, the L2 cache 1375 may be shared across a plurality of multi-core groups 1365A-1365N. One or more memory controllers 1367 couple the GPU 1380 to a memory 1366 which may be a system memory (e.g., DRAM) and/or a dedicated graphics memory (e.g., GDDR6 memory).

Input/output (I/O) circuitry 1363 couples the GPU 1380 to one or more I/O devices 1362 such as digital signal processors (DSPs), network controllers, or user input devices. An on-chip interconnect may be used to couple the I/O devices 1362 to the GPU 1380 and memory 1366. One or more I/O memory management units (IOMMUs) 1364 of the I/O circuitry 1363 couple the I/O devices 1362 directly to the system memory 1366. Optionally, the IOMMU 1364 manages multiple sets of page tables to map virtual addresses to physical addresses in system memory 1366. The I/O devices 1362, CPU(s) 1361, and GPU(s) 1380 may then share the same virtual address space.

In one implementation of the IOMMU 1364, the IOMMU 1364 supports virtualization. In this case, it may manage a first set of page tables to map guest/graphics virtual addresses to guest/graphics physical addresses and a second set of page tables to map the guest/graphics physical addresses to system/host physical addresses (e.g., within system memory 1366). The base addresses of each of the first and second sets of page tables may be stored in control registers and swapped out on a context switch (e.g., so that the new context is provided with access to the relevant set of page tables). While not illustrated in FIG. 13C, each of the cores 1370, 1371, 1372 and/or multi-core groups 1365A-1365N may include translation lookaside buffers (TLBs) to cache guest virtual to guest physical translations, guest physical to host physical translations, and guest virtual to host physical translations.

The CPU(s) 1361, GPUs 1380, and I/O devices 1362 may be integrated on a single semiconductor chip and/or chip package. The illustrated memory 1366 may be integrated on the same chip or may be coupled to the memory controllers 1367 via an off-chip interface. In one implementation, the memory 1366 comprises GDDR6 memory which shares the same virtual address space as other physical system-level memories, although the underlying principles described herein are not limited to this specific implementation.

The tensor cores 1371 may include a plurality of execution units specifically designed to perform matrix operations, which are the fundamental compute operation used to perform deep learning operations. For example, simultaneous matrix multiplication operations may be used for neural network training and inferencing. The tensor cores 1371 may perform matrix processing using a variety of operand precisions including single precision floating-point (e.g., 32 bits), half-precision floating point (e.g., 16 bits), integer words (16 bits), bytes (8 bits), and half-bytes (4 bits). For example, a neural network implementation extracts features of each rendered scene, potentially combining details from multiple frames, to construct a high-quality final image.

In deep learning implementations, parallel matrix multiplication work may be scheduled for execution on the tensor cores 1371. The training of neural networks, in particular, requires a significant number of matrix dot product operations. In order to process an inner-product formulation of an N×N×N matrix multiply, the tensor cores 1371 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 1371 to ensure that the most efficient precision is used for different workloads (e.g., such as inferencing workloads which can tolerate quantization to bytes and half-bytes). Supported formats additionally include 64-bit floating point (FP64) and non-IEEE floating point formats such as the bfloat16 format (e.g., Brain floating point), a 16-bit floating point format with one sign bit, eight exponent bits, and eight significand bits, of which seven are explicitly stored. One example includes support for a reduced precision tensor-float (TF32) mode, which performs computations using the range of FP32 (8-bits) and the precision of FP16 (10-bits). Reduced precision TF32 operations can be performed on FP32 inputs and produce FP32 outputs at higher performance relative to FP32 and increased precision relative to FP16. In some examples, one or more 8-bit floating point formats (FP8) are supported.

In some examples the tensor cores 1371 support a sparse mode of operation for matrices in which the vast majority of values are zero. The tensor cores 1371 include support for sparse input matrices that are encoded in a sparse matrix representation (e.g., coordinate list encoding (COO), compressed sparse row (CSR), compress sparse column (CSC), etc.). The tensor cores 1371 also include support for compressed sparse matrix representations in the event that the sparse matrix representation may be further compressed. Compressed, encoded, and/or compressed and encoded matrix data, along with associated compression and/or encoding metadata, can be read by the tensor cores 1371 and the non-zero values can be extracted. For example, for a given input matrix A, a non-zero value can be loaded from the compressed and/or encoded representation of at least a portion of matrix A. Based on the location in matrix A for the non-zero value, which may be determined from index or coordinate metadata associated with the non-zero value, a corresponding value in input matrix B may be loaded. Depending on the operation to be performed (e.g., multiply), the load of the value from input matrix B may be bypassed if the corresponding value is a zero value. In some examples, the pairings of values for certain operations, such as multiply operations, may be pre-scanned by scheduler logic and only operations between non-zero inputs are scheduled. Depending on the dimensions of matrix A and matrix B and the operation to be performed, output matrix C may be dense or sparse. Where output matrix C is sparse and depending on the configuration of the tensor cores 1371, output matrix C may be output in a compressed format, a sparse encoding, or a compressed sparse encoding.

The ray tracing cores 1372 may accelerate ray tracing operations for both real-time ray tracing and non-real-time ray tracing implementations. In particular, the ray tracing cores 1372 may include ray traversal/intersection circuitry for performing ray traversal using bounding volume hierarchies (BVHs) and identifying intersections between rays and primitives enclosed within the BVH volumes. The ray tracing cores 1372 may also include circuitry for performing depth testing and culling (e.g., using a Z buffer or similar arrangement). In one implementation, the ray tracing cores 1372 perform traversal and intersection operations in concert with the image denoising techniques described herein, at least a portion of which may be executed on the tensor cores 1371. For example, the tensor cores 1371 may implement a deep learning neural network to perform denoising of frames generated by the ray tracing cores 1372. However, the CPU(s) 1361, graphics cores 1370, and/or ray tracing cores 1372 may also implement all or a portion of the denoising and/or deep learning algorithms.

In addition, as described above, a distributed approach to denoising may be employed in which the GPU 1380 is in a computing device coupled to other computing devices over a network or high-speed interconnect. In this distributed approach, the interconnected computing devices may share neural network learning/training data to improve the speed with which the overall system learns to perform denoising for different types of image frames and/or different graphics applications.

The ray tracing cores 1372 may process all BVH traversal and/or ray-primitive intersections, saving the graphics cores 1370 from being overloaded with thousands of instructions per ray. For example, each ray tracing core 1372 includes a first set of specialized circuitry for performing bounding box tests (e.g., for traversal operations) and/or a second set of specialized circuitry for performing the ray-triangle intersection tests (e.g., intersecting rays which have been traversed). Thus, for example, the multi-core group 1365A can simply launch a ray probe, and the ray tracing cores 1372 independently perform ray traversal and intersection and return hit data (e.g., a hit, no hit, multiple hits, etc.) to the thread context. The other cores 1370, 1371 are freed to perform other graphics or compute work while the ray tracing cores 1372 perform the traversal and intersection operations.

Optionally, each ray tracing core 1372 may include a traversal unit to perform BVH testing operations and/or an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 1370 and tensor cores 1371) are freed to perform other forms of graphics work.

In some examples described below, a hybrid rasterization/ray tracing approach is used in which work is distributed between the graphics cores 1370 and ray tracing cores 1372.

The ray tracing cores 1372 (and/or other cores 1370, 1371) may include hardware support for a ray tracing instruction set such as Microsoft's DirectX Ray Tracing (DXR) which includes a DispatchRays command, as well as ray-generation, closest-hit, any-hit, and miss shaders, which enable the assignment of unique sets of shaders and textures for each object. Another ray tracing platform which may be supported by the ray tracing cores 1372, graphics cores 1370 and tensor cores 1371 is Vulkan API (e.g., Vulkan version 1.1.85 and later). Note, however, that the underlying principles described herein are not limited to any particular ray tracing ISA.

In general, the various cores 1372, 1371, 1370 may support a ray tracing instruction set that includes instructions/functions for one or more of ray generation, closest hit, any hit, ray-primitive intersection, per-primitive and hierarchical bounding box construction, miss, visit, and exceptions. More specifically, some examples includes ray tracing instructions to perform one or more of the following functions:

Ray Generation-Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the child volumes a ray will traverse.

Exceptions—Includes various types of exception handlers (e.g., invoked for various error conditions).

In some examples the ray tracing cores 1372 may be adapted to accelerate general-purpose compute operations that can be accelerated using computational techniques that are analogous to ray intersection tests. A compute framework can be provided that enables shader programs to be compiled into low level instructions and/or primitives that perform general-purpose compute operations via the ray tracing cores. Exemplary computational problems that can benefit from compute operations performed on the ray tracing cores 1372 include computations involving beam, wave, ray, or particle propagation within a coordinate space. Interactions associated with that propagation can be computed relative to a geometry or mesh within the coordinate space. For example, computations associated with electromagnetic signal propagation through an environment can be accelerated via the use of instructions or primitives that are executed via the ray tracing cores. Diffraction and reflection of the signals by objects in the environment can be computed as direct ray-tracing analogies.

Ray tracing cores 1372 can also be used to perform computations that are not directly analogous to ray tracing. For example, mesh projection, mesh refinement, and volume sampling computations can be accelerated using the ray tracing cores 1372. Generic coordinate space calculations, such as nearest neighbor calculations can also be performed. For example, the set of points near a given point can be discovered by defining a bounding box in the coordinate space around the point. BVH and ray probe logic within the ray tracing cores 1372 can then be used to determine the set of point intersections within the bounding box. The intersections constitute the origin point and the nearest neighbors to that origin point. Computations that are performed using the ray tracing cores 1372 can be performed in parallel with computations performed on the graphics cores 1372 and tensor cores 1371. A shader compiler can be configured to compile a compute shader or other general-purpose graphics processing program into low level primitives that can be parallelized across the graphics cores 1370, tensor cores 1371, and ray tracing cores 1372.

Building larger and larger silicon dies is challenging for a variety of reasons. As silicon dies become larger, manufacturing yields become smaller and process technology requirements for different components may diverge. On the other hand, in order to have a high-performance system, key components should be interconnected by high speed, high bandwidth, low latency interfaces. These contradicting needs pose a challenge to high performance chip development.

Examples described herein provide techniques to disaggregate an architecture of a system on a chip integrated circuit into multiple distinct chiplets that can be packaged onto a common chassis. In some examples, a graphics processing unit or parallel processor is composed from diverse silicon chiplets that are separately manufactured. A chiplet is an at least partially packaged integrated circuit that includes distinct units of logic that can be assembled with other chiplets into a larger package. A diverse set of chiplets with different IP core logic can be assembled into a single device. Additionally the chiplets can be integrated into a base die or base chiplet using active interposer technology. The concepts described herein enable the interconnection and communication between the different forms of IP within the GPU. The development of IPs on different process may be mixed. This avoids the complexity of converging multiple IPs, especially on a large SoC with several flavors IPs, to the same process.

Enabling the use of multiple process technologies improves the time to market and provides a cost-effective way to create multiple product SKUs. For customers, this means getting products that are more tailored to their requirements in a cost effective and timely manner. Additionally, the disaggregated IPs are more amenable to being power gated independently, components that are not in use on a given workload can be powered off, reducing overall power consumption.

Figure 14:
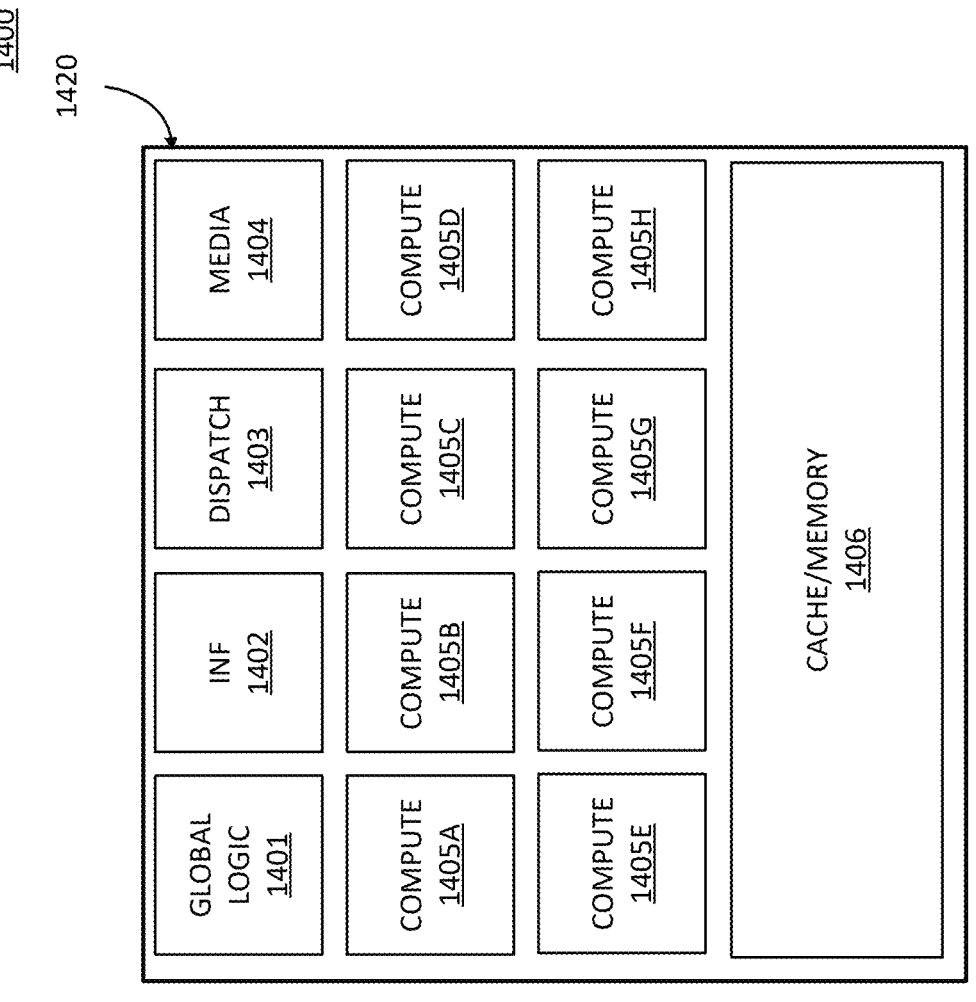
FIG. 14 shows a parallel compute system 1400, according to some examples.

FIG. 14 shows a parallel compute system 1400, according to some examples. In some examples the parallel compute system 1400 includes a parallel processor 1420, which can be a graphics processor or compute accelerator as described herein. The parallel processor 1420 includes a global logic unit 1401, an interface 1402, a thread dispatcher 1403, a media unit 1404, a set of compute units 1405A-1405H, and a cache/memory units 1406. The global logic unit 1401, in some examples, includes global functionality for the parallel processor 1420, including device configuration registers, global schedulers, power management logic, and the like. The interface 1402 can include a front-end interface for the parallel processor 1420. The thread dispatcher 1403 can receive workloads from the interface 1402 and dispatch threads for the workload to the compute units 1405A-1405H. If the workload includes any media operations, at least a portion of those operations can be performed by the media unit 1404. The media unit can also offload some operations to the compute units 1405A-1405H. The cache/memory units 1406 can include cache memory (e.g., L3 cache) and local memory (e.g., HBM, GDDR) for the parallel processor 1420.

Figure 15A:
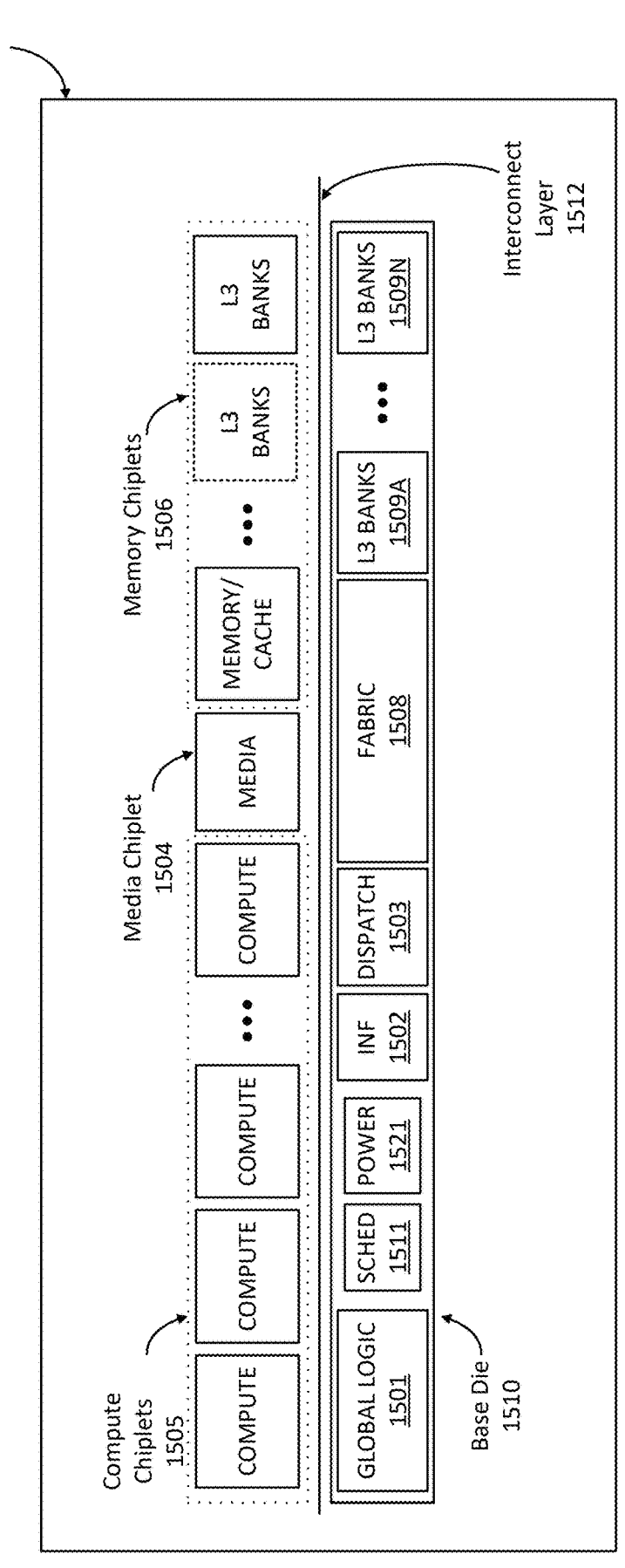
FIGS. 15A-15B illustrate a hybrid logical/physical view of a disaggregated parallel processor, according to examples described herein.
Figure 15B:
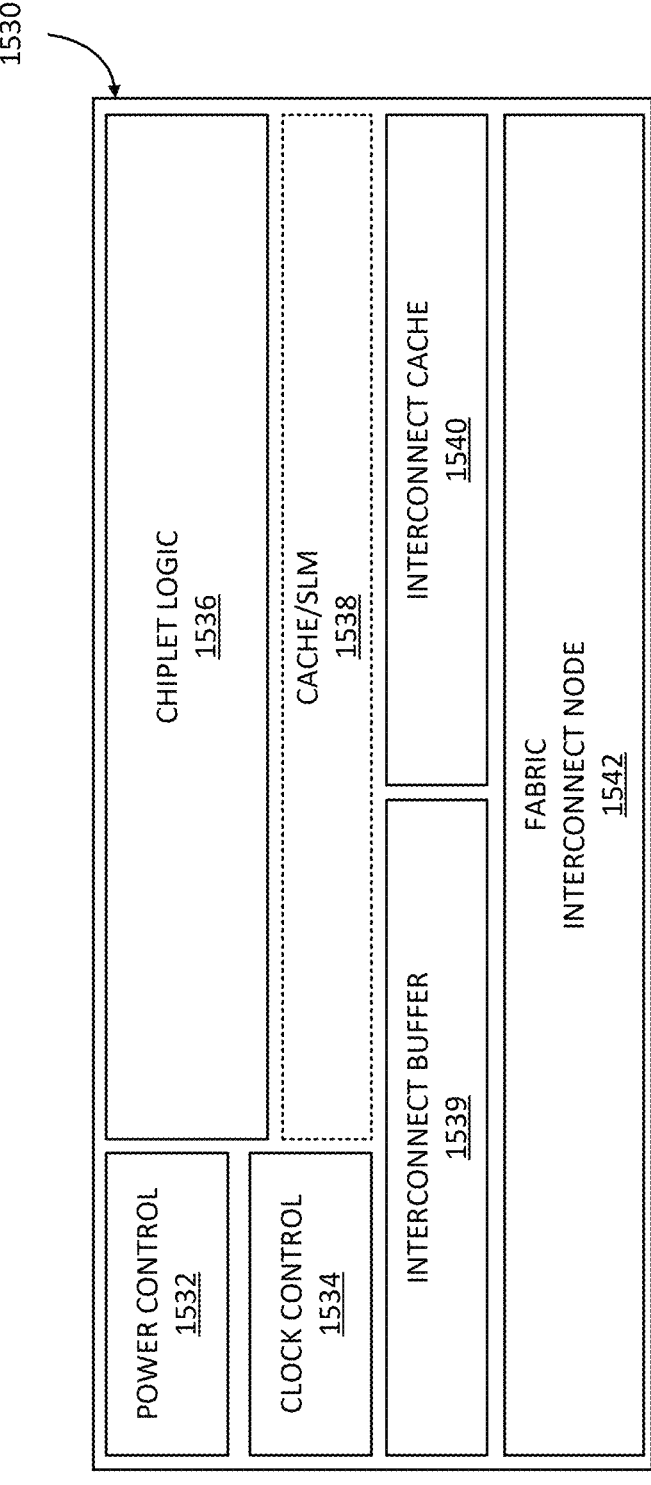

FIGS. 15A-15B illustrate a hybrid logical/physical view of a disaggregated parallel processor, according to examples described herein. FIG. 15A illustrates a disaggregated parallel compute system 1500. FIG. 15B illustrates a chiplet 1530 of the disaggregated parallel compute system 1500.

As shown in FIG. 15A, a disaggregated compute system 1500 can include a parallel processor 1520 in which the various components of the parallel processor SOC are distributed across multiple chiplets. Each chiplet can be a distinct IP core that is independently designed and configured to communicate with other chiplets via one or more common interfaces. The chiplets include but are not limited to compute chiplets 1505, a media chiplet 1504, and memory chiplets 1506. Each chiplet can be separately manufactured using different process technologies. For example, compute chiplets 1505 may be manufactured using the smallest or most advanced process technology available at the time of fabrication, while memory chiplets 1506 or other chiplets (e.g., I/O, networking, etc.) may be manufactured using a larger or less advanced process technologies.

The various chiplets can be bonded to a base die 1510 and configured to communicate with each other and logic within the base die 1510 via an interconnect layer 1512. In some examples, the base die 1510 can include global logic 1501, which can include scheduler 1511 and power management 1521 logic units, an interface 1502, a dispatch unit 1503, and an interconnect fabric module 1508 coupled with or integrated with one or more L3 cache banks 1509A-1509N. The interconnect fabric 1508 can be an inter-chiplet fabric that is integrated into the base die 1510. Logic chiplets can use the fabric 1508 to relay messages between the various chiplets. Additionally, L3 cache banks 1509A-1509N in the base die and/or L3 cache banks within the memory chiplets 1506 can cache data read from and transmitted to DRAM chiplets within the memory chiplets 1506 and to system memory of a host.

In some examples the global logic 1501 is a microcontroller that can execute firmware to perform scheduler 1511 and power management 1521 functionality for the parallel processor 1520. The microcontroller that executes the global logic can be tailored for the target use case of the parallel processor 1520. The scheduler 1511 can perform global scheduling operations for the parallel processor 1520. The power management 1521 functionality can be used to enable or disable individual chiplets within the parallel processor when those chiplets are not in use.

The various chiplets of the parallel processor 1520 can be designed to perform specific functionality that, in existing designs, would be integrated into a single die. A set of compute chiplets 1505 can include clusters of compute units (e.g., execution units, streaming multiprocessors, etc.) that include programmable logic to execute compute or graphics shader instructions. A media chiplet 1504 can include hardware logic to accelerate media encode and decode operations. Memory chiplets 1506 can include volatile memory (e.g., DRAM) and one or more SRAM cache memory banks (e.g., L3 banks).

As shown in FIG. 15B, each chiplet 1530 can include common components and application specific components. Chiplet logic 1536 within the chiplet 1530 can include the specific components of the chiplet, such as an array of streaming multiprocessors, compute units, or execution units described herein. The chiplet logic 1536 can couple with an optional cache or shared local memory 1538 or can include a cache or shared local memory within the chiplet logic 1536. The chiplet 1530 can include a fabric interconnect node 1542 that receives commands via the inter-chiplet fabric. Commands and data received via the fabric interconnect node 1542 can be stored temporarily within an interconnect buffer 1539. Data transmitted to and received from the fabric interconnect node 1542 can be stored in an interconnect cache 1540. Power control 1532 and clock control 1534 logic can also be included within the chiplet. The power control 1532 and clock control 1534 logic can receive configuration commands via the fabric can configure dynamic voltage and frequency scaling for the chiplet 1530. In some examples, each chiplet can have an independent clock domain and power domain and can be clock gated and power gated independently of other chiplets.

At least a portion of the components within the illustrated chiplet 1530 can also be included within logic embedded within the base die 1510 of FIG. 15A. For example, logic within the base die that communicates with the fabric can include a version of the fabric interconnect node 1542. Base die logic that can be independently clock or power gated can include a version of the power control 1532 and/or clock control 1534 logic.

Thus, while various examples described herein use the term SOC to describe a device or system having a processor and associated circuitry (e.g., Input/Output ("I/O") circuitry, power delivery circuitry, memory circuitry, etc.) integrated monolithically into a single Integrated Circuit ("IC") die, or chip, the present disclosure is not limited in that respect. For example, in various examples of the present disclosure, a device or system can have one or more processors (e.g., one or more processor cores) and associated circuitry (e.g., Input/Output ("I/O") circuitry, power delivery circuitry, etc.) arranged in a disaggregated collection of discrete dies, tiles and/or chiplets (e.g., one or more discrete processor core die arranged adjacent to one or more other die such as memory die, I/O die, etc.). In such disaggregated devices and systems the various dies, tiles and/or chiplets can be physically and electrically coupled together by a package structure including, for example, various packaging substrates, interposers, active interposers, photonic interposers, interconnect bridges and the like. The disaggregated collection of discrete dies, tiles, and/or chiplets can also be part of a System-on-Package ("SoP")."

Example Core Architectures-In-Order and Out-of-Order Core Block Diagram.

Figure 16A:
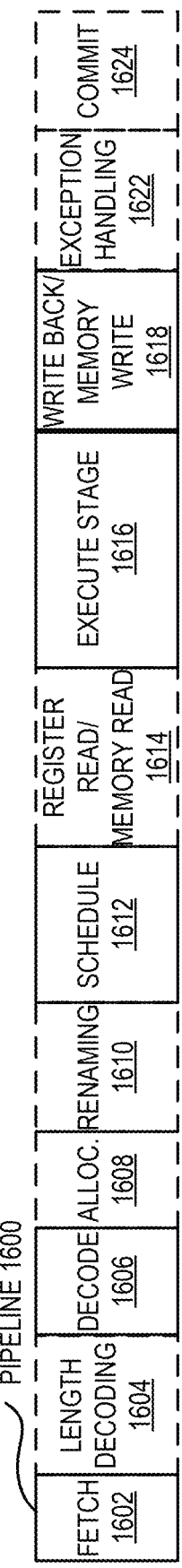
FIG. 16A is a block diagram illustrating both an example in-order pipeline and an example register renaming, out-of-order issue/execution pipeline according to examples.
Figure 16B:
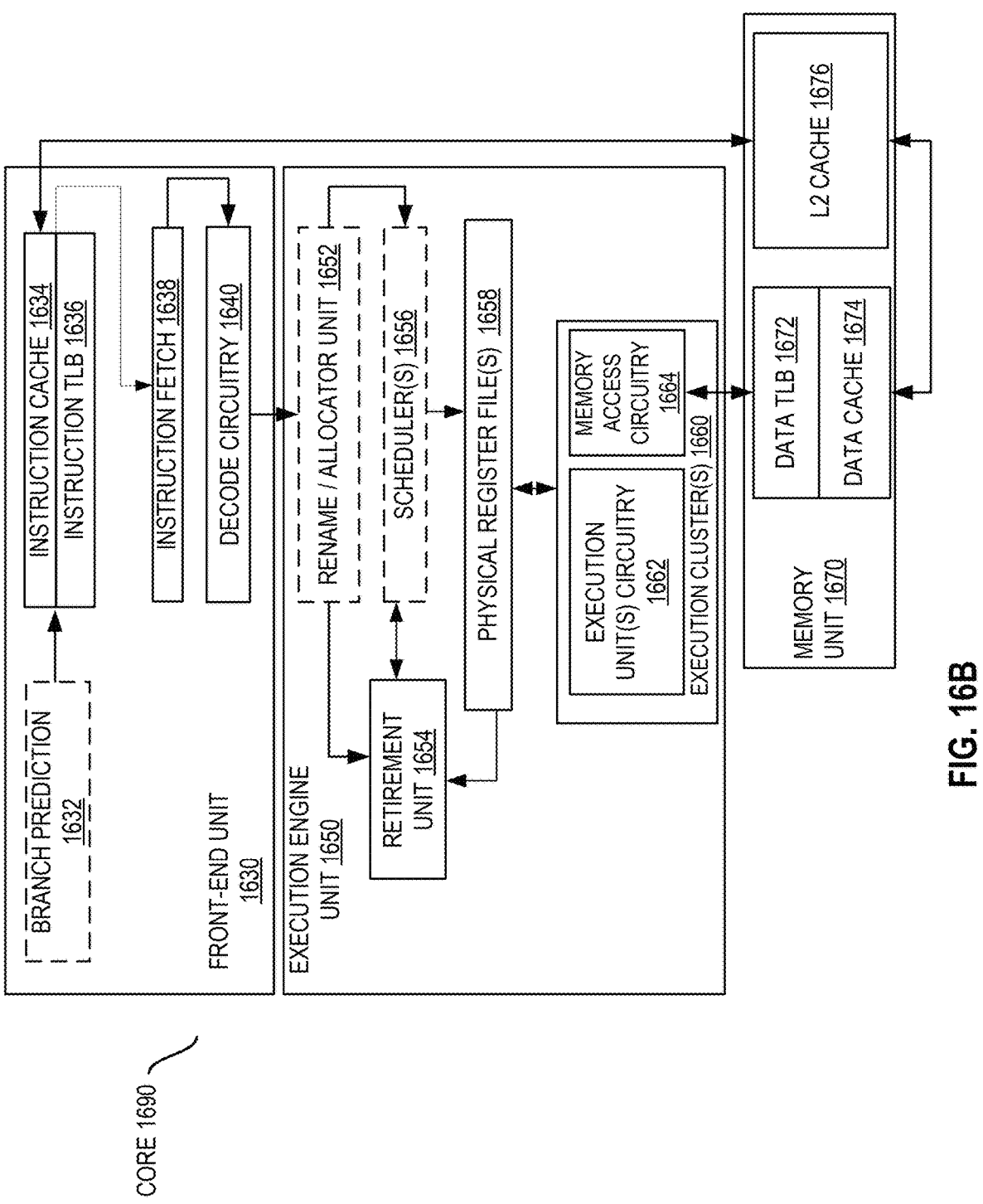
FIG. 16B is a block diagram illustrating both an example in-order architecture core and an example register renaming, out-of-order issue/execution architecture core to be included in a processor according to examples.

FIG. 16A is a block diagram illustrating both an example in-order pipeline and an example register renaming, out-of-order issue/execution pipeline according to examples. FIG. 16B is a block diagram illustrating both an example in-order architecture core and an example register renaming, out-of-order issue/execution architecture core to be included in a processor according to examples. The solid lined boxes in FIGS. 16A-16B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16A, a processor pipeline 1600 includes a fetch stage 1602, an optional length decoding stage 1604, a decode stage 1606, an optional allocation (Alloc) stage 1608, an optional renaming stage 1610, a schedule (also known as a dispatch or issue) stage 1612, an optional register read/memory read stage 1614, an execute stage 1616, a write back/memory write stage 1618, an optional exception handling stage 1622, and an optional commit stage 1624. One or more operations can be performed in each of these processor pipeline stages. For example, during the fetch stage 1602, one or more instructions are fetched from instruction memory, and during the decode stage 1606, the one or more fetched instructions may be decoded, addresses (e.g., load store unit (LSU) addresses) using forwarded register ports may be generated, and branch forwarding (e.g., immediate offset or a link register (LR))

may be performed. In some examples, the decode stage 1606 and the register read/memory read stage 1614 may be combined into one pipeline stage. In some examples, during the execute stage 1616, the decoded instructions may be executed, LSU address/data pipelining to an Advanced Microcontroller Bus (AMB) interface may be performed, multiply and add operations may be performed, arithmetic operations with branch results may be performed, etc.

By way of example, the example register renaming, out-of-order issue/execution architecture core of FIG. 16B may implement the pipeline 1600 as follows: 1) the instruction fetch circuitry 1638 performs the fetch and length decoding stages 1602 and 1604; 2) the decode circuitry 1640 performs the decode stage 1606; 3) the rename/allocator unit circuitry 1652 performs the allocation stage 1608 and renaming stage 1610; 4) the scheduler(s) circuitry 1656 performs the schedule stage 1612; 5) the physical register file(s) circuitry 1658 and the memory unit circuitry 1670 perform the register read/memory read stage 1614; the execution cluster(s) 1660 perform the execute stage 1616; 6) the memory unit circuitry 1670 and the physical register file(s) circuitry 1658 perform the write back/memory write stage 1618; 7) various circuitry may be involved in the exception handling stage 1622; and 8) the retirement unit circuitry 1654 and the physical register file(s) circuitry 1658 perform the commit stage 1624.

FIG. 16B shows a processor core 1690 including front-end unit circuitry 1630 coupled to execution engine unit circuitry 1650, and both are coupled to memory unit circuitry 1670. The core 1690 may be a reduced instruction set architecture computing (RISC) core, a complex instruction set architecture computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like.

The front-end unit circuitry 1630 may include branch prediction circuitry 1632 coupled to instruction cache circuitry 1634, which is coupled to an instruction translation lookaside buffer (TLB) 1636, which is coupled to instruction fetch circuitry 1638, which is coupled to decode circuitry 1640. In some examples, the instruction cache circuitry 1634 is included in the memory unit circuitry 1670 rather than the front-end circuitry 1630. The decode circuitry 1640 (or decoder) may decode instructions, and generate as an output one or more micro-operations, microcode entry points, microinstructions, other instructions, or other control signals, which are decoded from, or which otherwise reflect, or are derived from, the original instructions. The decode circuitry 1640 may further include address generation unit (AGU, not shown) circuitry. In some examples, the AGU generates an LSU address using forwarded register ports, and may further perform branch forwarding (e.g., immediate offset branch forwarding, LR register branch forwarding, etc.). The decode circuitry 1640 may be implemented using various different mechanisms. Examples of suitable mechanisms include, but are not limited to, look-up tables, hardware implementations, programmable logic arrays (PLAs), microcode read only memories (ROMs), etc. In some examples, the core 1690 includes a microcode ROM (not shown) or other medium that stores microcode for certain macroinstructions (e.g., in decode circuitry 1640 or otherwise within the front-end circuitry 1630). In some examples, the decode circuitry 1640 includes a micro-operation (micro-op) or operation cache (not shown) to hold/cache decoded operations, micro-tags, or micro-operations generated during the decode or other stages of the processor pipeline 1600. The decode circuitry 1640 may be coupled to rename/allocator unit circuitry 1652 in the execution engine circuitry 1650.

The execution engine circuitry 1650 includes the rename/allocator unit circuitry 1652 coupled to retirement unit circuitry 1654 and a set of one or more scheduler(s) circuitry 1656. The scheduler(s) circuitry 1656 represents any number of different schedulers, including reservations stations, central instruction window, etc. In some examples, the scheduler(s) circuitry 1656 can include arithmetic logic unit (ALU) scheduler/scheduling circuitry, ALU queues, address generation unit (AGU) scheduler/scheduling circuitry, AGU queues, etc. The scheduler(s) circuitry 1656 is coupled to the physical register file(s) circuitry 1658. Each of the physical register file(s) circuitry 1658 represents one or more physical register files, different ones of which store one or more different data types, such as scalar integer, scalar floating-point, packed integer, packed floating-point, vector integer, vector floating-point, status (e.g., an instruction pointer that is the address of the next instruction to be executed), etc. In some examples, the physical register file(s) circuitry 1658 includes vector registers unit circuitry, writemask registers unit circuitry, and scalar register unit circuitry. These register units may provide architectural vector registers, vector mask registers, general-purpose registers, etc. The physical register file(s) circuitry 1658 is coupled to the retirement unit circuitry 1654 (also known as a retire queue or a retirement queue) to illustrate various ways in which register renaming and out-of-order execution may be implemented (e.g., using a reorder buffer(s) (ROB(s)) and a retirement register file(s); using a future file(s), a history buffer(s), and a retirement register file(s); using a register map and a pool of registers; etc.). The retirement unit circuitry 1654 and the physical register file(s) circuitry 1658 are coupled to the execution cluster(s) 1660. The execution cluster(s) 1660 includes a set of one or more execution unit(s) circuitry 1662 and a set of one or more memory access circuitry 1664. The execution unit(s) circuitry 1662 may perform various arithmetic, logic, floating-point or other types of operations (e.g., shifts, addition, subtraction, multiplication) and on various types of data (e.g., scalar integer, scalar floating-point, packed integer, packed floating-point, vector integer, vector floating-point). While some examples may include a number of execution units or execution unit circuitry dedicated to specific functions or sets of functions, other examples may include only one execution unit circuitry or multiple execution units/execution unit circuitry that all perform all functions. The scheduler(s) circuitry 1656, physical register file(s) circuitry 1658, and execution cluster(s) 1660 are shown as being possibly plural because certain examples create separate pipelines for certain types of data/operations (e.g., a scalar integer pipeline, a scalar floating-point/packed integer/packed floating-point/vector integer/vector floating-point pipeline, and/or a memory access pipeline that each have their own scheduler circuitry, physical register file(s) circuitry, and/or execution cluster—and in the case of a separate memory access pipeline, certain examples are implemented in which only the execution cluster of this pipeline has the memory access unit(s) circuitry 1664). It should also be understood that where separate pipelines are used, one or more of these pipelines may be out-of-order issue/execution and the rest in-order.

In some examples, the execution engine unit circuitry 1650 may perform load store unit (LSU) address/data pipelining to an Advanced Microcontroller Bus (AMB) interface (not shown), and address phase and writeback, data phase load, store, and branches.

The set of memory access circuitry 1664 is coupled to the memory unit circuitry 1670, which includes data TLB circuitry 1672 coupled to data cache circuitry 1674 coupled to level 2 (L2) cache circuitry 1676. In some examples, the memory access circuitry 1664 may include load unit circuitry, store address unit circuitry, and store data unit circuitry, each of which is coupled to the data TLB circuitry 1672 in the memory unit circuitry 1670. The instruction cache circuitry 1634 is further coupled to the level 2 (L2) cache circuitry 1676 in the memory unit circuitry 1670. In some examples, the instruction cache 1634 and the data cache 1674 are combined into a single instruction and data cache (not shown) in L2 cache circuitry 1676, level 3 (L3) cache circuitry (not shown), and/or main memory. The L2 cache circuitry 1676 is coupled to one or more other levels of cache and eventually to a main memory.

The core 1690 may support one or more instructions sets (e.g., the x86 instruction set architecture (optionally with some extensions that have been added with newer versions); the MIPS instruction set architecture; the ARM instruction set architecture (optionally with optional additional extensions such as NEON)), including the instruction(s) described herein. In some examples, the core 1690 includes logic to support a packed data instruction set architecture extension (e.g., AVX1, AVX2), thereby allowing the operations used by many multimedia applications to be performed using packed data.

Example Execution Unit(s) Circuitry.

Figure 17:
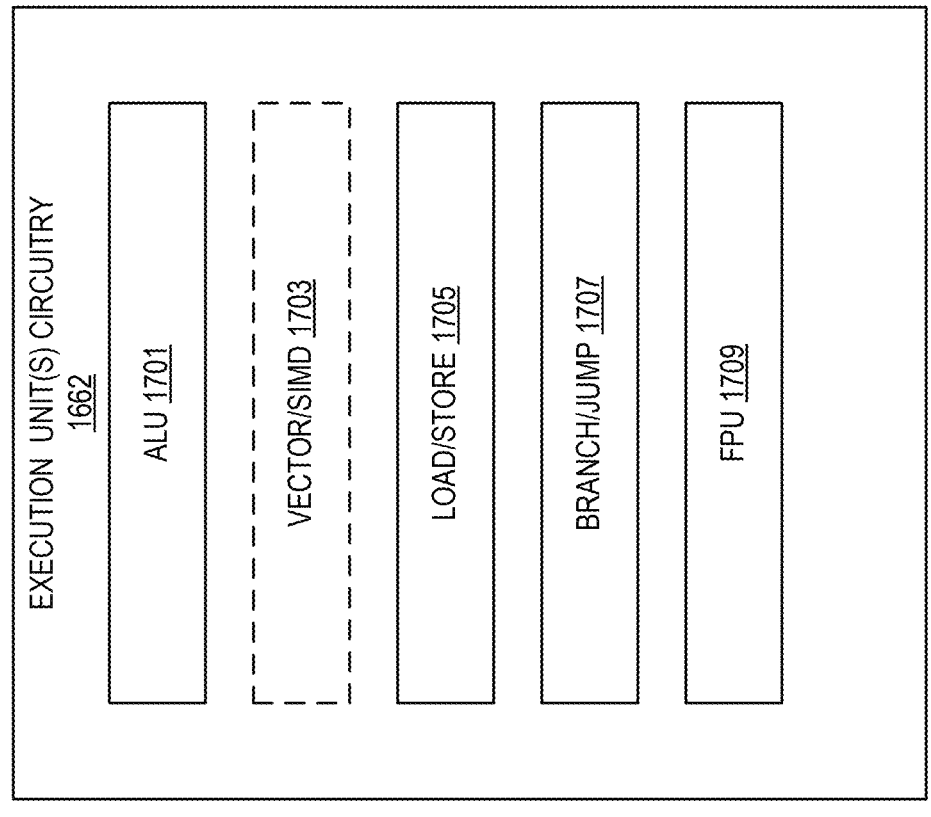
FIG. 17 illustrates examples of execution unit(s) circuitry, such as execution unit(s) circuitry.

FIG. 17 illustrates examples of execution unit(s) circuitry, such as execution unit(s) circuitry 1662 of FIG. 16B. As illustrated, execution unit(s) circuitry 1662 may include one or more ALU circuits 1701, optional vector/single instruction multiple data (SIMD) circuits 1703, load/store circuits 1705, branch/jump circuits 1707, and/or Floating-point unit (FPU) circuits 1709. ALU circuits 1701 perform integer arithmetic and/or Boolean operations. Vector/SIMD circuits 1703 perform vector/SIMD operations on packed data (such as SIMD/vector registers). Load/store circuits 1705 execute load and store instructions to load data from memory into registers or store from registers to memory. Load/store circuits 1705 may also generate addresses. Branch/jump circuits 1707 cause a branch or jump to a memory address depending on the instruction. FPU circuits 1709 perform floating-point arithmetic. The width of the execution unit(s) circuitry 1662 varies depending upon the example and can range from 16-bit to 1,024-bit, for example. In some examples, two or more smaller execution units are logically combined to form a larger execution unit (e.g., two 128-bit execution units are logically combined to form a 256-bit execution unit).

Example Register Architecture.

Figure 18:
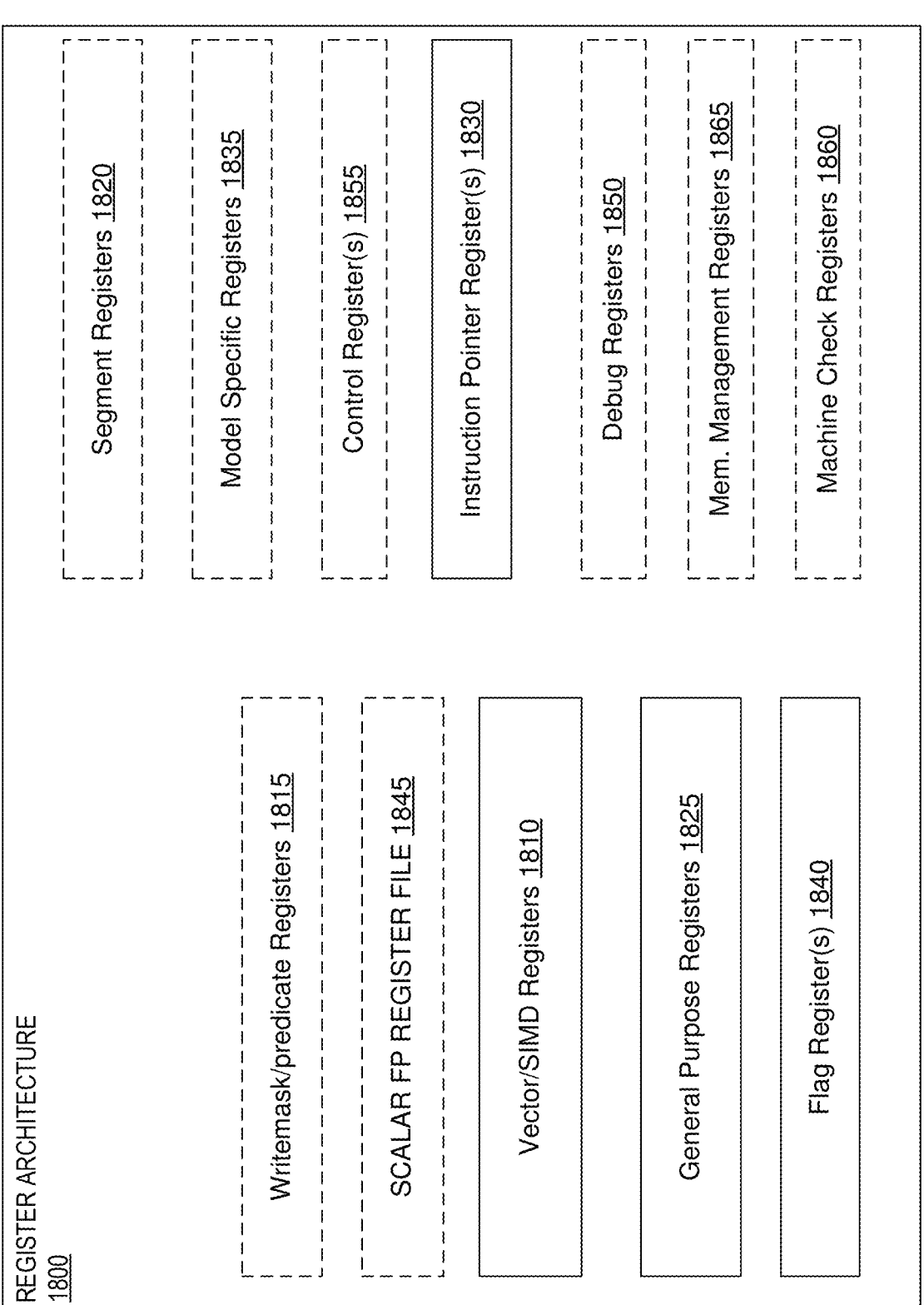
FIG. 18 is a block diagram of a register architecture according to some examples.

FIG. 18 is a block diagram of a register architecture 1800 according to some examples. As illustrated, the register architecture 1800 includes vector/SIMD registers 1810 that vary from 128-bit to 1,024 bits width. In some examples, the vector/SIMD registers 1810 are physically 512-bits and, depending upon the mapping, only some of the lower bits are used. For example, in some examples, the vector/SIMD registers 1810 are ZMM registers which are 512 bits: the lower 256 bits are used for YMM registers and the lower 128 bits are used for XMM registers. As such, there is an overlay of registers. In some examples, a vector length field selects between a maximum length and one or more other shorter lengths, where each such shorter length is half the length of the preceding length. Scalar operations are operations performed on the lowest order data element position in a ZMM/YMM/XMM register; the higher order data element positions are either left the same as they were prior to the instruction or zeroed depending on the example.

In some examples, the register architecture 1800 includes writemask/predicate registers 1815. For example, in some examples, there are 8 writemask/predicate registers (sometimes called k0 through k7) that are each 16-bit, 32-bit, 64-bit, or 128-bit in size. Writemask/predicate registers 1815 may allow for merging (e.g., allowing any set of elements in the destination to be protected from updates during the execution of any operation) and/or zeroing (e.g., zeroing vector masks allow any set of elements in the destination to be zeroed during the execution of any operation). In some examples, each data element position in a given writemask/predicate register 1815 corresponds to a data element position of the destination. In other examples, the writemask/predicate registers 1815 are scalable and consists of a set number of enable bits for a given vector element (e.g., 8 enable bits per 64-bit vector element).

The register architecture 1800 includes a plurality of general-purpose registers 1825. These registers may be 16-bit, 32-bit, 64-bit, etc. and can be used for scalar operations. In some examples, these registers are referenced by the names RAX, RBX, RCX, RDX, RBP, RSI, RDI, RSP, and R8 through R15.

In some examples, the register architecture 1800 includes scalar floating-point (FP) register file 1845 which is used for scalar floating-point operations on 32/64/80-bit floating-point data using the x87 instruction set architecture extension or as MMX registers to perform operations on 64-bit packed integer data, as well as to hold operands for some operations performed between the MMX and XMM registers.

One or more flag registers 1840 (e.g., EFLAGS, RFLAGS, etc.) store status and control information for arithmetic, compare, and system operations. For example, the one or more flag registers 1840 may store condition code information such as carry, parity, auxiliary carry, zero, sign, and overflow. In some examples, the one or more flag registers 1840 are called program status and control registers.

Segment registers 1820 contain segment points for use in accessing memory. In some examples, these registers are referenced by the names CS, DS, SS, ES, FS, and GS.

Model specific registers or machine specific registers (MSRs) 1835 control and report on processor performance. Most MSRs 1835 handle system-related functions and are not accessible to an application program. For example, MSRs may provide control for one or more of: performance-monitoring counters, debug extensions, memory type range registers, thermal and power management, instruction-specific and/or support, processor feature/mode support. Machine check registers 1860 consist of control, status, and error reporting MSRs that are used to detect and report on hardware errors. Control register(s) 1855 (e.g., CR0-CR4) determine the operating mode of a processor (e.g., processor 970, 980, 938, 915, and/or 1000) and the characteristics of a currently executing task. In some examples, MSRs 1835 are a subset of control registers 1855.

One or more instruction pointer register(s) 1830 store an instruction pointer value. Debug registers 1850 control and allow for the monitoring of a processor or core's debugging operations.

Memory (mem) management registers 1865 specify the locations of data structures used in protected mode memory management. These registers may include a global descriptor table register (GDTR), interrupt descriptor table register (IDTR), task register, and a local descriptor table register (LDTR) register.

Alternative examples may use wider or narrower registers. Additionally, alternative examples may use more, less, or different register files and registers. The register architecture 1800 may, for example, be used in register file/memory 608, or physical register file(s) circuitry 1658.

Instruction Set Architectures.

An instruction set architecture (ISA) may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down through the definition of instruction templates (or sub-formats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an example ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. In addition, though the description below is made in the context of x86 ISA, it is within the knowledge of one skilled in the art to apply the teachings of the present disclosure in another ISA.

Example Instruction Formats.

Examples of the instruction(s) described herein may be embodied in different formats. Additionally, example systems, architectures, and pipelines are detailed below. Examples of the instruction(s) may be executed on such systems, architectures, and pipelines, but are not limited to those detailed.

Figure 19:
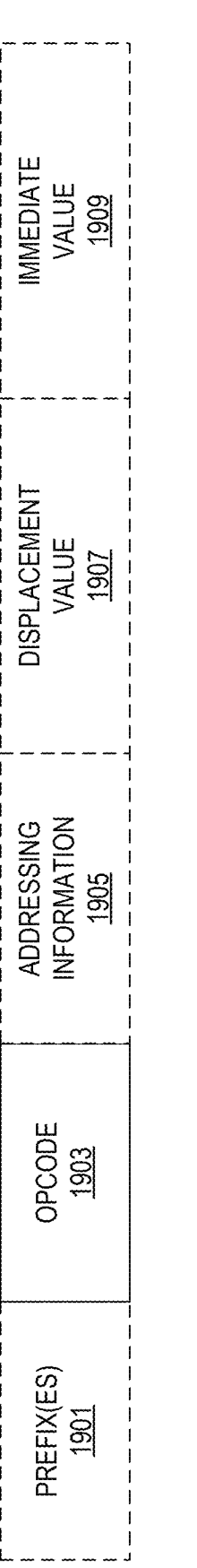
FIG. 19 illustrates examples of an instruction format.

FIG. 19 illustrates examples of an instruction format. As illustrated, an instruction may include multiple components including, but not limited to, one or more fields for: one or more prefixes 1901, an opcode 1903, addressing information 1905 (e.g., register identifiers, memory addressing information, etc.), a displacement value 1907, and/or an immediate value 1909. Note that some instructions utilize some or all the fields of the format whereas others may only use the field for the opcode 1903. In some examples, the order illustrated is the order in which these fields are to be encoded, however, it should be appreciated that in other examples these fields may be encoded in a different order, combined, etc.

The prefix(es) field(s) 1901, when used, modifies an instruction. In some examples, one or more prefixes are used to repeat string instructions (e.g., 0xF0, 0xF2, 0xF3, etc.), to provide section overrides (e.g., 0x2E, 0x36, 0x3E, 0x26, 0x64, 0x65, 0x2E, 0x3E, etc.), to perform bus lock operations, and/or to change operand (e.g., 0x66) and address sizes (e.g., 0x67). Certain instructions require a mandatory prefix (e.g., 0x66, 0xF2, 0xF3, etc.). Certain of these prefixes may be considered "legacy" prefixes. Other prefixes, one or more examples of which are detailed herein, indicate, and/or provide further capability, such as specifying particular registers, etc. The other prefixes typically follow the "legacy" prefixes.

The opcode field 1903 is used to at least partially define the operation to be performed upon a decoding of the instruction. In some examples, a primary opcode encoded in the opcode field 1903 is one, two, or three bytes in length. In other examples, a primary opcode can be a different length. An additional 3-bit opcode field is sometimes encoded in another field.

Figure 20:
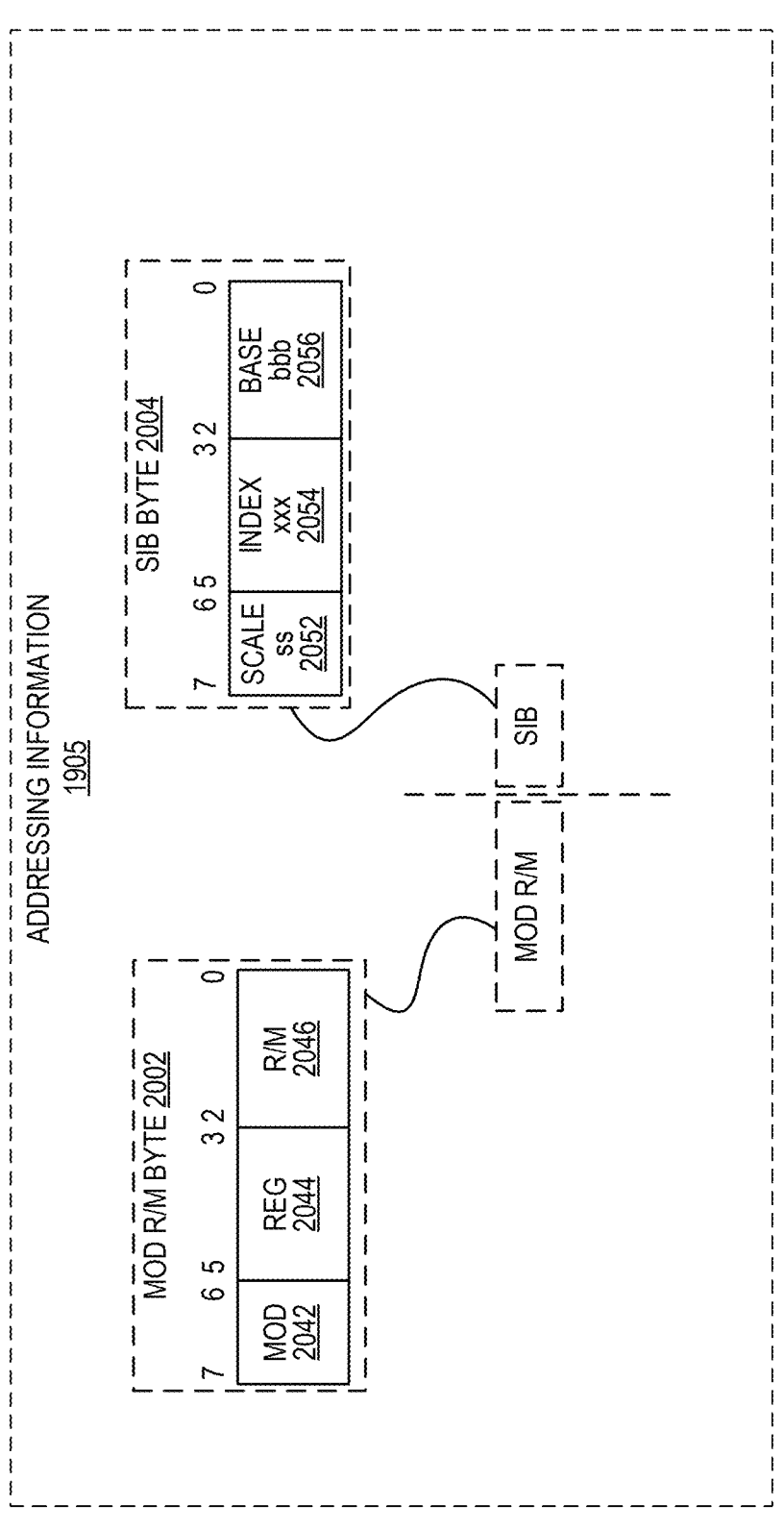
FIG. 20 illustrates examples of an addressing information field.

The addressing information field 1905 is used to address one or more operands of the instruction, such as a location in memory or one or more registers. FIG. 20 illustrates examples of the addressing information field 1905. In this illustration, an optional MOD R/M byte 2002 and an optional Scale, Index, Base (SIB) byte 2004 are shown. The MOD R/M byte 2002 and the SIB byte 2004 are used to encode up to two operands of an instruction, each of which is a direct register or effective memory address. Note that both of these fields are optional in that not all instructions include one or more of these fields. The MOD R/M byte 2002 includes a MOD field 2042, a register (reg) field 2044, and R/M field 2046.

The content of the MOD field 2042 distinguishes between memory access and non-memory access modes. In some examples, when the MOD field 2042 has a binary value of 11 (11b), a register-direct addressing mode is utilized, and otherwise a register-indirect addressing mode is used.

The register field 2044 may encode either the destination register operand or a source register operand or may encode an opcode extension and not be used to encode any instruction operand. The content of register field 2044, directly or through address generation, specifies the locations of a source or destination operand (either in a register or in memory). In some examples, the register field 2044 is supplemented with an additional bit from a prefix (e.g., prefix 1901) to allow for greater addressing.

The R/M field 2046 may be used to encode an instruction operand that references a memory address or may be used to encode either the destination register operand or a source register operand. Note the R/M field 2046 may be combined with the MOD field 2042 to dictate an addressing mode in some examples.

The SIB byte 2004 includes a scale field 2052, an index field 2054, and a base field 2056 to be used in the generation of an address. The scale field 2052 indicates a scaling factor. The index field 2054 specifies an index register to use. In some examples, the index field 2054 is supplemented with an additional bit from a prefix (e.g., prefix 1901) to allow for greater addressing. The base field 2056 specifies a base register to use. In some examples, the base field 2056 is supplemented with an additional bit from a prefix (e.g., prefix 1901) to allow for greater addressing. In practice, the content of the scale field 2052 allows for the scaling of the content of the index field 2054 for memory address generation (e.g., for address generation that uses $2^{scale}*$index+base).

Some addressing forms utilize a displacement value to generate a memory address. For example, a memory address may be generated according to $2^{scale}*$index+base+displacement, index*scale+displacement, r/m+displacement, instruction pointer (RIP/EIP)+displacement, register+displacement, etc. The displacement may be a 1-byte, 2-byte, 4-byte, etc. value. In some examples, the displacement field 1907 provides this value. Additionally, in some examples, a displacement factor usage is encoded in the MOD field of the addressing information field 1905 that indicates a compressed displacement scheme for which a displacement value is calculated and stored in the displacement field 1907.

In some examples, the immediate value field 1909 specifies an immediate value for the instruction. An immediate value may be encoded as a 1-byte value, a 2-byte value, a 4-byte value, etc.

FIG. 21 illustrates examples of a first prefix 1901(A). In some examples, the first prefix 1901(A) is an example of a REX prefix. Instructions that use this prefix may specify general purpose registers, 64-bit packed data registers (e.g., single instruction, multiple data (SIMD) registers or vector registers), and/or control registers and debug registers (e.g., CR8-CR15 and DR8-DR15).

Instructions using the first prefix 1901(A) may specify up to three registers using 3-bit fields depending on the format: 1) using the reg field 2044 and the R/M field 2046 of the MOD R/M byte 2002; 2) using the MOD R/M byte 2002 with the SIB byte 2004 including using the reg field 2044 and the base field 2056 and index field 2054; or 3) using the register field of an opcode.

In the first prefix 1901(A), bit positions of the payload byte 7:4 are set as 0100. Bit position 3 (W) can be used to determine the operand size but may not solely determine operand width. As such, when W=0, the operand size is determined by a code segment descriptor (CS.D) and when W=1, the operand size is 64-bit.

Note that the addition of another bit allows for 16 ($2^4$) registers to be addressed, whereas the MOD R/M reg field 2044 and MOD R/M R/M field 2046 alone can each only address 8 registers.

In the first prefix 1901(A), bit position 2 (R) may be an extension of the MOD R/M reg field 2044 and may be used to modify the MOD R/M reg field 2044 when that field encodes a general-purpose register, a 64-bit packed data register (e.g., an SSE register), or a control or debug register. R is ignored when MOD R/M byte 2002 specifies other registers or defines an extended opcode.

Bit position 1 (X) may modify the SIB byte index field 2054.

Bit position 0 (B) may modify the base in the MOD R/M R/M field 2046 or the SIB byte base field 2056; or it may modify the opcode register field used for accessing general purpose registers (e.g., general purpose registers 1825).

FIGS. 22A-22D illustrate examples of how the R, X, and B fields of the first prefix 1901(A) are used. FIG. 22A illustrates R and B from the first prefix 1901(A) being used to extend the reg field 2044 and R/M field 2046 of the MOD R/M byte 2002 when the SIB byte 2004 is not used for memory addressing. FIG. 22B illustrates R and B from the first prefix 1901(A) being used to extend the reg field 2044 and R/M field 2046 of the MOD R/M byte 2002 when the SIB byte 2004 is not used (register-register addressing). FIG. 22C illustrates R, X, and B from the first prefix 1901(A) being used to extend the reg field 2044 of the MOD R/M byte 2002 and the index field 2054 and base field 2056 when the SIB byte 2004 being used for memory addressing. FIG. 22D illustrates B from the first prefix 1901(A) being used to extend the reg field 2044 of the MOD R/M byte 2002 when a register is encoded in the opcode 1903.

Figures 23A, 23B:
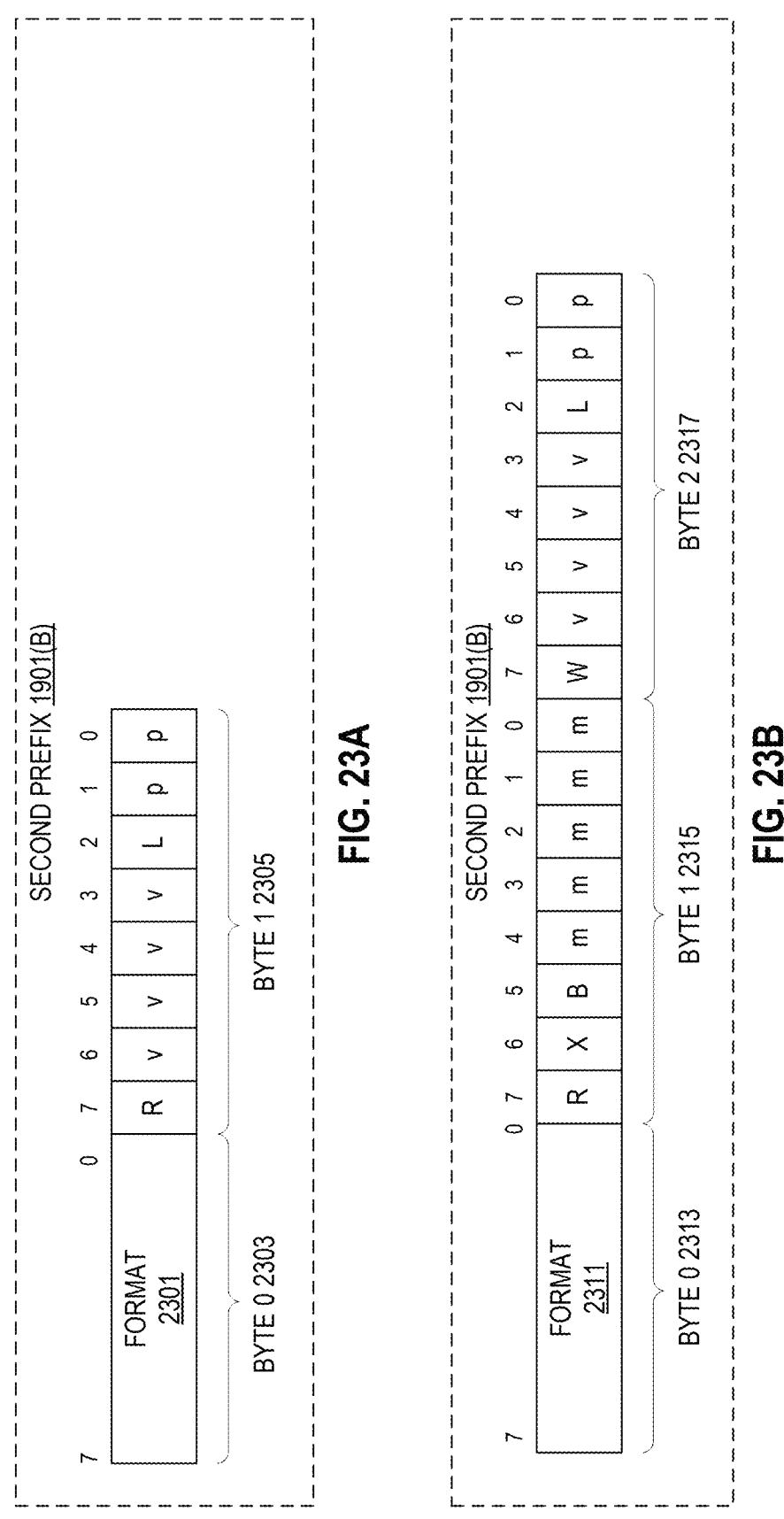
FIGS. 23A-23B illustrate examples of a second prefix.

FIGS. 23A-23B illustrate examples of a second prefix 1901(B). In some examples, the second prefix 1901(B) is an example of a VEX prefix. The second prefix 1901(B) encoding allows instructions to have more than two operands, and allows SIMD vector registers (e.g., vector/SIMD registers 1810) to be longer than 64-bits (e.g., 128-bit and 256-bit). The use of the second prefix 1901(B) provides for three-operand (or more) syntax. For example, previous two-operand instructions performed operations such as A=A+B, which overwrites a source operand. The use of the second prefix 1901(B) enables operands to perform nondestructive operations such as A=B+C.

In some examples, the second prefix 1901(B) comes in two forms—a two-byte form and a three-byte form. The two-byte second prefix 1901(B) is used mainly for 128-bit, scalar, and some 256-bit instructions; while the three-byte second prefix 1901(B) provides a compact replacement of the first prefix 1901(A) and 3-byte opcode instructions.

FIG. 23A illustrates examples of a two-byte form of the second prefix 1901(B). In some examples, a format field 2301 (byte 0 2303) contains the value C5H. In some examples, byte 1 2305 includes an "R" value in bit[7]. This value is the complement of the "R" value of the first prefix 1901(A). Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10=F3H, and 11=F2H). Bits[6:3] shown as vvvv may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the MOD R/M R/M field 2046 to encode the instruction operand that references a memory address or encode either the destination register operand or a source register operand.

Instructions that use this prefix may use the MOD R/M reg field 2044 to encode either the destination register operand or a source register operand, or to be treated as an opcode extension and not used to encode any instruction operand.

For instruction syntax that support four operands, vvvv, the MOD R/M R/M field 2046 and the MOD R/M reg field 2044 encode three of the four operands. Bits[7:4] of the immediate value field 1909 are then used to encode the third source register operand.

FIG. 23B illustrates examples of a three-byte form of the second prefix 1901(B). In some examples, a format field 2311 (byte 0 2313) contains the value C4H. Byte 1 2315 includes in bits[7:5] "R," "X," and "B" which are the complements of the same values of the first prefix 1901(A). Bits[4:0] of byte 1 2315 (shown as mmmmm) include content to encode, as need, one or more implied leading opcode bytes. For example, 00001 implies a 0FH leading opcode, 00010 implies a 0F38H leading opcode, 00011 implies a 0F3AH leading opcode, etc.

Bit[7] of byte 2 2317 is used similar to W of the first prefix 1901(A) including helping to determine promotable operand sizes. Bit[2] is used to dictate the length (L) of the vector (where a value of 0 is a scalar or 128-bit vector and a value of 1 is a 256-bit vector). Bits[1:0] provide opcode extensionality equivalent to some legacy prefixes (e.g., 00=no prefix, 01=66H, 10-F3H, and 11=F2H). Bits[6:3], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

Instructions that use this prefix may use the MOD R/M R/M field 2046 to encode the instruction operand that references a memory address or encode either the destination register operand or a source register operand.

Instructions that use this prefix may use the MOD R/M reg field 2044 to encode either the destination register operand or a source register operand, or to be treated as an opcode extension and not used to encode any instruction operand.

For instruction syntax that support four operands, vvvv, the MOD R/M R/M field 2046, and the MOD R/M reg field 2044 encode three of the four operands. Bits[7:4] of the immediate value field 1909 are then used to encode the third source register operand.

Figure 24:
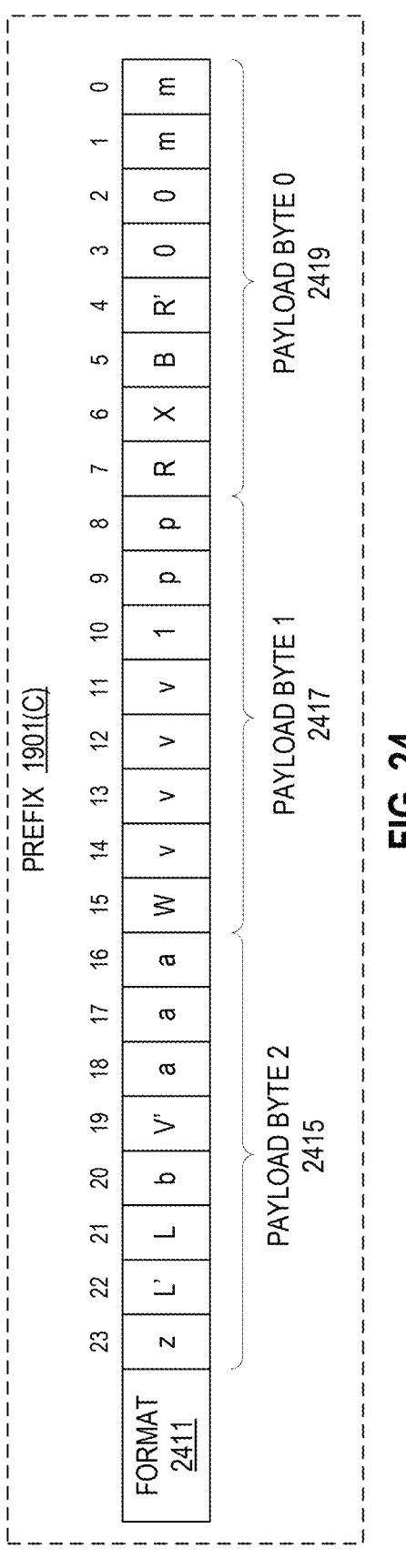
FIG. 24 illustrates examples of a third prefix.

FIG. 24 illustrates examples of a third prefix 1901(C). In some examples, the third prefix 1901(C) is an example of an EVEX prefix. The third prefix 1901(C) is a four-byte prefix.

The third prefix 1901(C) can encode 32 vector registers (e.g., 128-bit, 256-bit, and 512-bit registers) in 64-bit mode. In some examples, instructions that utilize a writemask/opmask (see discussion of registers in a previous figure, such as FIG. 18) or predication utilize this prefix. Opmask register allow for conditional processing or selection control. Opmask instructions, whose source/destination operands are opmask registers and treat the content of an opmask register as a single value, are encoded using the second prefix 1901(B).

The third prefix 1901(C) may encode functionality that is specific to instruction classes (e.g., a packed instruction with "load+op" semantic can support embedded broadcast functionality, a floating-point instruction with rounding semantic can support static rounding functionality, a floating-point instruction with non-rounding arithmetic semantic can support "suppress all exceptions" functionality, etc.).

The first byte of the third prefix 1901(C) is a format field 2411 that has a value, in some examples, of 62H. Subsequent bytes are referred to as payload bytes 2415-2419 and collectively form a 24-bit value of P[23:0] providing specific capability in the form of one or more fields (detailed herein).

In some examples, P[1:0] of payload byte 2419 are identical to the low two mm bits. P[3:2] are reserved in some examples. Bit P[4] (R') allows access to the high 16 vector register set when combined with P[7] and the MOD R/M reg field 2044. P[6] can also provide access to a high 16 vector register when SIB-type addressing is not needed. P[7:5] consist of R, X, and B which are operand specifier modifier bits for vector register, general purpose register, memory addressing and allow access to the next set of 8 registers beyond the low 8 registers when combined with the MOD R/M register field 2044 and MOD R/M R/M field 2046. P[9:8] provide opcode extensionality equivalent to some legacy prefixes (e.g., 00=no prefix, 01=66H, 10=F3H, and 11=F2H). P[10] in some examples is a fixed value of 1. P[14:11], shown as vvvv, may be used to: 1) encode the first source register operand, specified in inverted (1s complement) form and valid for instructions with 2 or more source operands; 2) encode the destination register operand, specified in 1s complement form for certain vector shifts; or 3) not encode any operand, the field is reserved and should contain a certain value, such as 1111b.

P[15] is similar to W of the first prefix 1901(A) and second prefix 1901(B) and may serve as an opcode extension bit or operand size promotion.

P[18:16] specify the index of a register in the opmask (writemask) registers (e.g., writemask/predicate registers 1815). In some examples, the specific value aaa=000 has a special behavior implying no opmask is used for the particular instruction (this may be implemented in a variety of ways including the use of an opmask hardwired to all ones or hardware that bypasses the masking hardware). When merging, vector masks allow any set of elements in the destination to be protected from updates during the execution of any operation (specified by the base operation and the augmentation operation); in other some examples, preserving the old value of each element of the destination where the corresponding mask bit has a 0. In contrast, when zeroing vector masks allow any set of elements in the destination to be zeroed during the execution of any operation (specified by the base operation and the augmentation operation); in some examples, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the opmask field allows for partial vector operations, including loads, stores, arithmetic, logical, etc. While examples are described in which the opmask field's content selects one of a number of opmask registers that contains the opmask to be used (and thus the opmask field's content indirectly identifies that masking to be performed), alternative examples instead or additional allow the mask write field's content to directly specify the masking to be performed.

P[19] can be combined with P[14:11] to encode a second source vector register in a non-destructive source syntax which can access an upper 16 vector registers using P[19]. P[20] encodes multiple functionalities, which differs across different classes of instructions and can affect the meaning of the vector length/rounding control specifier field (P[22: 21]). P[23] indicates support for merging-writemasking (e.g., when set to 0) or support for zeroing and merging-writemasking (e.g., when set to 1).

Example examples of encoding of registers in instructions using the third prefix 1901(C) are detailed in the following tables.

TABLE 1

| 32-Register Support in 64-bit Mode | | | | | |
|---|---|---|---|---|---|
| | 4 | 3 | [2:0] | REG. TYPE | COMMON USAGES |
| REG | R' | R | MOD R/M reg | GPR, Vector | Destination or Source |
| VVVV | V' | | vvvv | GPR, Vector | 2nd Source or Destination |
| RM | X | B | MOD R/M R/M | GPR, Vector | 1st Source or Destination |
| BASE | 0 | B | MOD R/M R/M | GPR | Memory addressing |
| INDEX | 0 | X | SIB.index | GPR | Memory addressing |
| VIDX | V' | X | SIB.index | Vector | VSIB memory addressing |

TABLE 2

| Encoding Register Specifiers in 32-bit Mode | | | |
|---|---|---|---|
| | [2:0] | REG. TYPE | COMMON USAGES |
| REG | MOD R/M reg | GPR, Vector | Destination or Source |
| VVVV | vvvv | GPR, Vector | $2^{nd}$ Source or Destination |
| RM | MOD R/M R/M | GPR, Vector | $1^{st}$ Source or Destination |
| BASE | MOD R/M R/M | GPR | Memory addressing |
| INDEX | SIB.index | GPR | Memory addressing |
| VIDX | SIB.index | Vector | VSIB memory addressing |

TABLE 3

| Opmask Register Specifier Encoding | | | |
|---|---|---|---|
| | [2:0] | REG. TYPE | COMMON USAGES |
| REG | MOD R/M Reg | k0-k7 | Source |
| VVVV | vvvv | k0-k7 | $2^{nd}$ Source |
| RM | MOD R/M R/M | k0-k7 | $1^{st}$ Source |
| {k1} | aaa | k0-k7 | Opmask |

Graphics Execution Units

Figure 25A:
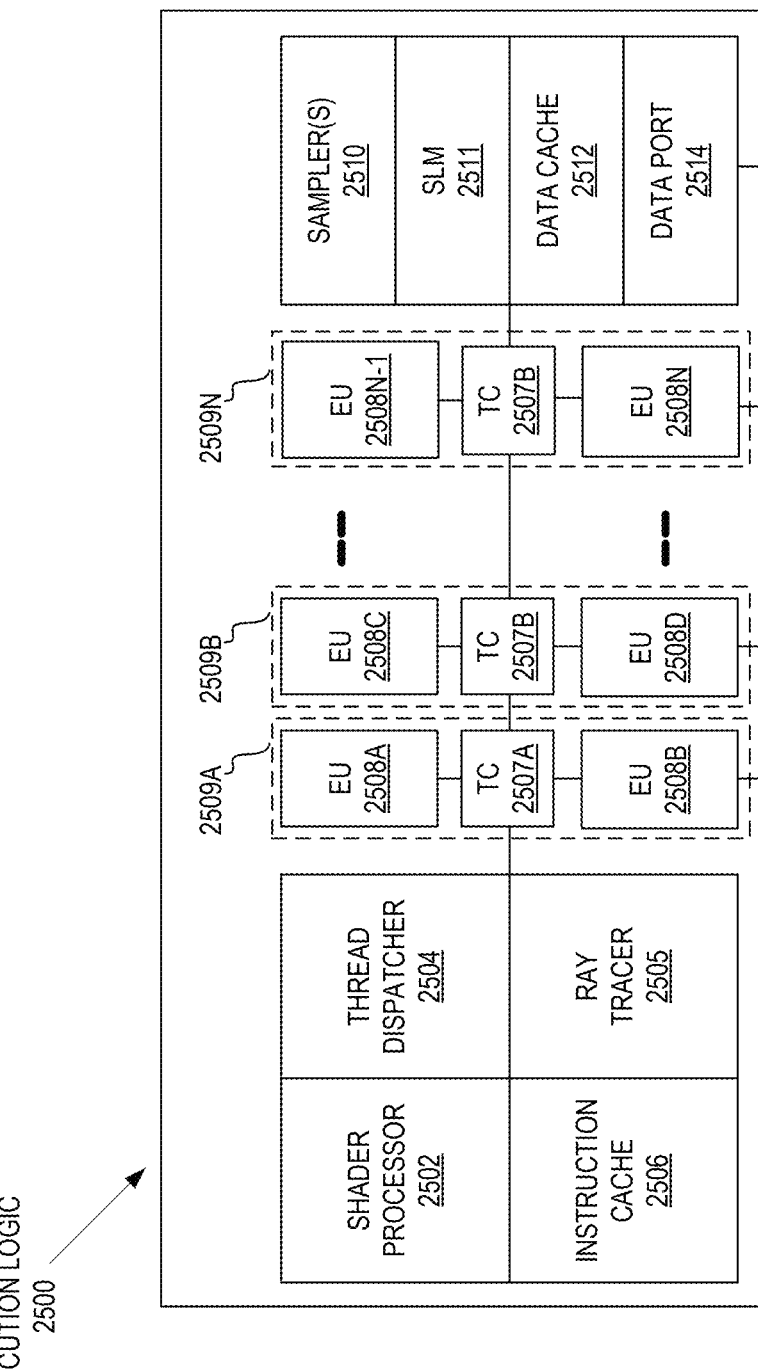
FIGS. 25A-25B illustrate thread execution logic including an array of processing elements employed in a graphics processor core according to examples described herein.
Figure 25B:
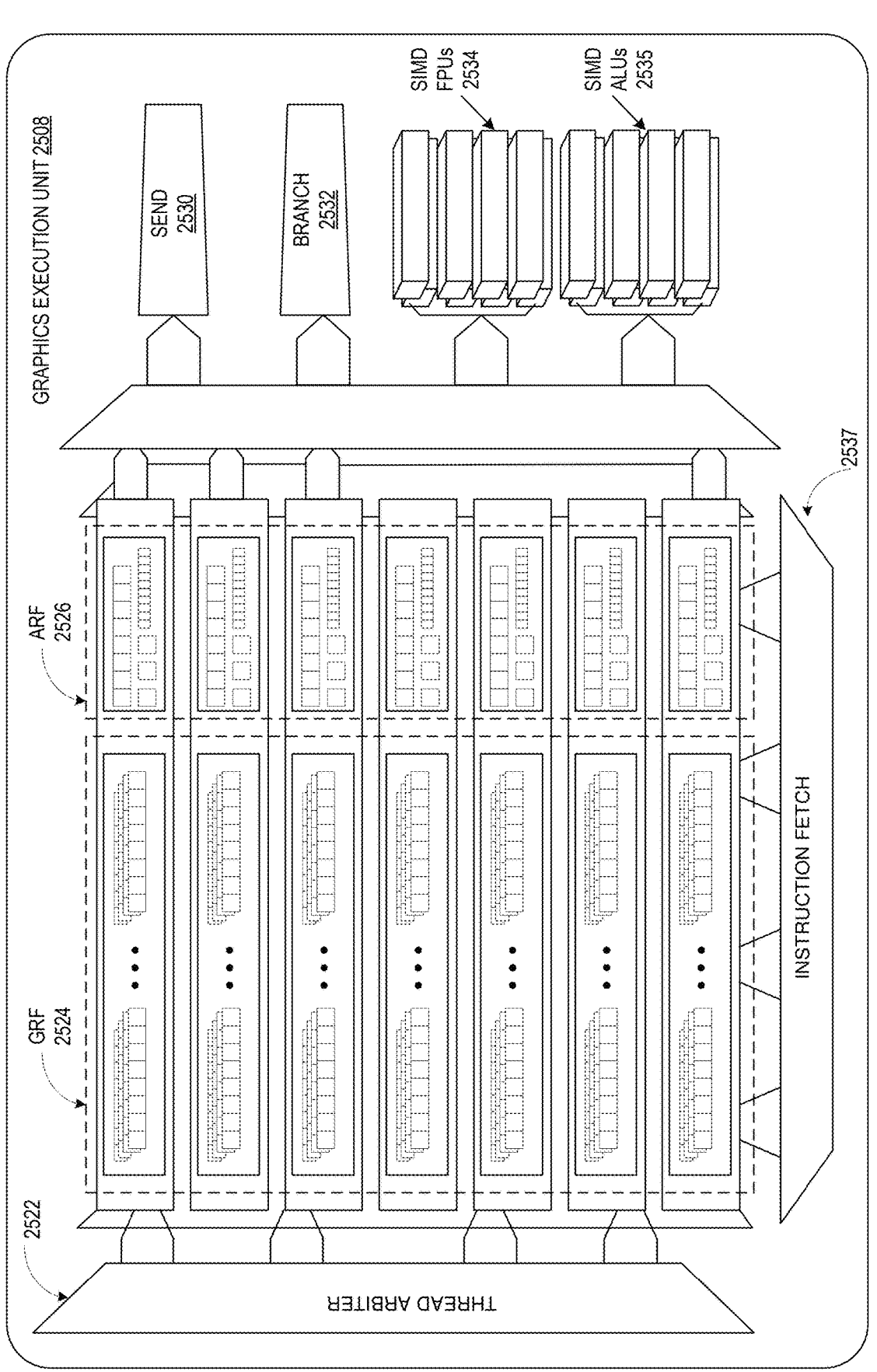

FIGS. 25A-25B illustrate thread execution logic 2500 including an array of processing elements employed in a graphics processor core according to examples described herein. Elements of FIGS. 25A-25B having the same reference numbers (or names) as the elements of any other figure herein can operate or function in any manner similar to that described elsewhere herein, but are not limited to such. FIG. 25A is representative of an execution unit within a general-purpose graphics processor, while FIG. 25B is representative of an execution unit that may be used within a compute accelerator.

As illustrated in FIG. 25A, in some examples thread execution logic 2500 includes a shader processor 2502, a thread dispatcher 2504, instruction cache 2506, a scalable execution unit array including a plurality of execution units 2508A-2508N, a sampler 2510, shared local memory 2511, a data cache 2512, and a data port 2514. In some examples the scalable execution unit array can dynamically scale by enabling or disabling one or more execution units (e.g., any of execution units 2508A, 2508B, 2508C, 2508D, through 2508N-1 and 2508N) based on the computational requirements of a workload. In some examples the included components are interconnected via an interconnect fabric that links to each of the components. In some examples, thread execution logic 2500 includes one or more connections to memory, such as system memory or cache memory, through one or more of instruction cache 2506, data port 2514, sampler 2510, and execution units 2508A-2508N. In some examples, each execution unit (e.g., 2508A) is a stand-alone programmable general-purpose computational unit that is capable of executing multiple simultaneous hardware threads while processing multiple data elements in parallel for each thread. In various examples, the array of execution units 2508A-2508N is scalable to include any number individual execution units.

In some examples, the execution units 2508A-2508N are primarily used to execute shader programs. A shader processor 2502 can process the various shader programs and dispatch execution threads associated with the shader programs via a thread dispatcher 2504. In some examples the thread dispatcher includes logic to arbitrate thread initiation requests from the graphics and media pipelines and instantiate the requested threads on one or more execution unit in the execution units 2508A-2508N. For example, a geometry pipeline can dispatch vertex, tessellation, or geometry shaders to the thread execution logic for processing. In some examples, thread dispatcher 2504 can also process runtime thread spawning requests from the executing shader programs.

In some examples, the execution units 2508A-2508N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 2508A-2508N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 2508A-2508N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader. Various examples can apply to use execution by use of Single Instruction Multiple Thread (SIMT) as an alternate to use of SIMD or in addition to use of SIMD. Reference to a SIMD core or operation can apply also to SIMT or apply to SIMD in combination with SIMT.

Each execution unit in execution units 2508A-2508N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some examples, execution units 2508A-2508N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In some examples one or more execution units can be combined into a fused execution unit 2509A-2509N having thread control logic (2507A-2507N) that is common to the fused EUs. Multiple EUs can be fused into an EU group. Each EU in the fused EU group can be configured to execute a separate SIMD hardware thread. The number of EUs in a fused EU group can vary according to examples. Additionally, various SIMD widths can be performed per-EU, including but not limited to SIMD8, SIMD16, and SIMD32. Each fused graphics execution unit 2509A-2509N includes at least two execution units. For example, fused execution unit 2509A includes a first EU 2508A, second EU 2508B, and thread control logic 2507A that is common to the first EU 2508A and the second EU 2508B. The thread control logic 2507A controls threads executed on the fused graphics execution unit 2509A, allowing each EU within the fused execution units 2509A-2509N to execute using a common instruction pointer register.

One or more internal instruction caches (e.g., 2506) are included in the thread execution logic 2500 to cache thread instructions for the execution units. In some examples, one or more data caches (e.g., 2512) are included to cache thread data during thread execution. Threads executing on the execution logic 2500 can also store explicitly managed data in the shared local memory 2511. In some examples, a sampler 2510 is included to provide texture sampling for 3D operations and media sampling for media operations. In some examples, sampler 2510 includes specialized texture or media sampling functionality to process texture or media data during the sampling process before providing the sampled data to an execution unit.

During execution, the graphics and media pipelines send thread initiation requests to thread execution logic 2500 via thread spawning and dispatch logic. Once a group of geometric objects has been processed and rasterized into pixel data, pixel processor logic (e.g., pixel shader logic, fragment shader logic, etc.) within the shader processor 2502 is invoked to further compute output information and cause results to be written to output surfaces (e.g., color buffers, depth buffers, stencil buffers, etc.). In some examples, a pixel shader or fragment shader calculates the values of the various vertex attributes that are to be interpolated across the rasterized object. In some examples, pixel processor logic within the shader processor 2502 then executes an application programming interface (API)-supplied pixel or fragment shader program. To execute the shader program, the shader processor 2502 dispatches threads to an execution unit (e.g., 2508A) via thread dispatcher 2504. In some examples, shader processor 2502 uses texture sampling logic in the sampler 2510 to access texture data in texture maps stored in memory. Arithmetic operations on the texture data and the input geometry data compute pixel color data for each geometric fragment, or discards one or more pixels from further processing.

In some examples, the data port 2514 provides a memory access mechanism for the thread execution logic 2500 to output processed data to memory for further processing on a graphics processor output pipeline. In some examples, the data port 2514 includes or couples to one or more cache memories (e.g., data cache 2512) to cache data for memory access via the data port.

In some examples, the execution logic 2500 can also include a ray tracer 2505 that can provide ray tracing acceleration functionality. The ray tracer 2505 can support a ray tracing instruction set that includes instructions/functions for ray generation.

FIG. 25B illustrates exemplary internal details of an execution unit 2508, according to examples. A graphics execution unit 2508 can include an instruction fetch unit 2537, a general register file array (GRF) 2524, an architectural register file array (ARF) 2526, a thread arbiter 2522, a send unit 2530, a branch unit 2532, a set of SIMD floating point units (FPUs) 2534, and in some examples a set of dedicated integer SIMD ALUs 2535. The GRF 2524 and ARF 2526 includes the set of general register files and architecture register files associated with each simultaneous hardware thread that may be active in the graphics execution unit 2508. In some examples, per thread architectural state is maintained in the ARF 2526, while data used during thread execution is stored in the GRF 2524. The execution state of each thread, including the instruction pointers for each thread, can be held in thread-specific registers in the ARF 2526.

In some examples the graphics execution unit 2508 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per execution unit, where execution unit resources are divided across logic used to execute multiple simultaneous threads. The number of logical threads that may be executed by the graphics execution unit 2508 is not limited to the number of hardware threads, and multiple logical threads can be assigned to each hardware thread.

In some examples, the graphics execution unit 2508 can co-issue multiple instructions, which may each be different instructions. The thread arbiter 2522 of the graphics execution unit thread 2508 can dispatch the instructions to one of the send unit 2530, branch unit 2532, or SIMD FPU(s) 2534 for execution. Each execution thread can access 128 general-purpose registers within the GRF 2524, where each register can store 32 bytes, accessible as a SIMD 8-element vector of 32-bit data elements. In some examples, each execution unit thread has access to 4 Kbytes within the GRF 2524, although examples are not so limited, and greater or fewer register resources may be provided in other examples. In some examples the graphics execution unit 2508 is partitioned into seven hardware threads that can independently perform computational operations, although the number of threads per execution unit can also vary according to examples. For example, in some examples up to 16 hardware threads are supported. In an example in which seven threads may access 4 Kbytes, the GRF 2524 can store a total of 28 Kbytes. Where 16 threads may access 4 Kbytes, the GRF 2524 can store a total of 64 Kbytes. Flexible addressing modes can permit registers to be addressed together to build effectively wider registers or to represent strided rectangular block data structures.

In some examples, memory operations, sampler operations, and other longer-latency system communications are dispatched via "send" instructions that are executed by the message passing send unit 2530. In some examples, branch instructions are dispatched to a dedicated branch unit 2532 to facilitate SIMD divergence and eventual convergence.

In some examples the graphics execution unit 2508 includes one or more SIMD floating point units (FPU(s)) 2534 to perform floating-point operations. In some examples, the FPU(s) 2534 also support integer computation. In some examples the FPU(s) 2534 can SIMD execute up to M number of 32-bit floating-point (or integer) operations, or SIMD execute up to 2M 16-bit integer or 16-bit floating-point operations. In some examples, at least one of the FPU(s) provides extended math capability to support high-throughput transcendental math functions and double precision 64-bit floating-point. In some examples, a set of 8-bit integer SIMD ALUs 2535 are also present, and may be specifically optimized to perform operations associated with machine learning computations.

In some examples, arrays of multiple instances of the graphics execution unit 2508 can be instantiated in a graphics sub-core grouping (e.g., a sub-slice). For scalability, product architects can choose the exact number of execution units per sub-core grouping. In some examples the execution unit 2508 can execute instructions across a plurality of execution channels. In a further example, each thread executed on the graphics execution unit 2508 is executed on a different channel.

Figure 26:
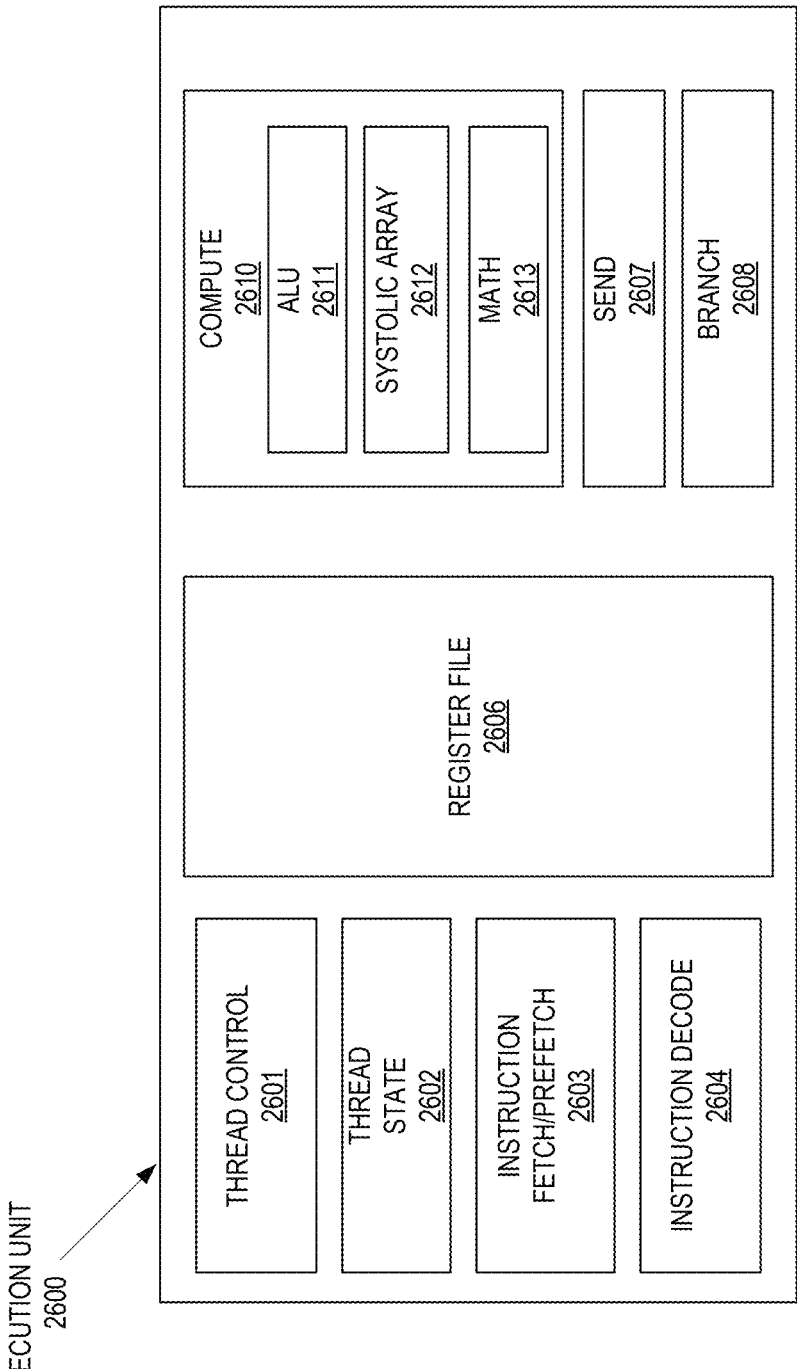
FIG. 26 illustrates an additional execution unit, according to an example.

FIG. 26 illustrates an additional execution unit 2600, according to an example. In some examples, the execution unit 2600 includes a thread control unit 2601, a thread state unit 2602, an instruction fetch/prefetch unit 2603, and an instruction decode unit 2604. The execution unit 2600 additionally includes a register file 2606 that stores registers that can be assigned to hardware threads within the execution unit. The execution unit 2600 additionally includes a send unit 2607 and a branch unit 2608. In some examples, the send unit 2607 and branch unit 2608 can operate similarly as the send unit 2530 and a branch unit 2532 of the graphics execution unit 2508 of FIG. 25B.

The execution unit 2600 also includes a compute unit 2610 that includes multiple different types of functional units. In some examples the compute unit 2610 includes an ALU unit 2611 that includes an array of arithmetic logic units. The ALU unit 2611 can be configured to perform 64-bit, 32-bit, and 16-bit integer and floating point operations. Integer and floating point operations may be performed simultaneously. The compute unit 2610 can also include a systolic array 2612, and a math unit 2613. The systolic array 2612 includes a W wide and D deep network of data processing units that can be used to perform vector or other data-parallel operations in a systolic manner. In some examples the systolic array 2612 can be configured to perform matrix operations, such as matrix dot product operations. In some examples the systolic array 2612 support 16-bit floating point operations, as well as 8-bit and 4-bit integer operations. In some examples the systolic array 2612 can be configured to accelerate machine learning operations. In such examples, the systolic array 2612 can be configured with support for the bfloat 16-bit floating point format. In some examples, a math unit 2613 can be included to perform a specific subset of mathematical operations in an efficient and lower-power manner than the ALU unit 2611. The math unit 2613 can include a variant of math logic that may be found in shared function logic of a graphics processing engine provided by other examples. In some examples the math unit 2613 can be configured to perform 32-bit and 64-bit floating point operations.

The thread control unit 2601 includes logic to control the execution of threads within the execution unit. The thread control unit 2601 can include thread arbitration logic to start, stop, and preempt execution of threads within the execution unit 2600. The thread state unit 2602 can be used to store thread state for threads assigned to execute on the execution unit 2600. Storing the thread state within the execution unit 2600 enables the rapid pre-emption of threads when those threads become blocked or idle. The instruction fetch/prefetch unit 2603 can fetch instructions from an instruction cache of higher level execution logic (e.g., instruction cache 2506 as in FIG. 25A). The instruction fetch/prefetch unit 2603 can also issue prefetch requests for instructions to be loaded into the instruction cache based on an analysis of currently executing threads. The instruction decode unit 2604 can be used to decode instructions to be executed by the compute units. In some examples, the instruction decode unit 2604 can be used as a secondary decoder to decode complex instructions into constituent micro-operations.

The execution unit 2600 additionally includes a register file 2606 that can be used by hardware threads executing on the execution unit 2600. Registers in the register file 2606 can be divided across the logic used to execute multiple simultaneous threads within the compute unit 2610 of the execution unit 2600. The number of logical threads that may be executed by the graphics execution unit 2600 is not limited to the number of hardware threads, and multiple logical threads can be assigned to each hardware thread. The size of the register file 2606 can vary across examples based on the number of supported hardware threads. In some examples, register renaming may be used to dynamically allocate registers to hardware threads.

Figure 27:
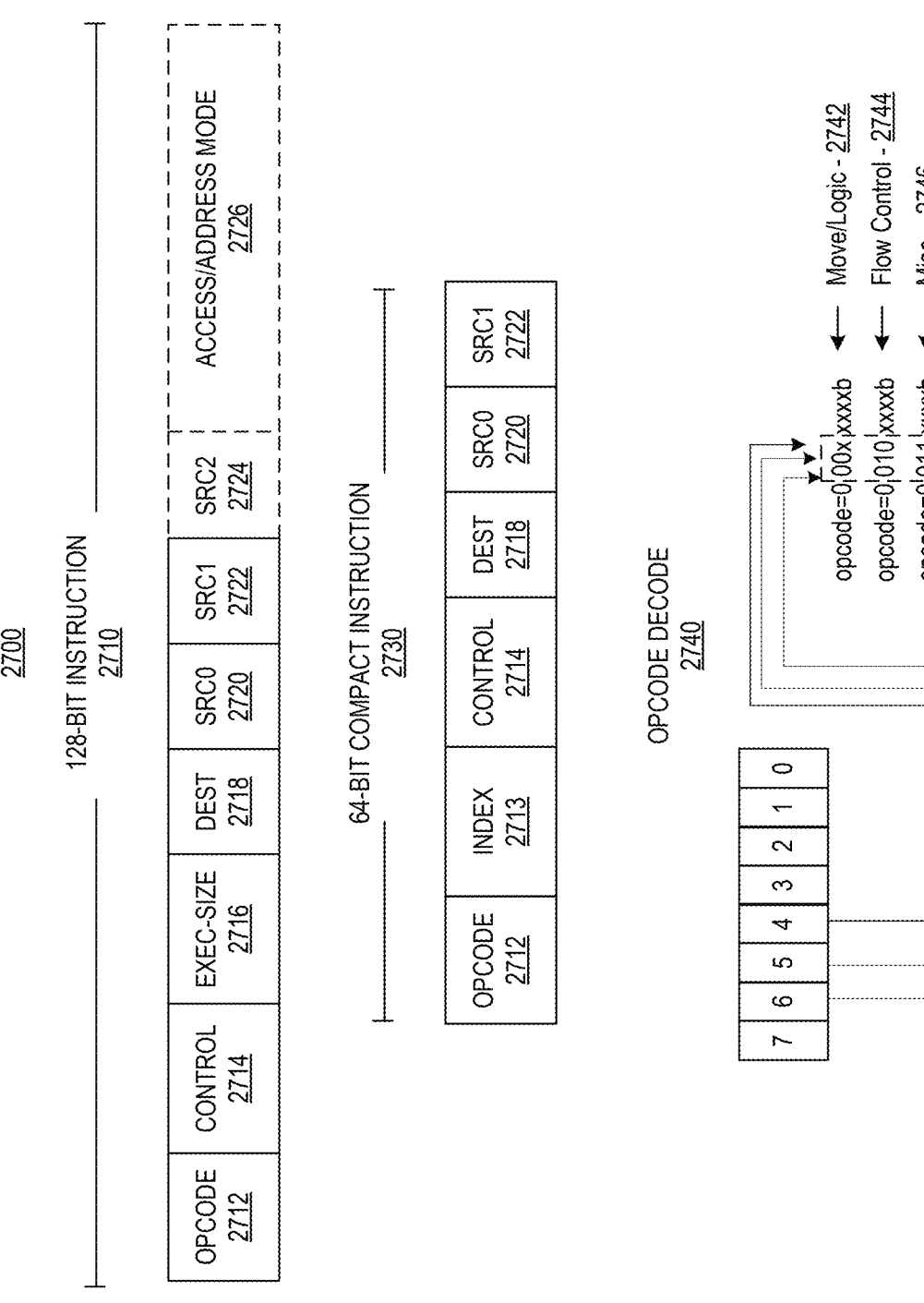
FIG. 27 is a block diagram illustrating a graphics processor instruction formats 2700 according to some examples.

FIG. 27 is a block diagram illustrating a graphics processor instruction formats 2700 according to some examples. In one or more example, the graphics processor execution units support an instruction set having instructions in multiple formats. The solid lined boxes illustrate the components that are generally included in an execution unit instruction, while the dashed lines include components that are optional or that are only included in a sub-set of the instructions. In some examples, instruction format 2700 described and illustrated are macro-instructions, in that they are instructions supplied to the execution unit, as opposed to micro-operations resulting from instruction decode once the instruction is processed.

In some examples, the graphics processor execution units natively support instructions in a 128-bit instruction format 2710. A 64-bit compacted instruction format 2730 is available for some instructions based on the selected instruction, instruction options, and number of operands. The native 128-bit instruction format 2710 provides access to all instruction options, while some options and operations are restricted in the 64-bit format 2730. The native instructions available in the 64-bit format 2730 vary by example. In some examples, the instruction is compacted in part using a set of index values in an index field 2713. The execution unit hardware references a set of compaction tables based on the index values and uses the compaction table outputs to reconstruct a native instruction in the 128-bit instruction format 2710. Other sizes and formats of instruction can be used.

For each format, instruction opcode 2712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some examples, instruction control field 2714 enables control over certain execution options, such as channels selection (e.g., predication) and data channel order (e.g., swizzle). For instructions in the 128-bit instruction format 2710 an exec-size field 2716 limits the number of data channels that will be executed in parallel. In some examples, exec-size field 2716 is not available for use in the 64-bit compact instruction format 2730.

Some execution unit instructions have up to three operands including two source operands, src0 2720, src1 2722, and one destination 2718. In some examples, the execution units support dual destination instructions, where one of the destinations is implied. Data manipulation instructions can have a third source operand (e.g., SRC2 2724), where the instruction opcode 2712 determines the number of source operands. An instruction's last source operand can be an immediate (e.g., hard-coded) value passed with the instruction.

In some examples, the 128-bit instruction format 2710 includes an access/address mode field 2726 specifying, for example, whether direct register addressing mode or indirect register addressing mode is used. When direct register addressing mode is used, the register address of one or more operands is directly provided by bits in the instruction.

In some examples, the 128-bit instruction format 2710 includes an access/address mode field 2726, which specifies an address mode and/or an access mode for the instruction. In some examples the access mode is used to define a data access alignment for the instruction. Some examples support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In some examples, the address mode portion of the access/address mode field 2726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some examples instructions are grouped based on opcode 2712 bit-fields to simplify Opcode decode 2740. For an 8-bit opcode, bits 4, 5, and 6 allow the execution unit to determine the type of opcode. The precise opcode grouping shown is merely an example. In some examples, a move and logic opcode group 2742 includes data movement and logic instructions (e.g., move (mov), compare (cmp)). In some examples, move and logic group 2742 shares the five most significant bits (MSB), where move (mov) instructions are in the form of 0000xxxxb and logic instructions are in the form of 0001xxxxb. A flow control instruction group 2744 (e.g., call, jump (jmp)) includes instructions in the form of 0010xxxxb (e.g., 0x20). A miscellaneous instruction group 2746 includes a mix of instructions, including synchronization instructions (e.g., wait, send) in the form of 0011xxxxb (e.g., 0x30). A parallel math instruction group 2748 includes component-wise arithmetic instructions (e.g., add, multiply (mul)) in the form of 0100xxxxb (e.g., 0x40). The parallel math group 2748 performs the arithmetic operations in parallel across data channels. The vector math group 2750 includes arithmetic instructions (e.g., dp4) in the form of 0101xxxxb (e.g., 0x50). The vector math group performs arithmetic such as dot product calculations on vector operands. The illustrated opcode decode 2740, in some examples, can be used to determine which portion of an execution unit will be used to execute a decoded instruction. For example, some instructions may be designated as systolic instructions that will be performed by a systolic array. Other instructions, such as ray-tracing instructions (not shown) can be routed to a ray-tracing core or ray-tracing logic within a slice or partition of execution logic.

Graphics Pipeline

Figure 28:
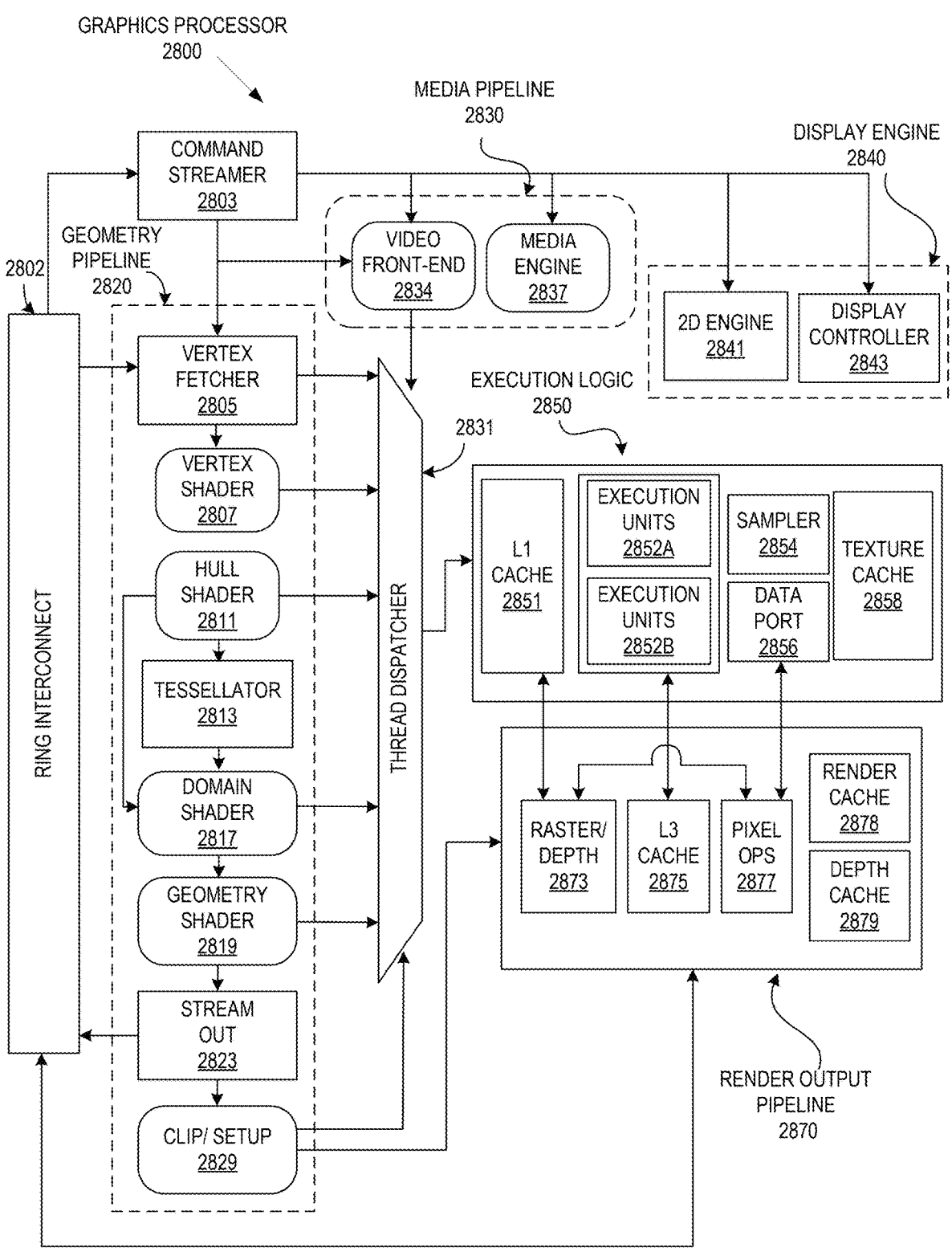
FIG. 28 is a block diagram of another example of a graphics processor.

FIG. 28 is a block diagram of another example of a graphics processor 2800. Elements of FIG. 28 having the same reference numbers (or names) as the elements of any other figure herein can operate or function in any manner similar to that described elsewhere herein, but are not limited to such.

In some examples, graphics processor 2800 includes a geometry pipeline 2820, a media pipeline 2830, a display engine 2840, thread execution logic 2850, and a render output pipeline 2870. In some examples, graphics processor 2800 is a graphics processor within a multi-core processing system that includes one or more general-purpose processing cores. The graphics processor is controlled by register writes to one or more control registers (not shown) or via commands issued to graphics processor 2800 via a ring interconnect 2802. In some examples, ring interconnect 2802 couples graphics processor 2800 to other processing components, such as other graphics processors or general-purpose processors. Commands from ring interconnect 2802 are interpreted by a command streamer 2803, which supplies instructions to individual components of the geometry pipeline 2820 or the media pipeline 2830.

In some examples, command streamer 2803 directs the operation of a vertex fetcher 2805 that reads vertex data from memory and executes vertex-processing commands provided by command streamer 2803. In some examples, vertex fetcher 2805 provides vertex data to a vertex shader 2807, which performs coordinate space transformation and lighting operations to each vertex. In some examples, vertex fetcher 2805 and vertex shader 2807 execute vertex-processing instructions by dispatching execution threads to execution units 2852A-2852B via a thread dispatcher 2831.

In some examples, execution units 2852A-2852B are an array of vector processors having an instruction set for performing graphics and media operations. In some examples, execution units 2852A-2852B have an attached L1 cache 2851 that is specific for each array or shared between the arrays. The cache can be configured as a data cache, an instruction cache, or a single cache that is partitioned to contain data and instructions in different partitions.

In some examples, geometry pipeline 2820 includes tessellation components to perform hardware-accelerated tessellation of 3D objects. In some examples, a programmable hull shader 2811 configures the tessellation operations. A programmable domain shader 2817 provides back-end evaluation of tessellation output. A tessellator 2813 operates at the direction of hull shader 2811 and contains special purpose logic to generate a set of detailed geometric objects based on a coarse geometric model that is provided as input to geometry pipeline 2820. In some examples, if tessellation is not used, tessellation components (e.g., hull shader 2811, tessellator 2813, and domain shader 2817) can be bypassed.

In some examples, complete geometric objects can be processed by a geometry shader 2819 via one or more threads dispatched to execution units 2852A-2852B, or can proceed directly to the clipper 2829. In some examples, the geometry shader operates on entire geometric objects, rather than vertices or patches of vertices as in previous stages of the graphics pipeline. If the tessellation is disabled the geometry shader 2819 receives input from the vertex shader 2807. In some examples, geometry shader 2819 is programmable by a geometry shader program to perform geometry tessellation if the tessellation units are disabled.

Before rasterization, a clipper 2829 processes vertex data. The clipper 2829 may be a fixed function clipper or a programmable clipper having clipping and geometry shader functions. In some examples, a rasterizer and depth test component 2873 in the render output pipeline 2870 dispatches pixel shaders to convert the geometric objects into per pixel representations. In some examples, pixel shader logic is included in thread execution logic 2850. In some examples, an application can bypass the rasterizer and depth test component 2873 and access un-rasterized vertex data via a stream out unit 2823.

The graphics processor 2800 has an interconnect bus, interconnect fabric, or some other interconnect mechanism that allows data and message passing amongst the major components of the processor. In some examples, execution units 2852A-2852B and associated logic units (e.g., L1 cache 2851, sampler 2854, texture cache 2858, etc.) interconnect via a data port 2856 to perform memory access and communicate with render output pipeline components of the processor. In some examples, sampler 2854, caches 2851, 2858 and execution units 2852A-2852B each have separate memory access paths. In some examples the texture cache 2858 can also be configured as a sampler cache.

In some examples, render output pipeline 2870 contains a rasterizer and depth test component 2873 that converts vertex-based objects into an associated pixel-based representation. In some examples, the rasterizer logic includes a windower/masker unit to perform fixed function triangle and line rasterization. An associated render cache 2878 and depth cache 2879 are also available in some examples. A pixel operations component 2877 performs pixel-based operations on the data, though in some instances, pixel operations associated with 2D operations (e.g., bit block image transfers with blending) are performed by the 2D engine 2841, or substituted at display time by the display controller 2843 using overlay display planes. In some examples, a shared L3 cache 2875 is available to all graphics components, allowing the sharing of data without the use of main system memory.

In some examples, graphics processor media pipeline 2830 includes a media engine 2837 and a video front-end 2834. In some examples, video front-end 2834 receives pipeline commands from the command streamer 2803. In some examples, media pipeline 2830 includes a separate command streamer. In some examples, video front-end 2834 processes media commands before sending the command to the media engine 2837. In some examples, media engine 2837 includes thread spawning functionality to spawn threads for dispatch to thread execution logic 2850 via thread dispatcher 2831.

In some examples, graphics processor 2800 includes a display engine 2840. In some examples, display engine 2840 is external to processor 2800 and couples with the graphics processor via the ring interconnect 2802, or some other interconnect bus or fabric. In some examples, display engine 2840 includes a 2D engine 2841 and a display controller 2843. In some examples, display engine 2840 contains special purpose logic capable of operating independently of the 3D pipeline. In some examples, display controller 2843 couples with a display device (not shown), which may be a system integrated display device, as in a laptop computer, or an external display device attached via a display device connector.

In some examples, the geometry pipeline 2820 and media pipeline 2830 are configurable to perform operations based on multiple graphics and media programming interfaces and are not specific to any one application programming interface (API). In some examples, driver software for the graphics processor translates API calls that are specific to a particular graphics or media library into commands that can be processed by the graphics processor. In some examples, support is provided for the Open Graphics Library (OpenGL), Open Computing Language (OpenCL), and/or Vulkan graphics and compute API, all from the Khronos Group. In some examples, support may also be provided for the Direct3D library from the Microsoft Corporation. In some examples, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 29:
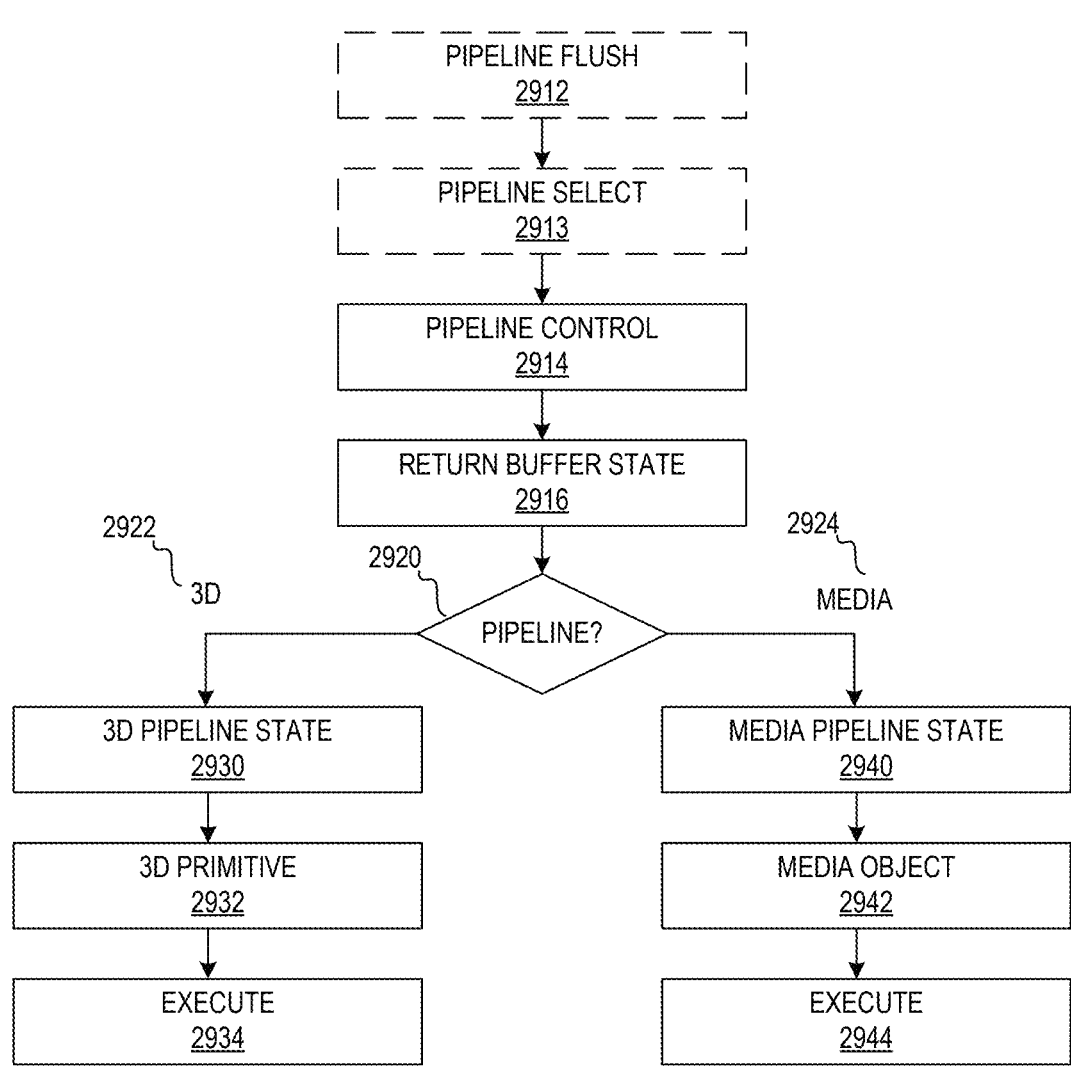
FIG. 29A is a block diagram illustrating a graphics processor command format according to some examples.
FIG. 29B is a block diagram illustrating a graphics processor command sequence according to an example.

FIG. 29A is a block diagram illustrating a graphics processor command format 2900 according to some examples. FIG. 29B is a block diagram illustrating a graphics processor command sequence 2910 according to an example. The solid lined boxes in FIG. 29A illustrate the components that are generally included in a graphics command while the dashed lines include components that are optional or that are only included in a sub-set of the graphics commands. The exemplary graphics processor command format 2900 of FIG. 29A includes data fields to identify a client 2902, a command operation code (opcode) 2904, and data 2906 for the command. A sub-opcode 2905 and a command size 2908 are also included in some commands.

In some examples, client 2902 specifies the client unit of the graphics device that processes the command data. In some examples, a graphics processor command parser examines the client field of each command to condition the further processing of the command and route the command data to the appropriate client unit. In some examples, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 2904 and, if present, sub-opcode 2905 to determine the operation to perform. The client unit performs the command using information in data field 2906. For some commands, an explicit command size 2908 is expected to specify the size of the command. In some examples, the command parser automatically determines the size of at least some of the commands based on the command opcode. In some examples commands are aligned via multiples of a double word. Other command formats can be used.

The flow diagram in FIG. 29B illustrates an exemplary graphics processor command sequence 2910. In some examples, software or firmware of a data processing system that features an example of a graphics processor uses a version of the command sequence shown to set up, execute, and terminate a set of graphics operations. A sample command sequence is shown and described for purposes of example only as examples are not limited to these specific commands or to this command sequence. Moreover, the commands may be issued as batch of commands in a command sequence, such that the graphics processor will process the sequence of commands in at least partially concurrence.

In some examples, the graphics processor command sequence 2910 may begin with a pipeline flush command 2912 to cause any active graphics pipeline to complete the currently pending commands for the pipeline. In some examples, the 3D pipeline 2922 and the media pipeline 2924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some examples, pipeline flush command 2912 can be used for pipeline synchronization or before placing the graphics processor into a low power state.

In some examples, a pipeline select command 2913 is used when a command sequence requires the graphics processor to explicitly switch between pipelines. In some examples, a pipeline select command 2913 is required only once within an execution context before issuing pipeline commands unless the context is to issue commands for both pipelines. In some examples, a pipeline flush command 2912 is required immediately before a pipeline switch via the pipeline select command 2913.

In some examples, a pipeline control command 2914 configures a graphics pipeline for operation and is used to program the 3D pipeline 2922 and the media pipeline 2924. In some examples, pipeline control command 2914 configures the pipeline state for the active pipeline. In some examples, the pipeline control command 2914 is used for pipeline synchronization and to clear data from one or more cache memories within the active pipeline before processing a batch of commands.

In some examples, return buffer state commands 2916 are used to configure a set of return buffers for the respective pipelines to write data. Some pipeline operations require the allocation, selection, or configuration of one or more return buffers into which the operations write intermediate data during processing. In some examples, the graphics processor also uses one or more return buffers to store output data and to perform cross thread communication. In some examples, the return buffer state 2916 includes selecting the size and number of return buffers to use for a set of pipeline operations.

The remaining commands in the command sequence differ based on the active pipeline for operations. Based on a pipeline determination 2920, the command sequence is tailored to the 3D pipeline 2922 beginning with the 3D pipeline state 2930 or the media pipeline 2924 beginning at the media pipeline state 2940.

The commands to configure the 3D pipeline state 2930 include 3D state setting commands for vertex buffer state, vertex element state, constant color state, depth buffer state, and other state variables that are to be configured before 3D primitive commands are processed. The values of these commands are determined at least in part based on the particular 3D API in use. In some examples, 3D pipeline state 2930 commands are also able to selectively disable or bypass certain pipeline elements if those elements will not be used.

In some examples, 3D primitive 2932 command is used to submit 3D primitives to be processed by the 3D pipeline. Commands and associated parameters that are passed to the graphics processor via the 3D primitive 2932 command are forwarded to the vertex fetch function in the graphics pipeline. The vertex fetch function uses the 3D primitive 2932 command data to generate vertex data structures. The vertex data structures are stored in one or more return buffers. In some examples, 3D primitive 2932 command is used to perform vertex operations on 3D primitives via vertex shaders. To process vertex shaders, 3D pipeline 2922 dispatches shader execution threads to graphics processor execution units.

In some examples, 3D pipeline 2922 is triggered via an execute 2934 command or event. In some examples, a register write triggers command execution. In some examples execution is triggered via a 'go' or 'kick' command in the command sequence. In some examples, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some examples, the graphics processor command sequence 2910 follows the media pipeline 2924 path when performing media operations. In general, the specific use and manner of programming for the media pipeline 2924 depends on the media or compute operations to be performed. Specific media decode operations may be offloaded to the media pipeline during media decode. In some examples, the media pipeline can also be bypassed and media decode can be performed in whole or in part using resources provided by one or more general-purpose processing cores. In some examples, the media pipeline also includes elements for general-purpose graphics processor unit (GPGPU) operations, where the graphics processor is used to perform SIMD vector operations using computational shader programs that are not explicitly related to the rendering of graphics primitives.

In some examples, media pipeline 2924 is configured in a similar manner as the 3D pipeline 2922. A set of commands to configure the media pipeline state 2940 are dispatched or placed into a command queue before the media object commands 2942. In some examples, commands for the media pipeline state 2940 include data to configure the media pipeline elements that will be used to process the media objects. This includes data to configure the video decode and video encode logic within the media pipeline, such as encode or decode format. In some examples, commands for the media pipeline state 2940 also support the use of one or more pointers to "indirect" state elements that contain a batch of state settings.

In some examples, media object commands 2942 supply pointers to media objects for processing by the media pipeline. The media objects include memory buffers containing video data to be processed. In some examples, all media pipeline states must be valid before issuing a media object command 2942. Once the pipeline state is configured and media object commands 2942 are queued, the media pipeline 2924 is triggered via an execute command 2944 or an equivalent execute event (e.g., register write). Output from media pipeline 2924 may then be post processed by operations provided by the 3D pipeline 2922 or the media pipeline 2924. In some examples, GPGPU operations are configured and executed in a similar manner as media operations.

Program code may be applied to input information to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), a field programmable gate array (FPGA), a microprocessor, or any combination thereof.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

Examples of the mechanisms disclosed herein may be implemented in hardware, software, firmware, or a combination of such implementation approaches. Examples may be implemented as computer programs or program code executing on programmable systems comprising at least one processor, a storage system (including volatile and non-volatile memory and/or storage elements), at least one input device, and at least one output device.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, examples also include non-transitory, tangible machine-readable media containing instructions or containing design data, such as Hardware Description Language (HDL), which defines structures, circuits, apparatuses, processors and/or system features described herein. Such examples may also be referred to as program products. Emulation (Including Binary Translation, Code Morphing, Etc.).

In some cases, an instruction converter may be used to convert an instruction from a source instruction set architecture to a target instruction set architecture. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 30 is a block diagram illustrating the use of a software instruction converter to convert binary instructions in a source ISA to binary instructions in a target ISA according to examples. In the illustrated example, the instruction converter is a software instruction converter, although alternatively the instruction converter may be implemented in software, firmware, hardware, or various combinations thereof. FIG. 30 shows a program in a high-level language 3002 may be compiled using a first ISA compiler 3004 to generate first ISA binary code 3006 that may be natively executed by a processor with at least one first ISA core 3016. The processor with at least one first ISA core 3016 represents any processor that can perform substantially the same functions as an Intel® processor with at least one first ISA core by compatibly executing or otherwise processing (1) a substantial portion of the first ISA or (2) object code versions of applications or other software targeted to run on an Intel processor with at least one first ISA core, in order to achieve substantially the same result as a processor with at least one first ISA core. The first ISA compiler 3004 represents a compiler that is operable to generate first ISA binary code 3006 (e.g., object code) that can, with or without additional linkage processing, be executed on the processor with at least one first ISA core 3016. Similarly, FIG. 30 shows the program in the high-level language 3002 may be compiled using an alternative ISA compiler 3008 to generate alternative ISA binary code 3010 that may be natively executed by a processor without a first ISA core 3014. The instruction converter 3012 is used to convert the first ISA binary code 3006 into code that may be natively executed by the processor without a first ISA core 3014. This converted code is not necessarily to be the same as the alternative ISA binary code 3010; however, the converted code will accomplish the general operation and be made up of instructions from the alternative ISA. Thus, the instruction converter 3012 represents software, firmware, hardware, or a combination thereof that, through emulation, simulation or any other process, allows a processor or other electronic device that does not have a first ISA processor or core to execute the first ISA binary code 3006.

IP Core Implementations

One or more aspects of at least some examples may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the examples described herein.

Figure 31:
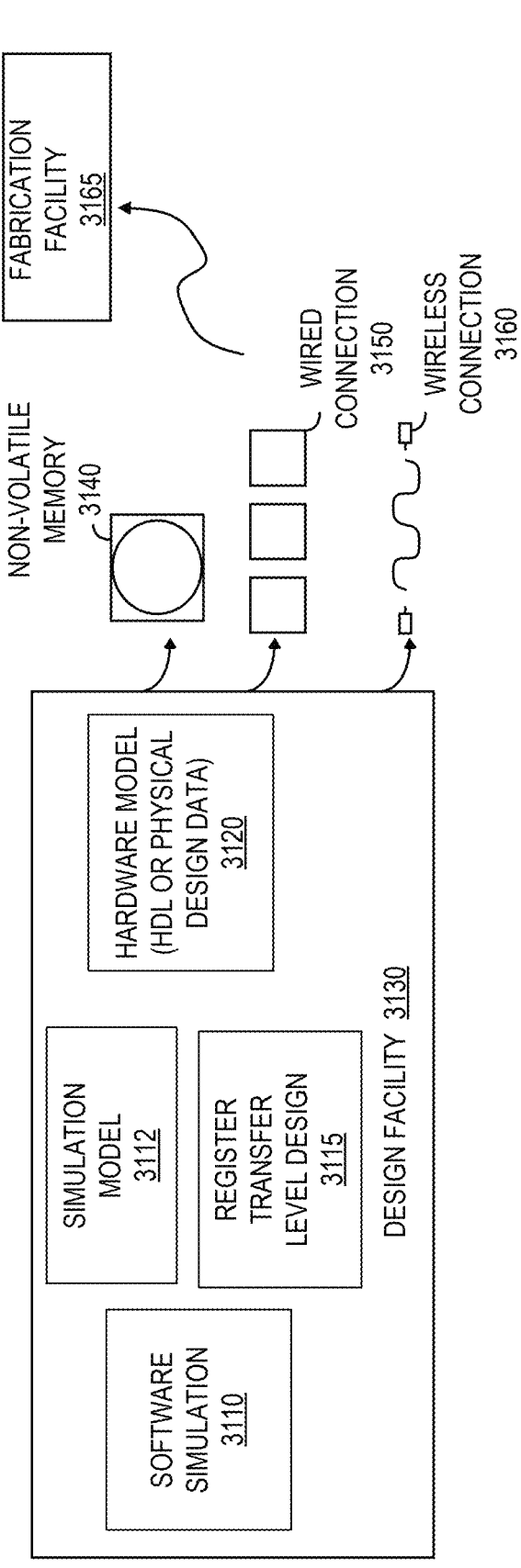
FIG. 31 is a block diagram illustrating an IP core development system 3100 that may be used to manufacture an integrated circuit to perform operations according to some examples.

FIG. 31 is a block diagram illustrating an IP core development system 3100 that may be used to manufacture an integrated circuit to perform operations according to some examples. The IP core development system 3100 may be used to generate modular, re-usable designs that can be incorporated into a larger design or used to construct an entire integrated circuit (e.g., an SOC integrated circuit). A design facility 3130 can generate a software simulation 3110 of an IP core design in a high-level programming language (e.g., C/C++). The software simulation 3110 can be used to design, test, and verify the behavior of the IP core using a simulation model 3112. The simulation model 3112 may include functional, behavioral, and/or timing simulations. A register transfer level (RTL) design 3115 can then be created or synthesized from the simulation model 3112. The RTL design 3115 is an abstraction of the behavior of the integrated circuit that models the flow of digital signals between hardware registers, including the associated logic performed using the modeled digital signals. In addition to an RTL design 3115, lower-level designs at the logic level or transistor level may also be created, designed, or synthesized. Thus, the particular details of the initial design and simulation may vary.

The RTL design 3115 or equivalent may be further synthesized by the design facility into a hardware model 3120, which may be in a hardware description language (HDL), or some other representation of physical design data. The HDL may be further simulated or tested to verify the IP core design. The IP core design can be stored for delivery to a 3$^{rd}$ party fabrication facility 3165 using non-volatile memory 3140 (e.g., hard disk, flash memory, or any non-volatile storage medium). Alternatively, the IP core design may be transmitted (e.g., via the Internet) over a wired connection 3150 or wireless connection 3160. The fabrication facility 3165 may then fabricate an integrated circuit that is based at least in part on the IP core design. The fabricated integrated circuit can be configured to perform operations in accordance with at least some examples described herein.

References to "some examples," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" or "A, B, and/or C" is intended to be understood to mean either A, B, or C, or any combination thereof (i.e., A and B, A and C, B and C, and A, B and C).

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. An apparatus comprising:
   a branch predictor to predict one of a taken path and a not taken path for a conditional branch instruction;
   decoder circuitry to decode an instruction into a decoded instruction, the instruction comprising a field that indicates a condition to be set by execution of another instruction, and an opcode that indicates execution circuitry is to, in response to the condition being satisfied, implement an execution fence to delay execution of the instruction until prior instructions in program order execute and delay execution of instructions after the instruction in program order until the instruction executes; and
   the execution circuitry to execute the decoded instruction according to the opcode.

2. The apparatus of claim 1, wherein the opcode further indicates the execution circuitry is to, in response to the condition not being currently resolved, delay execution of the instructions after the instruction in program order until the condition is resolved.

3. The apparatus of claim 1, wherein the opcode further indicates the execution circuitry is to, in response to the condition not being satisfied, allow one or more of the instructions after the instruction in program order to execute before execution of one or more of the prior instructions.

4. The apparatus of claim 3, wherein the opcode further indicates the execution circuitry is to, in response to condition not being satisfied, execute the instruction as a no-operation.

5. The apparatus of claim 1, further comprising a flag register, wherein the condition refers to a flag of the flag register.

6. The apparatus of claim 1, wherein the field that indicates the condition is a register-direct addressing mode field of the instruction.

7. The apparatus of claim 6, wherein the field is a register operand field of the register-direct addressing mode field.

8. A method comprising:
   predicting, by a branch predictor, one of a taken path and a not taken path for a conditional branch instruction prior to an instruction that immediately follows the conditional branch instruction in program order;

decoding, by decoder circuitry, the instruction into a decoded instruction, the instruction comprising a field that indicates a condition to be set by execution of another instruction, and an opcode that indicates execution circuitry is to, in response to the condition being satisfied, implement an execution fence to delay execution of the instruction until prior instructions in program order execute and delay execution of instructions after the instruction in program order until the instruction executes; and executing, by the execution circuitry, the decoded instruction according to the opcode.

9. The method of claim 8, wherein the opcode further indicates the execution circuitry is to, in response to the condition not being currently resolved, delay execution of the instructions after the instruction in program order until the condition is resolved.

10. The method of claim 8, wherein the opcode further indicates the execution circuitry is to, in response to the condition not being satisfied, allow one or more of the instructions after the instruction in program order to execute before executing one or more of the prior instructions.

11. The method of claim 10, wherein the opcode further indicates the execution circuitry is to, in response to the condition not being satisfied, execute the instruction as a no-operation.

12. The method of claim 8, further comprising a flag register, wherein the condition refers to a flag of the flag register.

13. The method of claim 8, wherein the field that indicates the condition is a register-direct addressing mode field of the instruction.

14. The method of claim 13, wherein the field is a register operand field of the register-direct addressing mode field.

15. A non-transitory machine-readable medium that stores code that when executed by a machine causes the machine to perform a method comprising:

predicting, by a branch predictor, one of a taken path and a not taken path for a conditional branch instruction prior to an instruction that immediately follows the conditional branch instruction in program order;

decoding, by decoder circuitry, the instruction into a decoded instruction, the instruction comprising a field that indicates a condition to be set by execution of another instruction, and an opcode that indicates execution circuitry is to, in response to the condition being satisfied, implement an execution fence to delay execution of the instruction until prior instructions in program order execute and delay execution of instructions after the instruction in program order until the instruction executes; and executing, by the execution circuitry, the decoded instruction according to the opcode.

16. The non-transitory machine-readable medium of claim 15, wherein the opcode further indicates the execution circuitry is to, in response to the condition not being currently resolved, delay execution of the instructions after the instruction in program order until the condition is resolved.

17. The non-transitory machine-readable medium of claim 15, wherein the opcode further indicates the execution circuitry is to, in response to the condition not being satisfied, allow one or more of the instructions after the instruction in program order to execute before executing one or more of the prior instructions.

18. The non-transitory machine-readable medium of claim 17, wherein the opcode further indicates the execution circuitry is to, in response to the condition not being satisfied, execute the instruction as a no-operation.

19. The non-transitory machine-readable medium of claim 15, further comprising a flag register, wherein the condition refers to a flag of the flag register.

20. The non-transitory machine-readable medium of claim 15, wherein the field that indicates the condition is a register-direct addressing mode field of the instruction.

* * * * *